(12) United States Patent
Thieberger et al.

(10) Patent No.: US 10,718,943 B2
(45) Date of Patent: Jul. 21, 2020

(54) LARGE MIRROR INSIDE AN AUTONOMOUS VEHICLE

(71) Applicant: Active Knowledge Ltd., Kiryat Tivon (IL)

(72) Inventors: Gil Thieberger, Kiryat Tivon (IL); Ari M Frank, Haifa (IL)

(*) Notice: Subject to any disclaimer, the term of this patent is extended or adjusted under 35 U.S.C. 154(b) by 355 days.

(21) Appl. No.: 15/871,980

(22) Filed: Jan. 15, 2018

(65) Prior Publication Data

US 2018/0154854 A1 Jun. 7, 2018

Related U.S. Application Data

(63) Continuation of application No. 15/335,404, filed on Oct. 26, 2016, now Pat. No. 9,988,008.
(Continued)

(51) Int. Cl.
*G02B 27/01* (2006.01)
*G06F 3/01* (2006.01)
(Continued)

(52) U.S. Cl.
CPC ........... *G02B 27/017* (2013.01); *G06F 3/011* (2013.01); *G06T 19/006* (2013.01); *B60J 3/04* (2013.01); *B60R 1/00* (2013.01); *B60R 21/017* (2013.01); *B60R 21/0134* (2013.01); *B60R 21/02* (2013.01); *B60R 21/055* (2013.01); *B60R 21/36* (2013.01); *B60R 2021/0004* (2013.01); *B60R 2021/0006* (2013.01); *B60R 2021/0034* (2013.01); *B60R 2021/0048* (2013.01); *B60R 2021/01013* (2013.01); *B60R 2021/01034* (2013.01); *B60R 2021/01252* (2013.01); *B60R 2021/0273* (2013.01);
(Continued)

(58) Field of Classification Search
None
See application file for complete search history.

(56) References Cited

U.S. PATENT DOCUMENTS 2,592,573 A 4/1952 Joncas
2,843,420 A 7/1958 Rich
(Continued)

FOREIGN PATENT DOCUMENTS

EP 2607152 A1 6/2013
EP 2913228 A1 9/2015
(Continued)

OTHER PUBLICATIONS

International search report, PCT/IB2016/056443, dated Feb. 14, 2017.
(Continued)

*Primary Examiner* — Todd Melton
(74) *Attorney, Agent, or Firm* — Active Knowledge Ltd.

(57) ABSTRACT

A large mirroring element is located in front of an occupant who sits in a front seat of an autonomous on-road vehicle. The large mirroring element provides the effect of reflecting light arriving from the occupant's direction. Optionally, a camera takes video of the outside environment in front of the occupant, sends the video to a computer that generates a representation of the outside environment in front of the occupant at eye level, and a display located in front of the occupant presents the representation to the occupant.

20 Claims, 24 Drawing Sheets

Related U.S. Application Data

(60) Provisional application No. 62/246,187, filed on Oct. 26, 2015, provisional application No. 62/369,127, filed on Jul. 31, 2016.

(51) Int. Cl.
| | |
|---|---|
| G06T 19/00 | (2011.01) |
| B60R 21/02 | (2006.01) |
| B60J 3/04 | (2006.01) |
| B60R 1/00 | (2006.01) |
| B60R 21/0134 | (2006.01) |
| B60R 21/017 | (2006.01) |
| B60R 21/055 | (2006.01) |
| B60R 21/36 | (2011.01) |
| B60R 21/00 | (2006.01) |
| B60R 21/01 | (2006.01) |
| B60R 21/34 | (2011.01) |
| B62D 21/06 | (2006.01) |

(52) U.S. Cl.
CPC ... *B60R 2021/346* (2013.01); *B60R 2300/105* (2013.01); *B62D 21/06* (2013.01)

(56) References Cited

U.S. PATENT DOCUMENTS

| | | | |
|---|---|---|---|
| 3,721,468 | A | 3/1973 | Burgess |
| 3,814,459 | A | 6/1974 | Eckels |
| 4,931,714 | A | 6/1990 | Yamamoto |
| 5,026,006 | A | 6/1991 | Tinder et al. |
| 5,098,124 | A | 3/1992 | Breed et al. |
| 5,375,879 | A | 12/1994 | Williams et al. |
| 5,382,051 | A | 1/1995 | Glance |
| 5,536,042 | A | 7/1996 | Williams et al. |
| 5,690,355 | A | 11/1997 | Kleinberg |
| 5,992,877 | A | 11/1999 | Gray |
| 6,027,159 | A | 2/2000 | Baumann |
| 6,050,631 | A | 4/2000 | Suzuki et al. |
| 6,909,947 | B2 | 6/2005 | Douros et al. |
| 7,070,030 | B2 | 7/2006 | Etcheverry |
| 7,143,856 | B2 | 12/2006 | Takahashi et al. |
| 7,180,476 | B1 | 2/2007 | Guell et al. |
| 7,246,050 | B2 | 7/2007 | Sheridan |
| 7,832,762 | B2 | 11/2010 | Breed |
| 7,961,117 | B1 | 6/2011 | Zimmerman et al. |
| 8,041,483 | B2 | 10/2011 | Breed |
| 8,102,586 | B2 | 1/2012 | Albahri |
| 8,118,286 | B2 | 2/2012 | Chong |
| 8,259,178 | B2 | 9/2012 | Basso et al. |
| 8,376,451 | B2 | 2/2013 | Todd |
| 8,386,103 | B2 | 2/2013 | Tran |
| 8,491,045 | B2 | 7/2013 | Ameloot et al. |
| 8,544,585 | B2 | 10/2013 | Ballard |
| 8,547,298 | B2 | 10/2013 | Szczerba et al. |
| 8,713,215 | B2 | 4/2014 | Wade et al. |
| 8,733,938 | B2 | 5/2014 | Sachdev et al. |
| 8,780,174 | B1 | 7/2014 | Rawdon |
| 8,874,284 | B2 | 10/2014 | Sanders-Reed |
| 8,886,023 | B2 | 11/2014 | Satoh |
| 8,950,735 | B2 | 2/2015 | Reynolds et al. |
| 9,272,708 | B2 | 3/2016 | Cuddihy et al. |
| 9,340,231 | B1 | 5/2016 | Minahan et al. |
| 9,446,735 | B1 | 9/2016 | Jayasuriya et al. |
| 9,457,642 | B2* | 10/2016 | Kothari ............... B60R 1/00 |
| 9,609,222 | B1* | 3/2017 | Rowles ............... B60R 11/02 |
| 2002/0091473 | A1 | 7/2002 | Gardner et al. |
| 2003/0002180 | A1 | 1/2003 | Nielsen et al. |
| 2003/0209893 | A1 | 11/2003 | Breed et al. |
| 2003/0221584 | A1 | 12/2003 | Huss et al. |
| 2004/0040463 | A1 | 3/2004 | Yamamoto et al. |
| 2004/0100073 | A1 | 5/2004 | Bakhsh et al. |
| 2007/0013206 | A1 | 1/2007 | Huttsell et al. |
| 2007/0102126 | A1 | 5/2007 | Yamamura et al. |
| 2007/0125417 | A1 | 6/2007 | Johanson et al. |
| 2009/0174774 | A1 | 7/2009 | Kinsley |
| 2009/0189831 | A1 | 7/2009 | Chevion et al. |
| 2009/0195652 | A1 | 8/2009 | Gal |
| 2010/0084888 | A1 | 4/2010 | Ishitobi et al. |
| 2010/0253594 | A1 | 10/2010 | Szczerba et al. |
| 2011/0001311 | A1 | 1/2011 | Hofferberth |
| 2011/0115990 | A1 | 5/2011 | Bhaktiar |
| 2012/0169861 | A1 | 7/2012 | Szczerba et al. |
| 2012/0212613 | A1 | 8/2012 | Yamaguchi et al. |
| 2012/0256945 | A1 | 10/2012 | Kidron et al. |
| 2013/0004920 | A1 | 1/2013 | Pabst et al. |
| 2013/0162639 | A1 | 6/2013 | Muench et al. |
| 2014/0020596 | A1 | 1/2014 | Graf et al. |
| 2014/0340287 | A1 | 11/2014 | Achilefu et al. |
| 2014/0361976 | A1 | 12/2014 | Osman et al. |
| 2014/0362113 | A1 | 12/2014 | Benson et al. |
| 2015/0002642 | A1* | 1/2015 | Dressler ............... B60R 1/00 348/51 |
| 2015/0054933 | A1 | 2/2015 | Wasiek et al. |
| 2015/0054953 | A1 | 2/2015 | Frank |
| 2015/0077337 | A1 | 3/2015 | Coto-Lopez et al. |
| 2015/0264256 | A1 | 9/2015 | Lehtiniemi et al. |
| 2015/0294505 | A1 | 10/2015 | Atsmon |
| 2016/0001781 | A1 | 1/2016 | Fung |
| 2016/0091877 | A1 | 3/2016 | Fullam et al. |
| 2016/0267335 | A1 | 9/2016 | Hampiholi |
| 2016/0282618 | A1 | 9/2016 | Kon et al. |
| 2017/0155867 | A1* | 6/2017 | Yokota ............... B60R 1/008 |

FOREIGN PATENT DOCUMENTS

| | | |
|---|---|---|
| WO | WO2006016052 A2 | 2/2006 |
| WO | WO2015114437 A1 | 8/2015 |
| WO | WO2016044820 A1 | 3/2016 |

OTHER PUBLICATIONS

Written opinion of the international searching authority, PCT/IB2016/056443, dated Feb. 14, 2017.

Ashish Gedamkar, CES 2015: Mercedes' futuristic self-driving car has No Windows, Feb. 5, 2015, https://www.linkedin.com/pulse/ces-2015-mercedes-futuristic-self-driving-car-has-gedamkar-lion.

Perazzi, F., Sorkine-Hornung, A., Zimmer, H., Kaufmann, P. Wang, O., Watson, S., & Gross, M. (May 2015). Panoramic video from unstructured camera arrays. In Computer Graphics Forum (vol. 34, No. 2, pp. 57-68).

Tanimoto, M. (2012). FTV: Free-viewpoint television. Signal Processing: Image Communication, 27(6), 555-570.

Bailey, R. E., Shelton, K. J., & Arthur III, J. J. (May 2011). Head-worn displays for NextGen. In SPIE Defense, Security, and Sensing (pp. 80410G-80410G). International Society for Optics and Photonics.

Doehler, H. U., Schmerwitz, S., & Lueken, T. (Jun. 2014). Visual-conformal display format for helicopter guidance. In SPIE Defense+ Security (pp. 90870J-90870J). International Society for Optics and Photonics.

Wang, X. (2013). Intelligent multi-camera video surveillance: A review. Pattern recognition letters, 34(1), 3-19.

González, D., Pérez, J., Milanés, V., & Nashashibi, F. (2016). A review of motion planning techniques for automated vehicles. IEEE Transactions on Intelligent Transportation Systems, 17(4), 1135-1145.

Paden, B., Čáp, M., Yong, S. Z., Yershov, D., & Frazzoli, E. (2016). A Survey of Motion Planning and Control Techniques for Self-driving Urban Vehicles. IEEE Transactions on Intelligent Vehicles, 1(1), 33-55.

Ernst, J. M., Doehler, H. U., & Schmerwitz, S. (May 2016). A concept for a virtual flight deck shown on an HMD. In SPIE Defense+ Security (pp. 983909-983909). International Society for Optics and Photonics.

Wang, J. T. (Jun. 2005). An extendable and retractable bumper. In 19 th ESV conference (pp. 05-0144).

Aearo Company, Confor Foams brochure, E-A-R Product Guide, 2001.

(56) References Cited

OTHER PUBLICATIONS

Woodford, Chris. (2009) Energy-absorbing plastics. Retrieved from http://www.explainthatstuff.com/energyabsorbingmaterials.html.
Trelleborg Applied Technology, CONFOR foams cushioning and impact absorbing safety foam.
SPD Control Systems Corporation, Spd—Smartglass Automotive Applications.
Dr. Peter Schuster, American Iron and Steel Institute ,Current Trends in Bumper Design for Pedestrian Impact: A Review of Design Concepts from Literature and Patents, Dec. 31, 2004.
Schuster, P. J. (2006). Current trends in bumper design for pedestrian impact (No. 2006-01-0464). SAE Technical Paper.
Heim, R., Naughton, P., & Koelman, H (Jun. 2001). Design engineering with foams and plastics to enhance vehicle safety. In The17th International Technical Conference on the Enhanced Safety of Vehicles, Amsterdam.
Horton Emergency vehicles, HOPS, We didn't get here overnight, What you'll find in a HOPS equipped ambulance.
Friedman, D., & Friedman, K. (Oct. 1998). Upper interior head, face and neck injury experiments. In Proceedings of the 16th International Technical Conference on the Enhanced Safety of Vehicles, Windsor, Ontario, Canada.
McLean, A. J., Fildes, B. N., Kloeden, C. N., Digges, K. H., Anderson, R. W. G., Moore, V. M., & Simpson, D. A. (1997). Prevention of Head Injuries to Car Occupants. An Investigation of Interior Padding Options (No. CR 160).

\* cited by examiner

LARGE MIRROR INSIDE AN AUTONOMOUS VEHICLE

CROSS-REFERENCE TO RELATED APPLICATIONS

This Application is a Continuation of U.S. application Ser. No. 15/335,404, filed Oct. 26, 2016, which claims priority to U.S. Provisional Patent Application No. 62/246,187, filed on 26 Oct. 2015, and U.S. Provisional Patent Application No. 62/369,127, filed on 31 Jul. 2016.

ACKNOWLEDGMENTS

Gil Thieberger would like to thank his holy and beloved teacher, Lama Dvora-hla, for her extraordinary teachings and manifestation of wisdom, love, compassion and morality, and for her endless efforts, support, and skills in guiding him and others on their paths to freedom and ultimate happiness. Gil would also like to thank his beloved parents for raising him exactly as they did.

BACKGROUND

Windowless vehicles, or vehicles without a windshield, may have various benefits when it comes to safety, weight, and cost. However, in some cases, some occupants may feel claustrophobic in such a vehicle. Thus, there is a need for a way to make traveling in such vehicles more pleasurable for occupants who might feel somewhat unease in confined spaces. Other occupants would like to see themselves while traveling. Thus, there is a need to have a large front mirror that enables the occupants to see themselves.

SUMMARY

Some aspects of this disclosure involve an autonomous on-road vehicle that provides the effect of a large front mirror. The vehicle includes a compartment having a large mirroring element located in front of an occupant who sits in a front seat of the compartment. The mirroring element captures a region corresponding to at least 10×10 degrees, including a region spanning from the horizon to at least 10° below the horizon of the occupant's forward field of view during normal driving. Additionally, the mirroring element provides an effect of reflecting more than 25% of the light arriving from the occupant's direction. In some embodiments, the vehicle has an advantage that it can increase the perceived compartment volume, which can make travelling in the vehicle more pleasurable for some people.

Other aspects of this disclosure involve an autonomous on-road vehicle that provides the effect of a large front mirror. The vehicle includes a compartment, a camera, a computer, and a head-mounted display (HMD). The compartment includes a front seat, the camera is physically coupled to the vehicle and takes images of an occupant who sits in the front seat, the computer generates a video that shows a mirror effect based on the images, the communication module transmits the video to the HMD that is worn by the occupant, and the HMD presents the video to the occupant, such that the occupant sees a representation of his or her reflection when looking forward at eye level.

BRIEF DESCRIPTION OF THE DRAWINGS

The embodiments are herein described by way of example only, with reference to the accompanying drawings. No attempt is made to show structural details of the embodiments in more detail than is necessary for a fundamental understanding of the embodiments. In the drawings.

DETAILED DESCRIPTION

Figure 1:
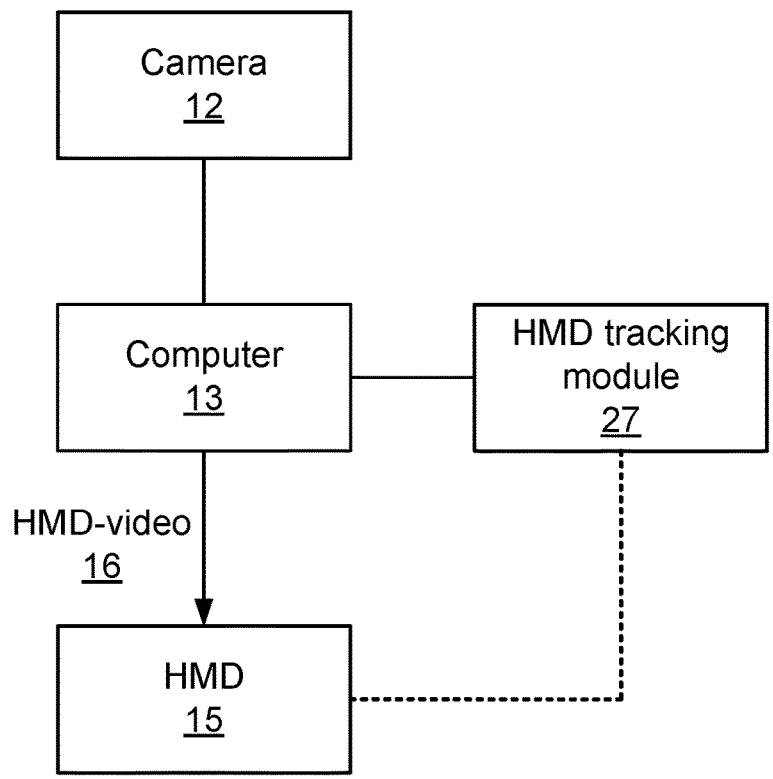
FIG. 1 is a schematic illustration of components of a system configured to combine video see-through (VST) with video-unrelated-to-the-VST (VUR)

The following are definitions of various terms that may be used to describe one or more of the embodiments in this disclosure.

The terms "autonomous on-road vehicle" and "autonomous on-road manned vehicle" refer to cars and motorcycles designed to drive on public roadways utilizing automated driving of level 3 and above according to SAE International standard J3016 "Taxonomy and Definitions for Terms Related to On-Road Motor Vehicle Automated Driving Systems". For example, the autonomous on-road vehicle may be a level 3 vehicle, in which within known, limited environments, drivers can safely turn their attention away from driving tasks; the autonomous on-road vehicle may be a level 4 vehicle, in which the automated system can control the vehicle in all but a few environments; and/or the autonomous on-road vehicle may be a level 5 vehicle, in which no human intervention is required and the automatic system can drive to any location where it is legal to drive. Herein, the terms "autonomous on-road vehicle" and "self-driving on-road vehicle" are equivalent terms that refer to the same. The term "autonomous on-road vehicle" does not include trains, airplanes, boats, and armored fighting vehicles.

An autonomous on-road vehicle utilizes an autonomous-driving control system to drive the vehicle. The disclosed embodiments may use any suitable known and/or to be invented autonomous-driving control systems. The following three publications describe various autonomous-driving control systems that may be utilized with the disclosed embodiments: (i) Paden, Brian, et al. "A Survey of Motion Planning and Control Techniques for Self-driving Urban Vehicles." arXiv preprint arXiv:1604.07446 (2016); (ii) Surden, Harry, and Mary-Anne Williams. "Technological Opacity, Predictability, and Self-Driving Cars." Predictability, and Self-Driving Cars (Mar. 14, 2016) (2016); and (iii) Gonzalez, David, et al. "A Review of Motion Planning Techniques for Automated Vehicles." IEEE Transactions on Intelligent Transportation Systems 17.4 (2016): 1135-1145.

Autonomous-driving control systems usually utilize algorithms such as machine learning, pattern recognition, neural network, machine vision, artificial intelligence, and/or probabilistic logic to calculate on the fly the probability of an imminent collision, or to calculate on the fly values that are indicative of the probability of an imminent collision (from which it is possible to estimate the probability of an imminent collision). The algorithms usually receive as inputs the trajectory of the vehicle, measured locations of at least one nearby vehicle, information about the road, and/or information about environmental conditions. Calculating the probability of an imminent collision is well known in the art, also for human driven vehicles, such as the anticipatory collision system disclosed in U.S. Pat. No. 8,041,483 to Breed.

In order to calculate whether a Sudden Decrease in Ride Smoothness (SDRS) event is imminent, the autonomous-driving control system may compare parameters describing the state of the vehicle at time $t_1$ with parameters describing the state of the vehicle at time $t_2$ that is shortly after $t_1$. If the change in one or more of the parameters reaches a threshold (such as deceleration above a certain value, change of height in the road above a certain value, and/or an angular acceleration above a certain value) then it may be determined that an SDRS event is imminent.

An "occupant" of a vehicle, as the term is used herein refers to a person that is in the vehicle when it drives. The term "occupant" refers to a typical person having a typical shape, such as a 170 cm tall human (herein "cm" refers to centimeters). An occupant may be a driver, having some responsibilities and/or control regarding the driving of the vehicle (e.g., in a vehicle that is not completely autonomous), or may be a passenger. When an embodiment refers to "the occupant of the vehicle", it may refer to one of the occupants of the vehicle. Stating that a vehicle has an "occupant" should not be interpreted that the vehicle necessarily accommodates only one occupant at a time, unless that is explicitly stated, such as stating that the vehicle is "designed for a single occupant".

Herein, a "seat" may be any structure designed to hold an occupant travelling in the vehicle (e.g., in a sitting and/or reclining position). A "front seat" is a seat that positions an occupant it holds no farther from the front of the vehicle than any other occupants of the vehicle are positioned. Herein, sitting in a seat also refers to sitting on a seat. Sitting in a seat is to be interpreted in this disclosure as occupying the space corresponding the seat, even if the occupant does so by assuming a posture that does not necessarily correspond to sitting. For example, in some vehicles the occupant may be reclined or lying down, and in other vehicles the occupant may be more upright, such as when leaning into the seat in a half standing half seating position similar to leaning into a Locus Seat by Focal Upright LLC.

The interchangeable terms "environment outside the vehicle" and "outside environment" refer to the environment outside the vehicle, which includes objects that are not inside the vehicle compartment, such as other vehicles, roads, pedestrians, trees, buildings, mountains, the sky, and outer space.

A sensor "mounted to the vehicle" may be connected to any relevant part of the vehicle, whether inside the vehicle, outside the vehicle, to the front, back, top, bottom, and/or to a side of the vehicle. A sensor, as used herein, may also refer to a camera.

The term "camera" refers herein to an image-capturing device that takes images of an environment. For example, the camera may be based on at least one of the following sensors: a CCD sensor, a CMOS sensor, a near infrared (NIR) sensor, an infrared sensor (IR), and a device based on active illumination such as a LiDAR. The term "video" refers to a series of images that may be provided in a fixed rate, variable rates, a fixed resolution, and/or dynamic resolutions. The use of a singular "camera" should be interpreted herein as "one or more cameras". Thus, when embodiments herein are described as including a camera that captures video and/or images of the outside environment in order to generate a representation of the outside environment, the representation may in fact be generated based on images and/or video taken using multiple cameras.

Various embodiments described herein involve providing an occupant of the vehicle with representation of the outside environment, generated by a computer and/or processor, based on video taken by a camera. In some embodiments, video from a single camera (e.g., which may be positioned on the exterior of the vehicle at eye level), may be sent to presentation to the occupant by the processor and/or computer following little, if any, processing. In other embodiments, video from a single camera or multiple cameras is processed in various ways, by the computer and/or processor, in order to generate the representation of the outside environment that is presented to the occupant.

Methods and systems for stitching live video streams from multiple cameras, stitching live video streams with database objects and/or other video sources, transforming a video stream or a stitched video stream from one point of view to another point of view (such as for generating a representation of the outside environment for an occupant at eye level, or for generating a compartment view for a person standing outside the compartment), tracking the position of an HMD relative to a compartment, and presenting rendered images that are perfectly aligned with the outside world— are all known in the art of computer graphics, video stitching, image registration, and real-time 360° imaging systems. The following publications are just a few examples of reviews and references that describe various ways to perform the video stitching, image registration, tracking, and transformations, which may be utilized by the embodiments disclosed herein: (i) Wang, Xiaogang. "Intelligent multi-camera video surveillance: A review." Pattern recognition letters 34.1 (2013): 3-19. (ii) Szeliski, Richard. "Image alignment and stitching: A tutorial." Foundations and Trends® in Computer Graphics and Vision 2.1 (2006): 1-104. (iii) Tanimoto, Masayuki. "FTV: Free-viewpoint television." Signal Processing: Image Communication 27.6 (2012): 555-570. (iv) Ernst, Johannes M., Hans-Ullrich Doehler, and Sven Schmerwitz. "A concept for a virtual flight deck shown on an HMD." SPIE Defense+ Security. International Society for Optics and Photonics, 2016. (v) Doehler, H-U., Sven Schmerwitz, and Thomas Lueken. "Visual-conformal display format for helicopter guidance." SPIE Defense+ Security. International Society for Optics and Photonics, 2014. (vi) Sanders-Reed, John N., Ken Bernier, and Jeff Güell "Enhanced and synthetic vision system (ESVS) flight demonstration." SPIE Defense and Security Symposium. International Society for Optics and Photonics, 2008. And (vii) Bailey, Randall E., Kevin J. Shelton, and J. J. Arthur III. "Head-worn displays for NextGen." SPIE Defense, Security, and Sensing. International Society for Optics and Photonics, 2011.

A video that provides "representation of the outside environment" refers to a video that enables the average occupant, who is familiar with the outside environment, to recognize the location of the vehicle in the outside environment from watching the video. In one example, the average occupant is a healthy 30 years old human who is familiar with the outside environment, and the threshold for recognizing a video as a "representation of the outside environment" is at least 20 correct recognitions of the outside environment out of 30 tests.

Herein, sentences such as "VST that represents a view of the outside environment from the point of view of the occupant", or "VST representation of the outside environment, which could have been seen from the point of view of the occupant" refer to a video representing at least a portion of the outside environment, with a deviation of less than ±20 degrees from the occupant's point of view of the outside environment, and zoom in the range of 30% to 300% (assuming the occupant's unaided view is at 100% zoom level).

The VST may be generated based on at least one of the following resources: a video of the outside environment that is taken in real-time, a video of the outside environment that was taken in the past and is played/processed according to the trajectory of the vehicle, a database of the outside environment that is utilized for rendering the VST according to the trajectory of the vehicle, and/or a video that is rendered as function of locations of physical objects identified in the outside environment using detection and ranging systems such as RADAR and/or LIDAR.

Moreover, the term "video see-through (VST)" covers both direct representations of the outside environment, such as a video of the outside environment, and/or enriched video of the outside environment, such as captured video and/or rendered video of the outside environment presented together with one or more layers of virtual objects, as long as more than 20% of the average vehicle occupants, who are familiar with the outside environment, would be able to determine their location in the outside environment, while the vehicle travels, without using a map, and with a margin of error below 200 meters. However, it is noted that showing a map that indicates the location of the vehicle on the driving path (such as from the start to the destination) is not considered herein as equivalent to the VST, unless the map includes all of the following properties: the map shows images of the path, the images of the path capture at least 5 degrees of the occupant's FOV at eye level, and the images of the path reflect the dynamics of the vehicle and change in a similar manner to a video taken by a camera mounted to the vehicle and directed to the outside environment.

Herein, "field of view (FOV) of the occupant to the outside environment" refers to the part of the outside environment that is visible to the occupant of a vehicle at a particular position and orientation in space. In one example, in order for an occupant-tracking module to calculate the FOV to the outside environment of an occupant sitting in a vehicle compartment, the occupant-tracking module determines the position and orientation of the occupant's head. In another example, in order for an occupant-tracking module to calculate the FOV of an occupant sitting in a vehicle compartment, the occupant-tracking module utilizes an eye tracker.

It is noted that sentences such as "a three dimensional (3D) video see-through (VST) that represents a view of the outside environment, which could have been seen from the point of view of the occupant had the FOV not been obstructed by at least a portion of the nontransparent element" cover also just one or more portions of the FOV, and are to be interpreted as "a three dimensional (3D) video see-through (VST) that represents a view of at least a portion of the outside environment, which could have been seen from the point of view of the occupant had at least some of the FOV not been obstructed by at least a portion of the nontransparent element".

The term "display" refers herein to any device that provides a human user with visual images (e.g., text, pictures, and/or video). The images provided by the display may be two-dimensional or three-dimensional images. Some non-limiting examples of displays that may be used in embodiments described in this disclosure include: (i) screens and/or video displays of various devices (e.g., televisions, computer monitors, tablets, smartphones, or smartwatches), (ii) headset- or helmet-mounted displays such as augmented-reality systems (e.g., HoloLens), virtual-reality systems (e.g., Oculus rift, HTC Vive, or Samsung GearVR), and mixed-reality systems (e.g., Magic Leap), and (iii) image projection systems that project images on a occupant's retina, such as: Virtual Retinal Displays (VRD) that create images by scanning low power laser light directly onto the retina, or light-field technologies that transmit light rays directly into the eye.

Various embodiments may include a reference to elements located at eye level. The "eye level" height is determined according to an average adult occupant for whom the vehicle was designed, who sits straight and looks to the horizon. Sentences in the form of "an element located at eye level of an occupant who sits in a vehicle" refer to the element and not to the occupant. The occupant is used in such sentences in the context of "eye level", and thus claims containing such sentences do not require the existence of the occupant in order to construct the claim.

Sentences such as "SAEDP located at eye level", "stiff element located at eye level", and "crumple zone located at eye level" refer to elements that are located at eye level, but may also extended to other levels, such as from sternum level to the roof level, from floor level to eye level, and/or from floor level to roof level. For example, an SAEDP located at an eye level can extend from sternum level to above the occupant's head, such that at least a portion of the SAEDP is located at the eye level.

Herein, "normal driving" refers to typical driving conditions, which persist most of the time the vehicle is in motion. During normal driving the probability of a collision is below a threshold that when reached typically involves one or more of the following actions: deployment of safety devices that are not usually deployed (e.g., inflating airbags), taking evasive action to avoid a collision, and warning occupants of the vehicle about an imminent event that may cause a Sudden Decrease in Ride Smoothness (SDRS).

A Shock-Absorbing Energy Dissipation Padding (SAEDP) is an element that may be used to cushion impact of a body during a collision or during SDRS events. Various types of SAEDPs may be used in embodiments described herein, such as passive materials, airbags, and pneumatic pads.

Some examples of passive materials that may be used for the SAEDP in one or more of the disclosed embodiments include one or more of the following materials: CONFOR® foam by Trelleborg Applied Technology, Styrofoam by The Dow Chemical Company, Micro-Lattice Materials and/or Metallic Microlattices (such as by HRL Laboratories in collaboration with researchers at University of California and Caltech), non-Newtonian energy Absorbing materials (such as D3O® by D3O lab, and DEFLEXION™ by Dow Corning®), Sorbothane® by Sorbothane Incorporated, and padding that includes compression cells and/or shock absorbers of the Xenith LLC type (such as described in U.S. Pat. No. 8,950,735 and US patent application num. 20100186150), and materials that include rubber such as a sponge rubber.

The term "stiff element" refers to a material having stiffness and impact resistance equal or greater than that of glazing materials for use in motor vehicles as defined in the following two standards: (i) "American National Standard for Safety Glazing Materials for Glazing Motor Vehicles and Motor Vehicle Equipment Operating on Land Highways-Safety Standard" ANSI/SAE Z26.1-1996, and (ii) The Society of Automotive Engineers (SAE) Recommended Practice J673, revised April 1993, "Automotive Safety Glasses" (SAE J673, rev. April 93). The term "stiff element" in the context of low speed vehicles refers to a material having stiffness and impact resistance equal or greater than that of glazing materials for use in low speed motor vehicles as defined in Federal Motor Vehicle Safety Standard 205—Glazing Materials (FMVSS 205), from 49 CFR Ch. V (10-1-04 Edition). The stiff element may be transparent (such as automotive laminated glass, or automotive tempered glass) or nontransparent (such as fiber-reinforced polymer, carbon fiber reinforced polymer, steel, or aluminum).

Herein, a nontransparent element is defined as an element having Visible Light Transmittance (VLT) between 0% and 20%, which does not enable the occupant to recognize what lies on the other side of it. For example, a thick ground glass usually allows light to pass through it but does not let the occupant recognize the objects on the other side of it, unlike plain tinted glass that usually lets the occupant recognize the objects on the other side of it, even when it features VLT below 10%. The nontransparent element includes an opaque element having VLT of essentially 0% and includes a translucent element having VLT below 20%. VLT is defined as the amount of incident visible light that passes through the nontransparent element, where incident light is defined as the light that strikes the nontransparent element. VLT is also known as Luminous Transmittance of a lens, a light diffuser, or the like, and is defined herein as the ratio of the total transmitted light to the total incident light. The common clear vehicle windshield has a VLT of approximately 85%, although US Federal Motor Vehicle Safety Standard No. 205 allows the VLT to be as low as 70%.

Sentences such as "video unrelated to the VST (VUR)" mean that an average occupant would not recognize the video as a representation of the outside environment. In some embodiments, the content of the VUR does not change as function of the position of the occupant's head, which means that the point of view from which the occupant watches the VUR does not change essentially when the occupant's head moves. Herein, stabilization effects, image focusing, dynamic resolution, color corrections, and insignificant changes to less than 10% of the frame as function of the position of the occupant's head—are still considered as content that does not change as function of the position of the occupant's head. Examples of such content (common in the year 2016) include cinema movies, broadcast TV shows, standard web browsers, and Microsoft Office 2016 applications (such as Word, Excel and PowerPoint).

Herein, a "crumple zone" refers to a structure designed to slow down inertia and absorb energy from impact during a traffic collision by controlled deformation. The controlled deformation absorbs some of the impact within the outer parts of the vehicle, rather than being directly transferred to the occupants, while also preventing intrusion into and/or deformation of the compartment. Crumple zone may be achieved by various configurations, such as one or more of the following exemplary configurations: (i) by controlled weakening of sacrificial outer parts of the vehicle, while strengthening and increasing the stiffness of the inner parts of the vehicle, such as by using more reinforcing beams and/or higher strength steels for the compartment; (ii) by mounting composite fiber honeycomb or carbon fiber honeycomb outside the compartment; (iii) by mounting an energy absorbing foam outside the compartment; and/or (iv) by mounting an impact attenuator that dissipates impact.

In order to enable an occupant of a vehicle to view the outside environment, without needing to look out of a physical window, some aspects of this disclosure involve systems that combine video see-through (VST) with video-unrelated-to-the-VST (VUR).

In one embodiment, a system configured to combine video see-through (VST) with video-unrelated-to-the-VST (VUR) includes a head-mounted display (HMD), a camera, an HMD tracking module and a computer. The HMD is configured to be worn by an occupant of a compartment of a moving vehicle and to present an HMD-video to the occupant. The camera, which is mounted to the vehicle, is configured to take video of the outside environment ($V_{out}$). The HMD tracking module is configured to calculate position of the HMD relative to the compartment, based on measurements of a sensor. The computer is configured to receive a location of a video see-through window (VSTW) in relation to the compartment, and to calculate, based on the position of the HMD relative to the compartment, a window-location for the VSTW on the HMD-video. Additionally, the computer is further configured to generate, based on the window-location and the $V_{out}$, the VST that represents a view of the outside environment from the point of view of the occupant. The computer is also configured to generate the HMD-video based on combining the VUR with the VST in the window-location. It is to be noted that the content of the VUR is unrelated to the video taken by the camera.

In one embodiment, a system configured to combine video see-through (VST) with video-unrelated-to-the-VST (VUR) includes at least the following components: a head-mounted display (HMD), such as HMD 15, a camera (e.g., camera 12), an HMD tracking module 27, and a computer 13. FIG. 1 provides a schematic illustration of at least some of the relationships between the components mentioned above.

The HMD 15 is configured to be worn by an occupant of a compartment of a moving vehicle and to present an HMD-video 16 to the occupant. In one embodiment, the HMD 15 is an augmented-reality (AR) HMD. In another embodiment, the HMD 15 is a virtual reality (VR) HMD. Optionally, in this embodiment, the system further comprises a video camera mounted to the VR HMD, and the VST video comprises video of the compartment received from the video camera mounted to the VR HMD. In yet another embodiment, the HMD 15 is a mixed reality HMD. The term "Mixed Reality" (MR) as used herein involves a system that is able to combine real world data with virtual data. Mixed Reality encompasses Augmented Reality and encompasses Virtual Reality that does not immerse its user 100% of the time in the virtual world. Examples of mixed reality HMDs include, but are not limited to, Microsoft HoloLens HMD and MagicLeap HMD.

The camera 12, which is mounted to the vehicle, is configured to take video of the outside environment ($V_{out}$). Optionally, the data captured by the camera comprises 3D data. For example, the camera may be based on at least one of the following sensors: a CCD sensor, a CMOS sensor, a near infrared (NIR) sensor, an infrared sensor (IR), and a device based on active illumination such as a LiDAR.

The HMD tracking module 27 is configured to calculate position of the HMD 15 relative to the compartment, based on measurements of a sensor. In different embodiments, the HMD tracking module 27 may have different configurations.

In one embodiment, the sensor comprises first and second Inertial Measurement Units (IMUs). In this embodiment, the first IMU is physically coupled to the HMD 15 and is configured to measure a position of the HMD 15, and the second IMU is physically coupled to the compartment and is configured to measure a position of the compartment. The HMD tracking module 27 is configured to calculate the position of the HMD 15 in relation to the compartment based on the measurements of the first and second IMUs.

In another embodiment, the sensor comprises an Inertial Measurement Unit (IMU) and a location measurement system. In this embodiment, the IMU is physically coupled to the HMD 15 and is configured to measure an orientation of the HMD 15. The location measurement system is physically coupled to the compartment and is configured to measure a location of the HMD in relation to the compartment. The HMD tracking module 27 is configured to calculate the position of the HMD 15 in relation to the compartment based on the measurements of the IMU and the location measurement system. Optionally, the location measurement system measures the location of the HMD 15 in relation to the compartment based on at least one of the following inputs: a video received from a camera that captures the HMD 15, a video received from a stereo vision system, measurements of magnetic fields inside the compartment, wireless triangulation measurements, acoustic positioning measurements, and measurements of an indoor positioning systems.

Figure 2:
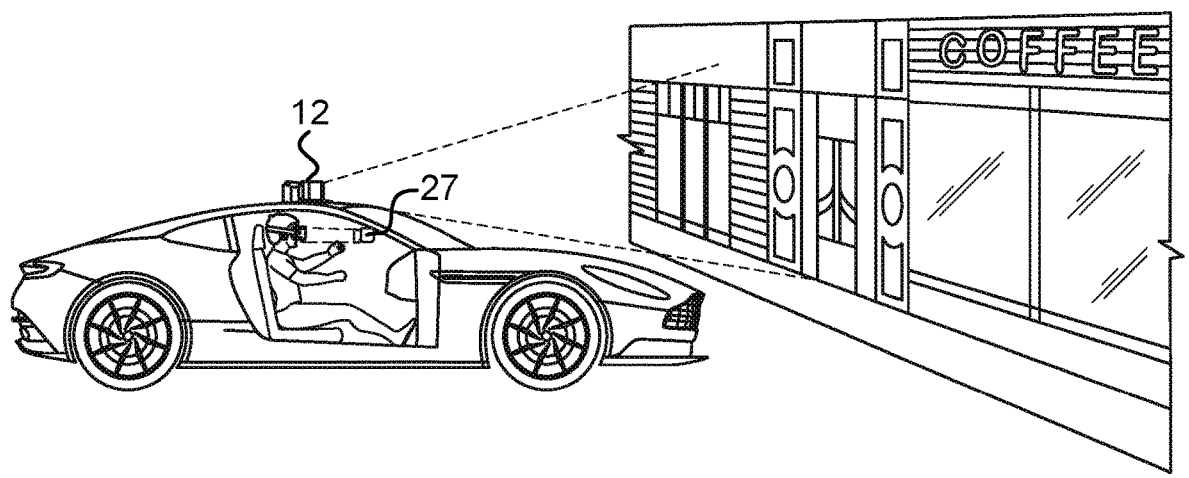
FIG. 2 illustrates an HMD tracking module that measures the position of the HMD relative to the compartment.

FIG. 2 illustrates one embodiment in which the HMD tracking module 27 is physically coupled to the compartment and is configured to measure the position of the HMD relative to the compartment. The HMD tracking module 27 may utilize a passive camera system, an active camera system that captures reflections of a projected grid, and/or a real-time locating systems based on microwaves and/or radio waves.

The computer 13 is configured to receive a location of a video see-through window (VSTW) in relation to the compartment, and to calculate, based on the position of the HMD relative to the compartment, a window-location for the VSTW on the HMD-video. The computer 13 is also configured to generate, based on the window-location and the $V_{out}$, the VST that represents a view of the outside environment from the point of view of the occupant. Optionally, the VST is rendered as a 3D video content. Additionally, the computer 13 is further configured to generate the HMD-video 16 based on combining the VUR with the VST in the window-location. The computer 13 may use various know in the art computer graphics functions and/or libraries to generate the VST, transform the VST to the occupant's point of view, render the 3D video content, and/or combine the VUR with the VST.

In one embodiment, the content of the VUR does not change when the occupant moves the head, and the content of the VUR is unrelated to the video taken by the camera. Additionally, the content of the VUR is generated based on data that was received more than 2 seconds before the HMD-video 16 is displayed to the occupant. Some examples of the VUR include a video stream of at least one of the following types of content: a recorded television show, a computer game, an e-mail, and a virtual computer desktop.

Figure 3:
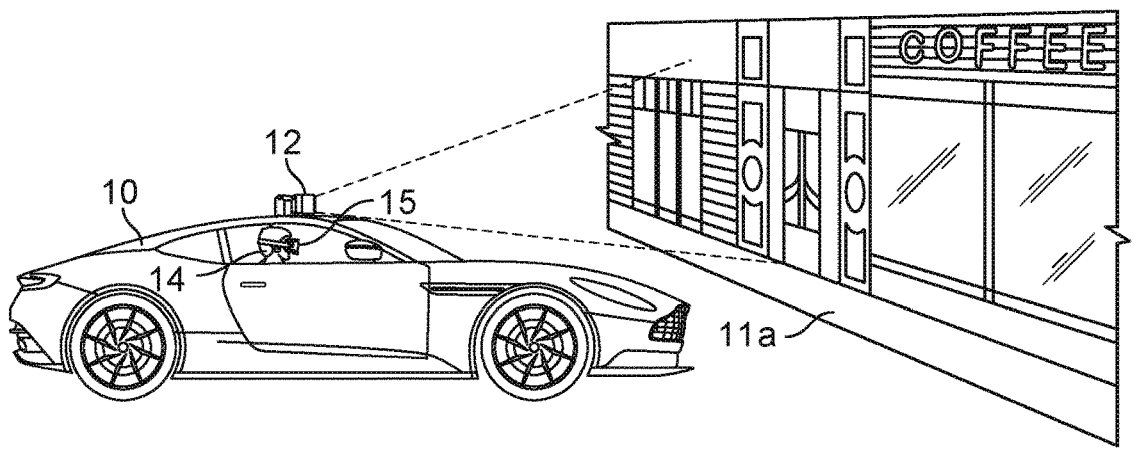
FIG. 3 illustrates a vehicle in which an occupant wears an HMD.

FIG. 3 illustrates one embodiment in which the occupant 14 wears an HMD 15. The HMD 15 provides video to the occupant 14 through the display of the HMD 15. The vehicle includes a camera 12 that takes video of the outside environment 11a and processes it in a manner suitable for the location of the occupant. The processed video is provided to the occupant's display in the HMD 15 as a VSTW and the position of the VSTW is calculated in relation to the compartment of the vehicle and moves with the compartment. While the vehicle is in motion, the VSTW change its content to represent the outside environment 11a of the vehicle. Whereas the video-unrelated-to-the-VST doesn't change when the occupant moves his head. The computer is configured to receive a location of a VSTW in relation to the compartment, and to calculate, based on the position of the occupant's head, a window-location for the VSTW on the video.

Figure 4:
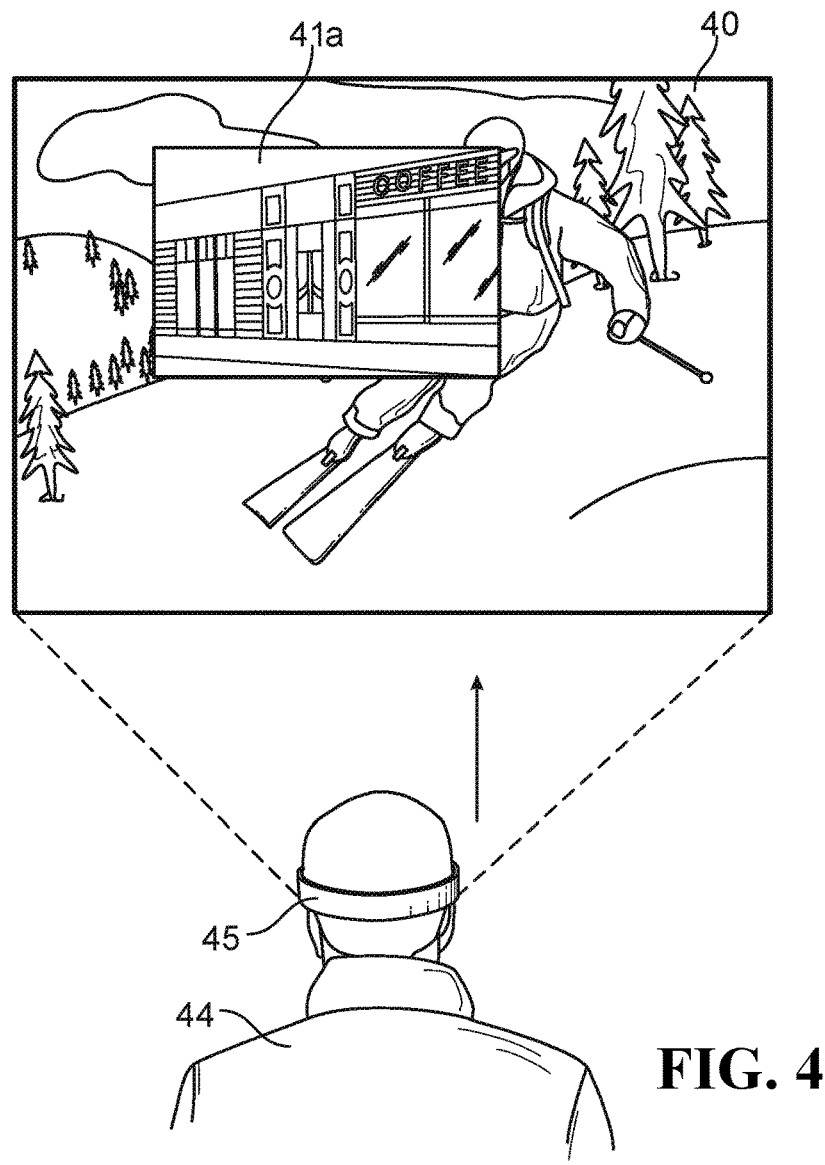
FIG. 4 illustrates an occupant wearing an HMD and viewing large VUR and smaller VST.

FIG. 4 illustrates one embodiment in which the occupant 44 wears HMD 45 and views large VUR 40 and smaller VST 41a. The VUR 40 does not change when the occupant's head 44 moves. The VSTW presents video of the street based on video taken by the camera that is mounted to the vehicle. The location of the video-see-through window in relation to the compartment does not change when the occupant 44 moves his/her head in order to imitate a physical window that does not change its position relative to the compartment when the occupant's head moves.

Figure 5B:
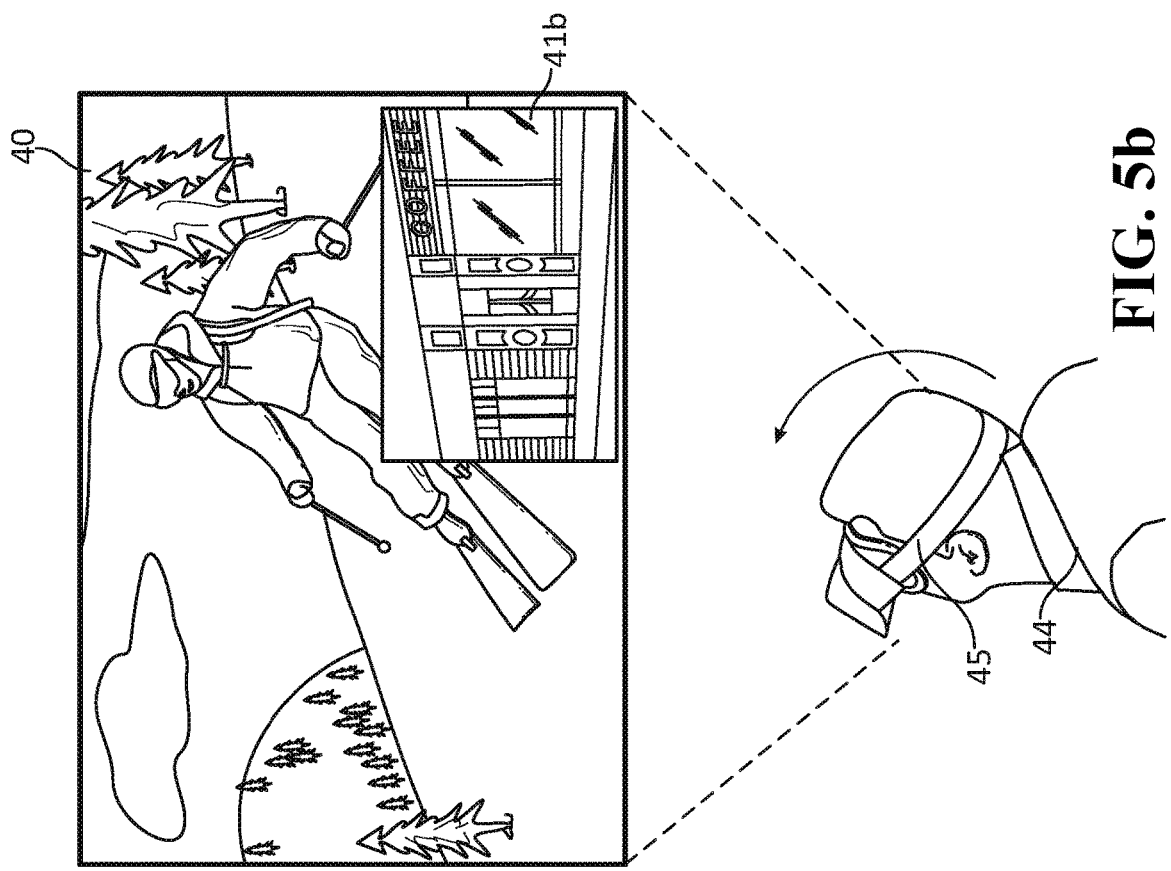
FIG. 5b illustrates how the VST moves to the bottom right when the occupant looks to the upper left.
Figure 5A:
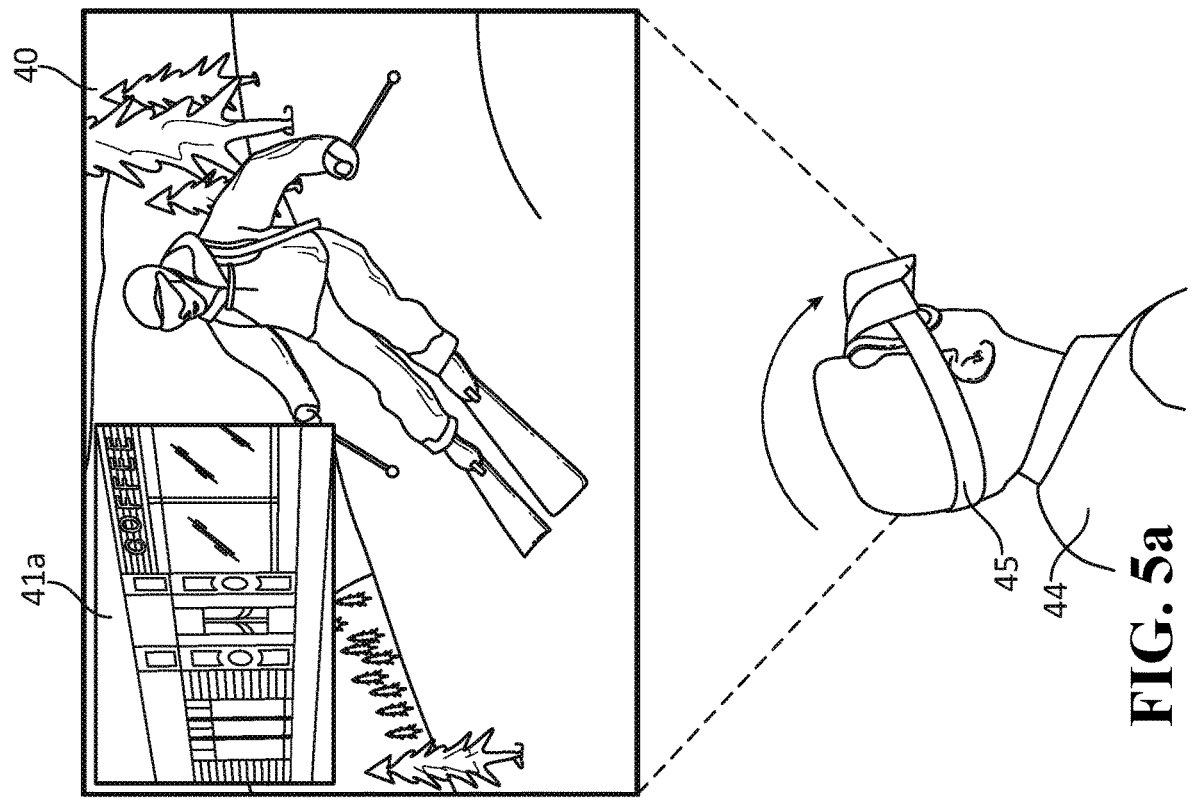
FIG. 5a illustrates how the VST moves to the upper left when the occupant looks to the bottom right.

FIG. 5a illustrates how, in one embodiment, the VST moves to the upper left when the occupant 44 looks to the bottom right. FIG. 5b illustrates how the VST moves to the bottom right when the occupant 44 looks to the upper left, while the VUR moves with the head. In both cases, the VUR moves with the head while the location of the VST changes according to the movement of the head relative to the compartment as measured by the HMD tracking module 27.

In some embodiments, the content of the VUR may be augmented-reality content, mixed-reality content, and/or virtual-reality content rendered to correspond to the occupant's viewing direction. In this embodiment, the VUR is unrelated to the video taken by the camera. In one example, the VUR may include a video description of a virtual world in which the occupant may be playing a game (e.g., represented by an avatar). Optionally, in this example, most of the features of the virtual world are different from the view of the outside of the vehicle (as seen from the occupant's viewing direction). For example, the occupant may be driving in a city, while the virtual world displays woods, a meadow, or outer space. In another example, the VUR may include augmented reality content overlaid above a view of the inside of the compartment.

In addition to the components described above, in some embodiments, the system may include a second camera that is mounted to the HMD and is configured to take video of the compartment ($V_{comp}$). In this embodiment, the computer is further configured to generate a compartment-video (CV), based on $V_{comp}$ and a location of a compartment-video window (CVW) in relation to the HMD-video (e.g., HMD-video 16), and to generate the HMD-video also based on the CV in the CVW, such that the HMD-video combines the VUR with the VST in the window-location and with the CV in the CVW. There are various ways in which the CVW may be incorporated into the HMD-video. Some examples of these approaches are illustrated in the following figures.

Figure 6:
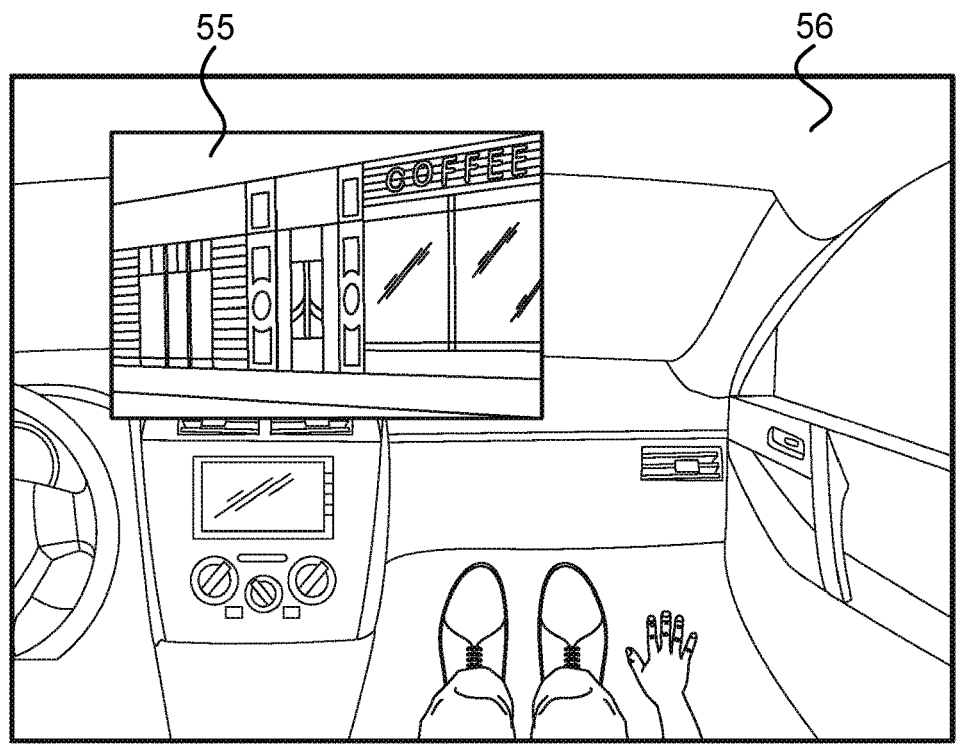
FIG. 6 illustrates HMD-video that includes both a non-transparent VST and video that shows the hands of the occupant and the interior of the compartment.
Figure 7:
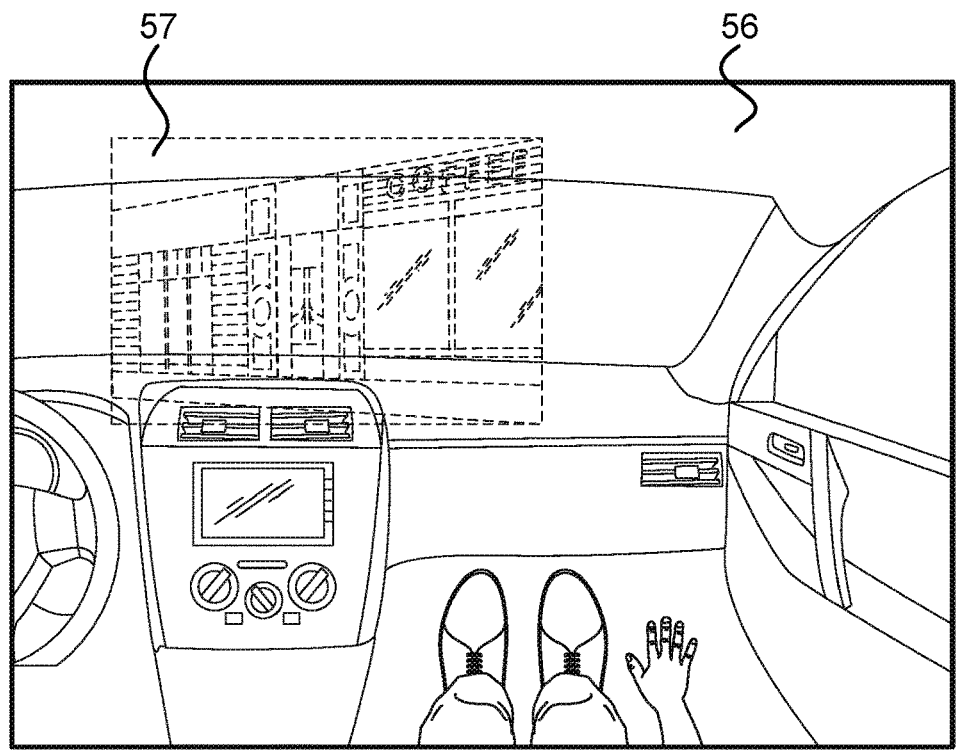
FIG. 7 illustrates HMD-video that includes both a partially transparent VST and video that shows the hands of the occupant and the interior of the compartment.
Figure 8:
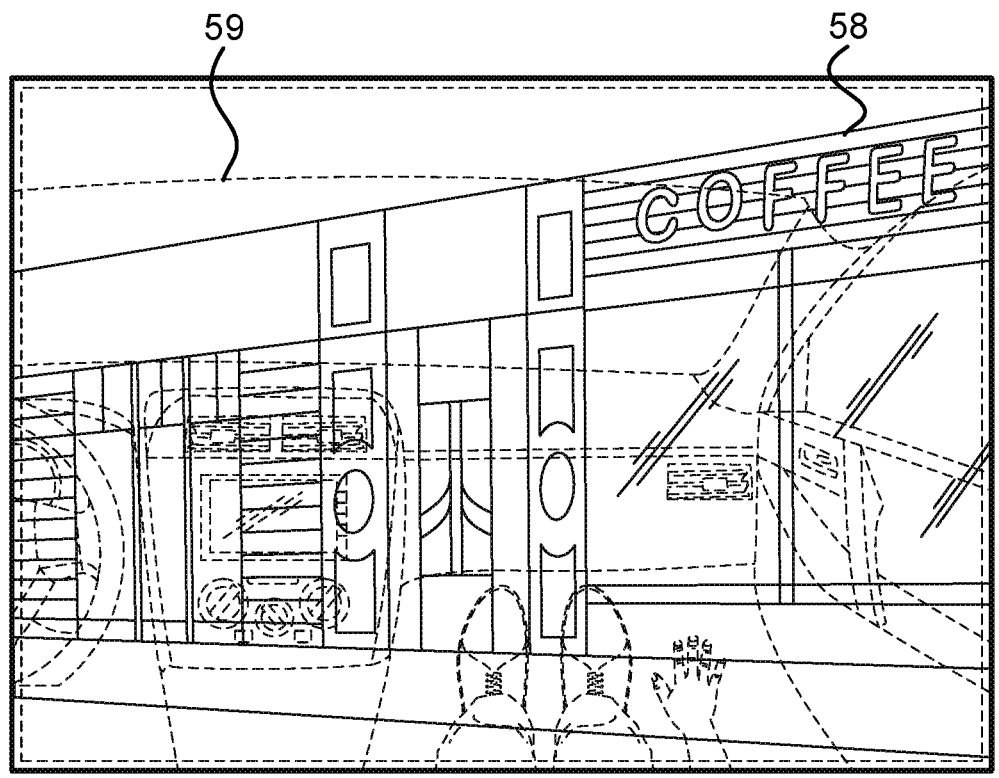
FIG. 8 illustrates HMD-video that includes a VST and partially transparent video that shows the hands of the occupant and the interior of the compartment.

FIG. 6 illustrates HMD-video that includes both a non-transparent VST 55 in the window-location and a CV 56 that shows the hands of the occupant and the interior of the compartment in the CVW. FIG. 7 illustrates HMD-video that includes both a partially transparent VST 57 in the window-location and the CV 56 that shows the hands of the occupant and the interior of the compartment in the CVW. FIG. 8 illustrates HMD-video that includes a VST 58 and partially transparent CV 59. The figure illustrates that the occupant sees the outside environment in full field-of-view (FOV), while on top of it there is a partially transparent image (illustrated as dotted image) of the compartment and the hands of the occupant, in order to help the occupant not to hit things in the compartment.

Figure 9A:
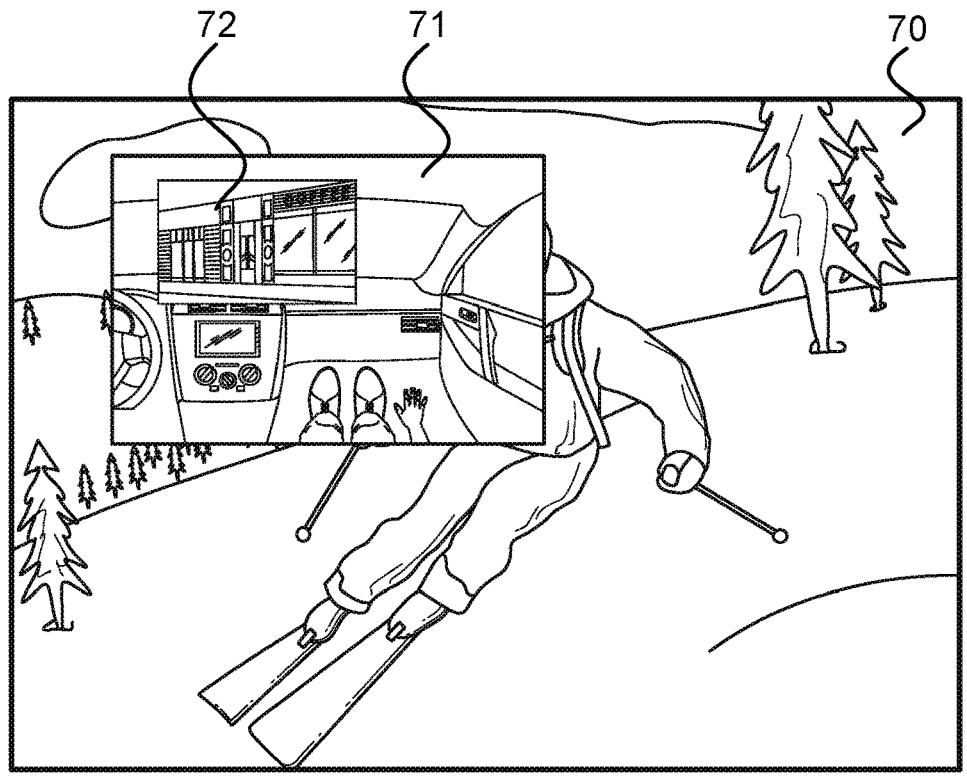
FIG. 9a illustrates HMD-video that includes a VUR in full FOV, a first window comprising compartment-video (CV) and a second smaller window comprising the VST.

FIG. 9a illustrates HMD-video that includes a VUR 70 in full FOV, a first window comprising the CV 71 in the CVW and a second smaller window comprising the VST 72 in the window-location.

Figure 9B:
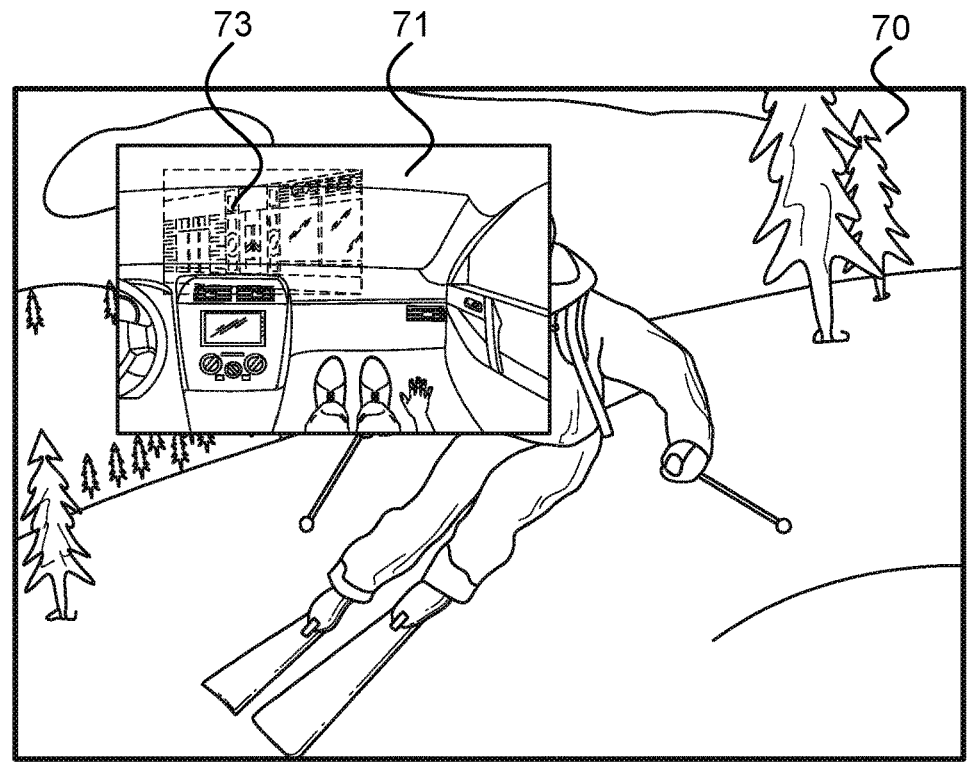
FIG. 9b illustrates HMD-video that includes VUR in full FOV, a first window comprising the CV and a second partially transparent smaller window comprising the VST.

FIG. 9b illustrates HMD-video that includes VUR 70 in full FOV, a first window comprising the CV 71 in the CVW and a second partially transparent smaller window comprising the VST 73 in the window-location.

Figure 10A:
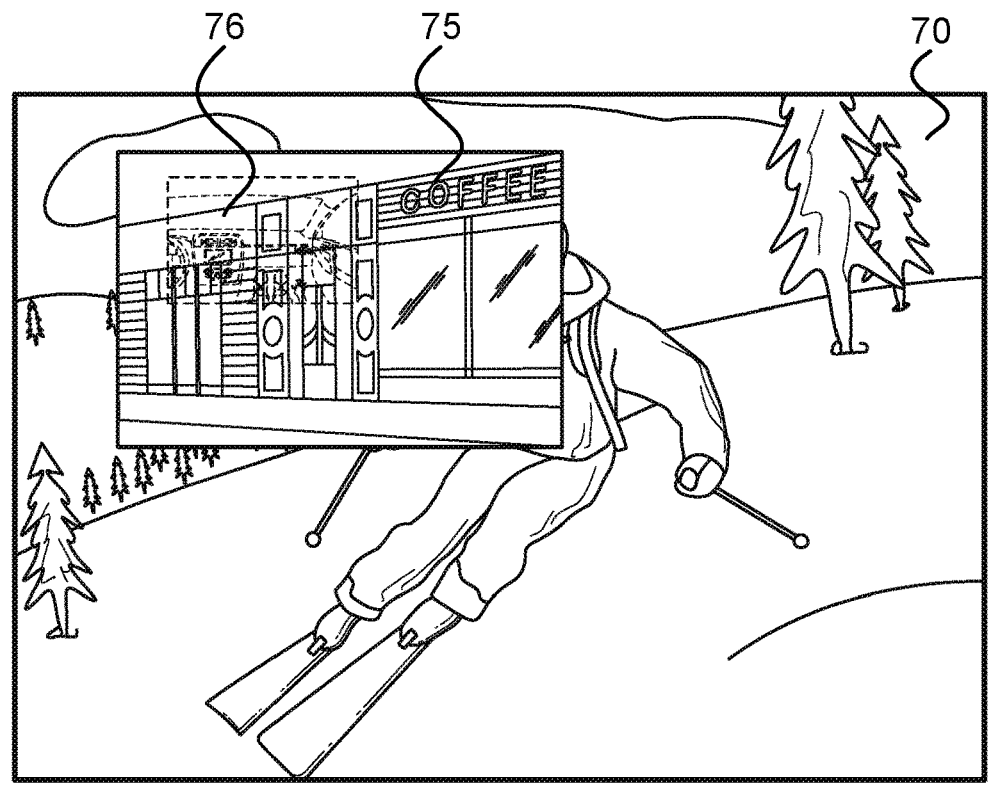
FIG. 10a illustrates HMD-video that includes VUR in full FOV, a first window comprising VST and a second smaller window comprising zoom out of the CV.

FIG. 10a illustrates HMD-video that includes VUR 70 in full FOV, a first window comprising VST 75 in the window-location and a second smaller window comprising zoom out of the CV 76 in the CVW. Optionally, the cabin view in the zoom out is smaller than in reality, and may enable the occupant to orient in the cabin. Optionally, the occupant may move the CVW, as illustrated in FIG. 10a where the zoom out of the CV in the CVW is somewhat above its location in reality.

Figure 10B:
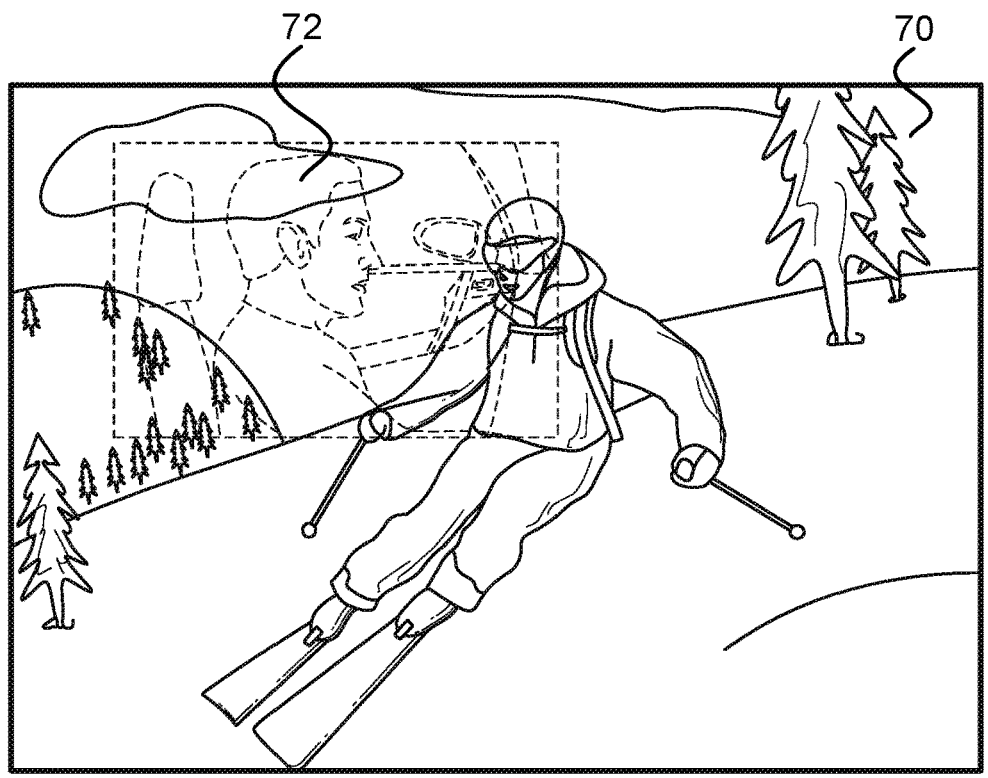
FIG. 10b illustrates HMD-video that includes VUR and a partially transparent CV.

FIG. 10b illustrates HMD-video that includes VUR 70 and a partially transparent CV 72. Here a first occupant sees the VUR in full field-of-view (FOV), and on top of it there is a partially transparent image of the compartment and a second occupant that sits to the left of the first occupant, which may help the first occupant not to hit the second occupant.

There may be various ways in which the system determines the location and/or size of the VSTW. In one embodiment, the VSTW is pinned to at least one of the following locations: a specific physical location and a location of an object in the compartment, such that the location of the VSTW in relation to the compartment does not change when the occupant moves his/her head with the HMD 15 as part of watching the HMD-video 16 and without commanding the VSTW to move in relation to the compartment.

In another embodiment, the system includes a user interface configured to receive a command from the occupant to move and/or resize the VSTW in relation to the compartment. In one example, the command is issued through a voice command (e.g., saying "move VST to the bottom"). In another example, the command may be issued by making a gesture, which is detected by a gesture control module in the compartment and/or on a device of the occupant (e.g., as part of the HMD). Optionally, in this embodiment, the computer is further configured to: update the window-location based on the command from the occupant, and generate an updated VST based on the updated window-location and the video taken by the camera. In this embodiment, the VST and the updated VST present different VSTW locations and/or dimensions in relation to the compartment. Optionally, the HMD is configured not to present any part of the VST to the occupant when the window-location is not in the field of view presented to the occupant through the HMD.

In yet another embodiment, the system may further include a video analyzer configured to identify an Object Of Interest (OOI) in the outside environment. For example, the OOI of interest may be a certain landmark (e.g., a building), a certain object (e.g., a store or a certain model of automobile), or a person. In this embodiment, the computer is further configured to receive, from the video analyzer, an indication of the position of the OOI, and to track the OOI by adjusting the window-location according to the movements of the vehicle, such that the OOI is visible via the VST. Optionally, the HMD is configured not to present any part of the VST to the occupant when the window-location is not in the field of view presented to the occupant through the HMD.

The VST that represents the view of the outside environment from the point of view of the occupant, in some embodiments, does not necessarily match the video taken by the cameras. In one embodiment, the VST may utilize image enhancement techniques to compensate for outside lighting conditions, to give an occupant an experience similar to looking out through a conventional vehicle window but without the view being distorted by raindrops or dirt on the window, and/or to improve the visual impression of the outside environment e.g. by showing background images which are different from those retrievable from the outside environment. Additionally or alternatively, the VST may mimic the outside environment, alter the outside environment, and/or be completely different from what can be seen on the outside environment. The VST may be focused on providing visual information that makes the travelling more fun. The vehicle may provide different styles of the outside environment to different occupants in the vehicle, such that a first VST provided to a first occupant may mimic the outside environment, while a second VST provided to a second occupant may alter the outside environment and/or be completely different from the outside environment, optionally for comfort enhancement and/or entertainment.

In some embodiments, the VST is informative, and aids at least some of the occupants to determine the location of the vehicle in the environment. In one embodiment, at least some of those occupants could not determine their location without the VST. In one example, less than 20% of average vehicle occupants, who are familiar with the outside environment, are able to determine their real location in the outside environment by watching the VUR, without using a map, with a margin of error that is less than 100 meters, and while the vehicle travels; while more than 20% of the average vehicle occupants, who are familiar with the outside environment, are able to determine their real location in the outside environment by watching the VST, without using a map, and with a margin of error that is less than 100 meters, and while the vehicle travels.

Figure 11A:
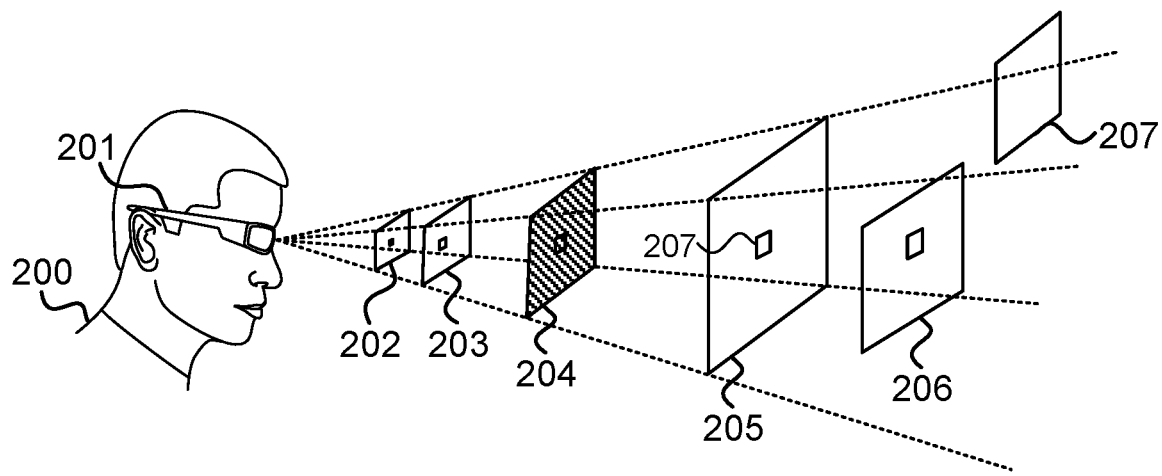
FIG. 11a illustrates a FOV of a vehicle occupant when the occupant wears an HMD that presents HMD-video.

FIG. 11a illustrates a FOV in the context of presented video and terminology used herein. The vehicle occupant 200 wears an HMD 201 that presents HMD-video (such as HMD-video 16). The HMD-video may be presented at a single focal plane, or at multiple focal planes, depending on the characteristics of the HMD 201 (when the occupant focuses on a certain focal plane, then his/her point of gaze is said to be on the certain focal plane). In addition, the presented objects may be two-dimensional (2D) virtual objects and/or three-dimensional (3D) virtual objects that may also be referred to as holographic objects. Element 204 represents the location of a nontransparent element fixed to the vehicle compartment. In one example, the HMD 201 is a holographic HMD, such as Microsoft HoloLens, which can present content displayed on a series of focal planes that are separated by some distance. The virtual objects may be presented before the nontransparent element (e.g., polygons 202, 203), essentially on the nontransparent element 204, and/or beyond the nontransparent element (e.g., polygons 205, 206). As a result, the occupant's gaze distance may be shorter than the distance to the nontransparent element (e.g., distance to polygons 202, 203), essentially equal to the distance to the nontransparent element 204, and/or longer than the distance to the nontransparent element (e.g., distance to polygons 205, 206). Polygon 207 represents a portion of the presented video at eye level of the vehicle occupant, which in one example is within ±7 degrees from the horizontal line of sight. Although the figure illustrates overlapping FOVs of polygons 202, 203, 204, and 205, the HMD may show different objects, capturing different FOVs, at different focal planes. In one example, the HMD may project an image throughout a portion of, or all of, a display volume. Further, a single object such as a vehicle could occupy multiple volumes of space.

According to the terminology used herein, the nontransparent element 204 is said to be located on FOV overlapping the FOV of polygons 205 and 203 because polygons 203, 204, 205 share the same FOV. FOV of polygon 206 is contained in the FOV of polygon 204, and FOV of polygon 207 intersects the FOV of polygon 204. FOV of polygon 203 is before the nontransparent element 204 and therefore may hide the nontransparent element 204 partially or entirely, especially when utilizing a multi-focal plane HMD.

Figure 11B:
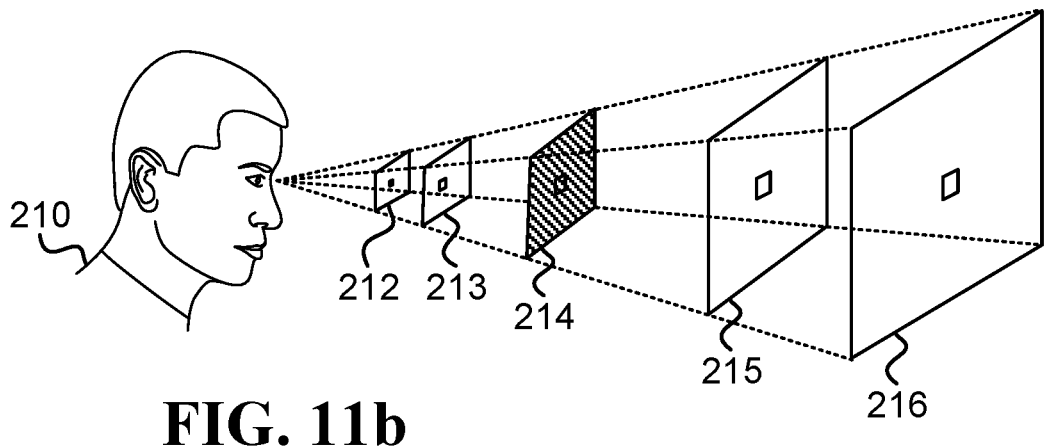
FIG. 11b illustrates a FOV of a vehicle occupant when the vehicle occupant does not wear an HMD that presents the video, such as when watching an autostereoscopic display.

FIG. 11b illustrates a FOV in the context of the presented video, where the vehicle occupant 210 does not wear an HMD that presents the video, such as when watching an autostereoscopic display. The autostereoscopic display is physically located on plane 214 and the presented video may be presented at a single focal plane, or at multiple focal planes, depending on the characteristics of the autostereoscopic display. In one example, the autostereoscopic display is a holographic display, such as SeeReal Technologies holographic display, where the presented video may present virtual objects before the focal plane of the autostereoscopic display (e.g., planes 212, 213), essentially on the focal plane of the autostereoscopic display 214, and/or beyond the focal plane of the autostereoscopic display (e.g., planes 215, 216). As a result, the occupant's gaze distance may be shorter than the distance to the autostereoscopic display (e.g., planes 212, 213), essentially equal to the distance to the autostereoscopic display 214, and/or longer than the distance to the autostereoscopic display (e.g., planes 215, 216). The term "autostereoscopic" includes technologies such as automultiscopic, glasses-free 3D, glassesless 3D, parallax barrier, integral photography, lenticular arrays, Compressive Light Field Displays, holographic display based on eye tracking, color filter pattern autostereoscopic display, volumetric display that reconstructs light field, integral imaging that uses a fly's-eye lens array, and/or High-Rank 3D (HR3D).

Figure 11C:
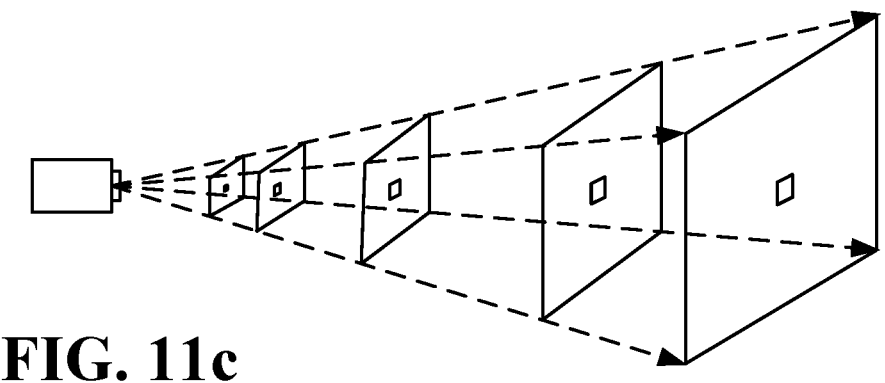
FIG. 11c illustrates FOV of a 3D camera that is able to capture sharp images from different focal lengths.

FIG. 11c illustrates FOV of a 3D camera that is able to capture sharp images from different focal lengths.

In some embodiments, the vehicle and/or the HMD utilize at least one Inertial Measurement Unit (IMU), and the system utilizes an Inertial Navigation System (INS) to compensate imperfections in the IMU measurements. An INS typically has one or more secondary navigation sensors that provide direct measurements of the linear velocity, position and/or orientation of the vehicle. These secondary navigation sensors could be anything from stereo vision systems, to GPS receivers, to digital magnetic compasses (DMCs) or any other type of sensor that could be used to measure linear velocity, position and/or orientation. In one example, the information from these secondary navigation sensors is incorporated into the INS using an Extended Kalman Filter (EKF). The EKF produces corrections that are used to adjust the initial estimations of linear velocity, position and orientation that are calculated from the imperfect IMU measurements. Adding secondary navigation sensors into an INS can increase its ability to produce accurate estimations of the linear velocity, position and orientation of the vehicle over long periods of time.

In one embodiment, the system utilizes domain specific assumptions in order to reduce drift of an INS used to calculate the HMD spatial position in relation to the compartment. More specifically, the following methods may be used to reduce or correct drift. Such methods generally fall in the categories of using sensor fusion and/or domain specific assumptions.

(i) Sensor fusion refers to processes in which signals from two or more types of sensors are used to update and/or maintain the state of a system. In the case of INS, the state generally includes the orientation, velocity and displacement of the device measured in a global frame of reference. A sensor fusion algorithm may maintain this state using IMU accelerometer and gyroscope signals together with signals from additional sensors or sensor systems. There are many techniques to perform sensor fusion, such as Kalman filter and particle filter.

One example of periodically correcting drift is to use position data from a triangulation positioning system relative to the compartment. Such systems try to combine the drift free nature of positions obtained from the triangulation positioning system with the high sampling frequency of the accelerometers and gyroscopes of the IMU. Roughly speaking, the accelerometer and gyroscope signals are used to 'fill in the gaps' between successive updates from the triangulation positioning system.

Another example of reducing the drift is using a vector magnetometer that measures magnetic field strength in a given direction. The IMU may contain three orthogonal magnetometers in addition to the orthogonal gyroscopes and accelerometers. The magnetometers measure the strength and direction of the local magnetic field, allowing the north direction to be found.

(ii) In some embodiments, it is possible to make domain specific assumptions about the movements of the occupant and/or the vehicle. Such assumptions can be used to minimize drift. One example in which domain specific assumptions may be exploited is the assumption that when the vehicle accelerates or decelerates significantly, the HMD accelerates or decelerates essentially the same as the vehicle, allowing HMD drift in velocity to be periodically corrected based on a more accurate velocity received from the autonomous-driving control system of the vehicle. Another example in which domain specific assumptions may be exploited is the assumption that when the vehicle accelerates or decelerates significantly, the HMDs of two occupants travelling in the same vehicle accelerate or decelerate essentially the same, allowing HMD drifts to be periodically corrected based on comparing the readings of the two HMDs. Still another example in which domain specific assumptions are exploited is the assumption that the possible movement of an HMD of a belted occupant is most of the time limited to a portion of the compartment, allowing HMD drifts to be periodically corrected based on identifying when the HMD exceeds beyond that portion of the compartment.

In one example, it may be desirable to adjust the position of displaying a virtual object in response to relative motion between the vehicle and the HMD so that the virtual object would appear stationary in location. However, the HMD IMU may indicate that the HMD is moving even when the detected motion is a motion of the vehicle carrying the HMD. In order to distinguish between motion of the HMD caused by the vehicle and motion of the HMD relative to the vehicle, non-HMD sensor data may be obtained by the HMD from sensor such as an IMU located in the vehicle and/or the GPS system of the vehicle, and the motion of the vehicle may be subtracted from the motion of the HMD in order to obtain a representation of the motion of the HMD relative to the vehicle. By differentiating movements of the HMD caused by the occupant motion compared to movements caused by the vehicle motion, the rendering of the virtual object may be adjusted for the relative motion between the HMD and the vehicle.

Using the nontransparent element, instead of a transparent glass window that provides the same FOV to the outside environment, may provide various benefits, such as: (i) reduced manufacturing cost of the vehicle compared to a similar vehicle having instead of the nontransparent element a transparent glass window that provides the same FOV to the outside environment as provided by the 3D display device, (ii) reduced weight of the vehicle compared to a similar vehicle having instead of the nontransparent element a transparent glass window that provides the same FOV to the outside environment as provided by the 3D display device, and provides the same safety level, (iii) better aerodynamic shape and lower drag for the vehicle, which results in an improved energy consumption, and (iv) improved privacy for the occupant as a result of not enabling an unauthorized person standing nearby the vehicle to see the occupant directly.

The term "real-depth VST window (VSTW)" is defined herein as an imaging display that shows a 3D image of an outside environment located beyond a wall that interrupts the occupant's unaided view of the outside environment. The real-depth VSTW has the following characteristics: (i) the 3D image corresponds to a FOV to the outside environment beyond the wall, as would have essentially been seen by the occupant had the wall been removed; (ii) the outside environment is captured by a camera, and the rendering of the 3D image is based on images taken by the camera; and (iii) while looking via the imaging display, the occupant's point of gaze (where one is looking) is most of the time beyond the wall that interrupts the occupant's unaided view of the outside environment.

A possible test to determine whether "(i) the 3D image corresponds to a FOV to the outside environment beyond the wall, as would have essentially been seen by the occupant had the wall been removed" is whether an imaginary user standing beyond the wall, watching both the real-depth VSTW and the outside environment, would recognize that at least 20% of the contours of objects in the 3D image correspond to the contours of the objects seen on the outside environment. Differences between the colors of the corresponding objects in the 3D image and the outside environment usually do not affect the criterion of the 20% corresponding contours, as long as the color difference does not affect the perception of the type of object. For example, different skin colors to corresponding people in the 3D image and the outside environment do not violate the criterion of the 20% corresponding contours. As another example, differences in the weight and/or height of corresponding objects in the 3D image and the outside environment do not violate the criterion of the 20% corresponding contours as long as the imaginary user understands that the objects correspond to the same person.

Sentences such as "from the FOV of the occupant" are to be interpreted as no more than 20 degrees angular deviation from the field of view of the occupant to the outside environment. Zoom in/out does not affect the FOV as long as the average occupant would still recognize the rendered environment as the 3D VST. For example, zoom in of up to ×4, which maintains no more than 20 degrees angular deviation from the FOV of the occupant to the outside environment, is still considered "from the FOV of the occupant". Reasonable lateral deviation essentially does not affect the FOV as long as the average occupant would still recognize the rendered environment as the 3D VST. For example, displaying to the occupant the outside environment from the FOV of a camera located on the roof of the occupant's vehicle, is still considered as showing the outside environment from the occupant's FOV.

A possible test to determine whether "(ii) the outside environment is measured by a camera, and the images taken by the camera are used to render the 3D image" is whether the real-depth VSTW would display a different 3D VST when it does not receive the images taken by the camera. For example, assuming the camera is a 3D video camera, and the 3D image is a manipulation of the images taken by the 3D video camera; then, when the real-depth VSTW does not receive the images, it cannot show the changes that are taking place in the outside environment. As another example, assuming the 3D image is mainly rendered from cached data stored in a database, and the camera is used to provide the setup of objects that behave in an unknown way, such as trajectories of nearby vehicles on the road, or a gesture of a person walking beyond the wall; then, when the output of the camera is used to render the 3D image, the real-depth VSTW would represent the unknown trajectory of the nearby vehicles or the unknown gesture of the person, while when the output of the camera is not used to render the 3D image, the real-depth VSTW would not represent the unknown trajectory of the nearby vehicles or the unknown gesture of the person merely because the renderer does not have that data.

A possible test to determine whether "(iii) the occupant's point of gaze (where one is looking) is most of the time beyond the wall that interrupts the occupant's unaided view of the outside environment" includes the following steps: (a) use eye tracker to determine the point of gaze on a representative scenario, (b) measure the distance to the wall, and (c) determine whether the average gaze distance is longer than the distance to the wall.

Some aspects of this disclosure involve a system that utilizes window shading of a vehicle window in order to improve the quality of video viewed by an occupant of the vehicle who wears a head-mounted display (HMD).

In one embodiment, an autonomous on-road vehicle includes a system configured to enable an HMD to cooperate with a window light shading module. This embodiment involves a light shading module, a camera, a processor, and the HMD. The light shading module is integrated with a vehicle window and is configured to be in at least one of first and second states. In the first state the Visible Light Transmittance (VLT) of the vehicle window is above 10% of ambient light entering through the window, in the second state the VLT of the vehicle window is below 50% of ambient light entering through the window, and the VLT of the vehicle window in the first state is higher than the VLT of the vehicle window in the second state. The camera is fixed to the vehicle and configured to take video of the outside environment. The processor is configured to generate, based on the video, a video see-through (VST) that represents the outside environment from a point of view of an occupant looking to the outside environment through at least a portion of the vehicle window. The HMD comprises an optical see-through component and a display component; the HMD is configured to operate according to a first mode of operation when the occupant looks at the direction of the vehicle window and the light shading module is in the first state, and to operate according to a second mode of operation when the occupant looks at the direction of the vehicle window and the light shading module is in the second state. Wherein the total intensity of the VST light, emitted by the display component and reaching the occupant's eyes, is higher in the second mode than in the first mode.

Figure 12:
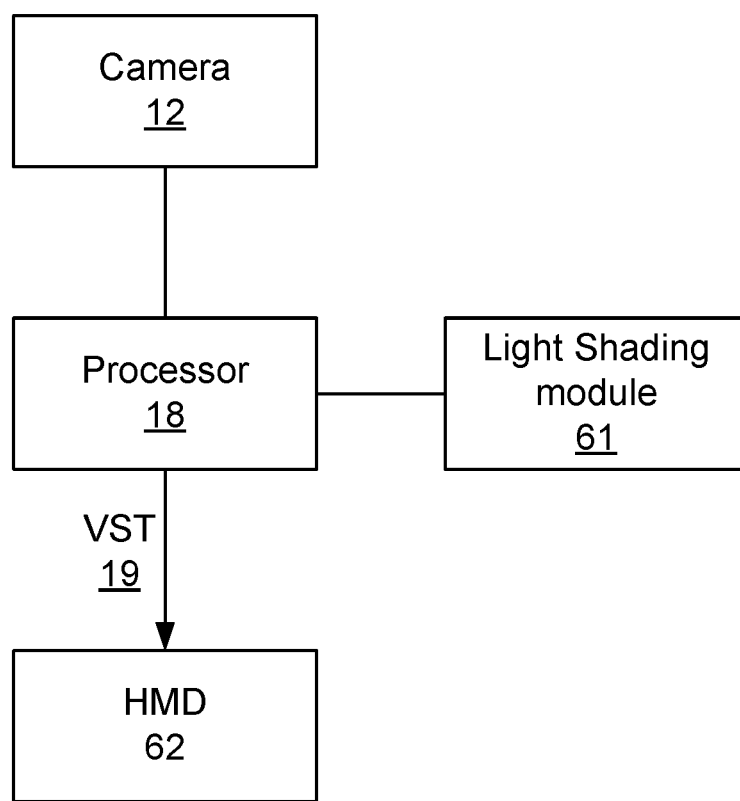
FIG. 12 is a schematic illustration of components of a system configured to enable an HMD to cooperate with a window light shading module.

In one embodiment, a system configured to enable a head-mounted display (HMD) to cooperate with a window light shading module of an autonomous on-road vehicle includes at least the following elements: the HMD 62, a light shading module 61, a camera (such as camera 12), and a processor 18. FIG. 12 is a schematic illustration of at least some of the relationships between the system elements mentioned above.

The light shading module 61 is integrated with a vehicle window and is configured to be in at least one of first and second states. Optionally, the light shading module 61 covers more than half of the front windshield in the second state. In one embodiment, in the first state, the Visible Light Transmittance (VLT) of the vehicle window is above 10% of ambient light entering through the window, and in the second state, the VLT of the vehicle window is below 50% of ambient light entering through the window. Additionally, the VLT of the vehicle window in the first state is higher than the VLT of the vehicle window in the second state. In another embodiment, in the first state the VLT of the vehicle window is above 70% of ambient light entering through the window, and in the second state, the VLT of the vehicle window is below 30% of ambient light entering through the window.

Herein, "ambient light" in the context of a vehicle refers to visible light that is not controlled by the vehicle, such as light arriving from: the sun, lights of other vehicles, street/road lighting, and various reflections from elements such as windows.

In some embodiments, utilizing the light shading module 61 may improve the quality of images viewed via the HMD 62 when the light shading module 61 is in the second state. Optionally, the perceived contrast of the optical see-through component is better when the light shading module is in the second state compared to when the light shading module 61 is in the first state.

Figure 13A:
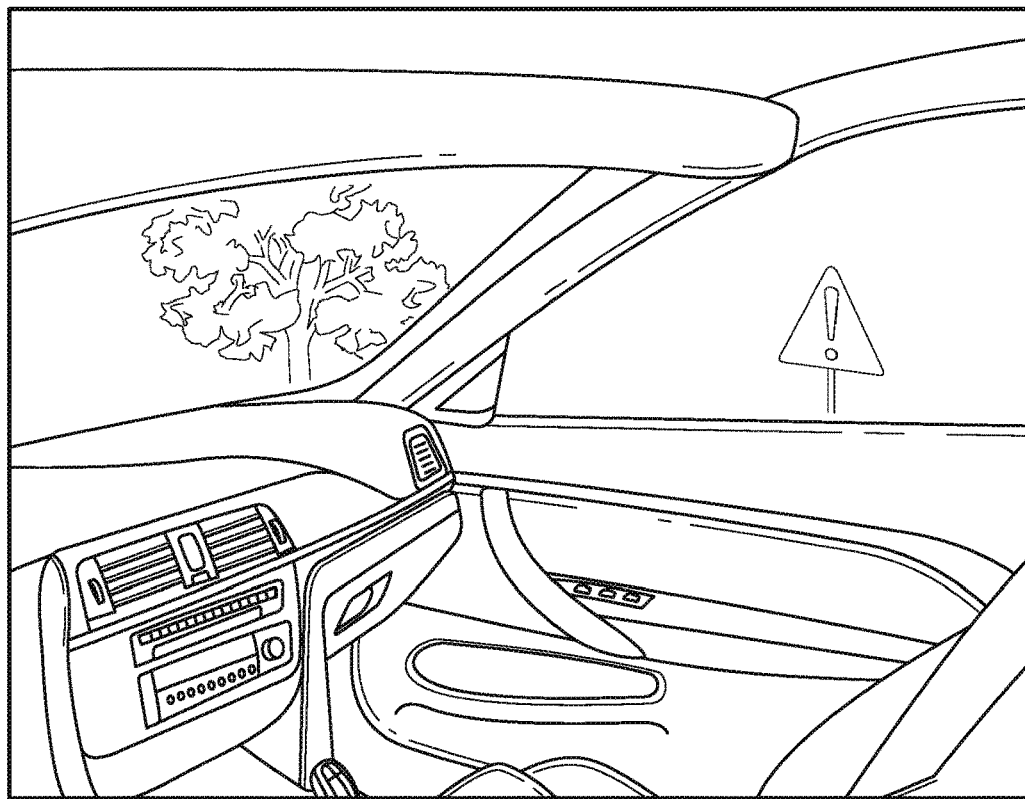
FIG. 13a illustrates a first mode for a shading module where an occupant sees the outside environment through the optical see-through component.
Figure 13B:
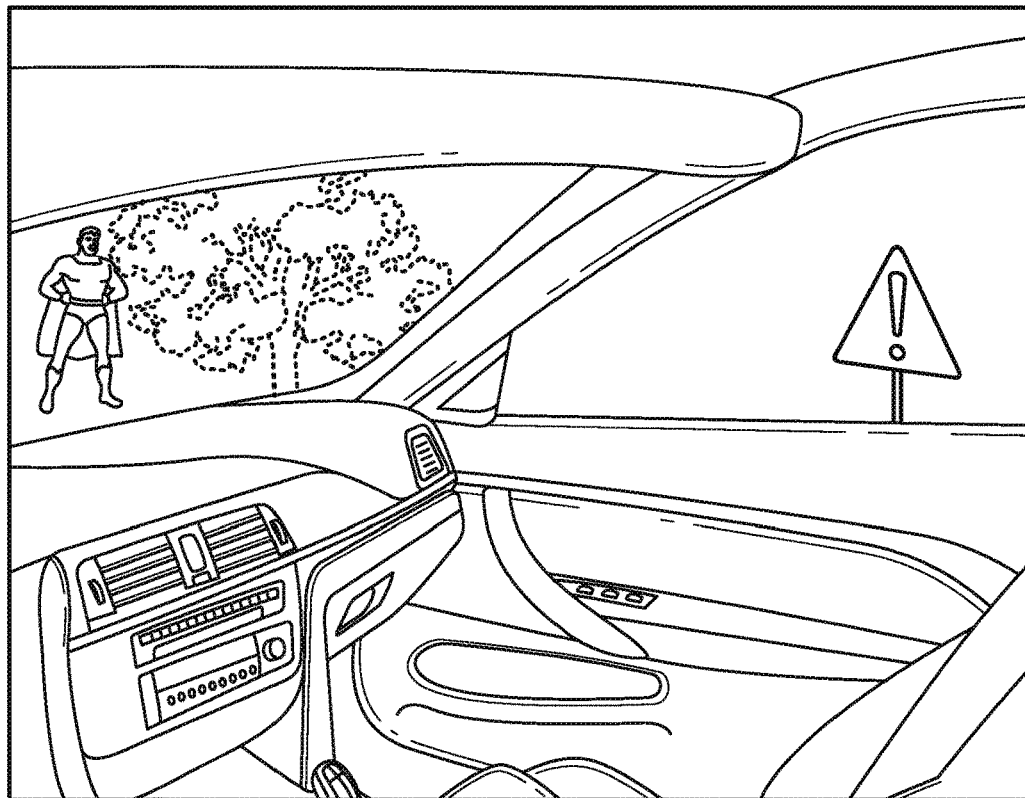
FIG. 13b illustrates a second mode for a shading module where the occupant sees the outside environment through a VST.

Various types of light shading modules may be utilized in embodiments described herein. In one embodiment, the light shading module 61 is a movable physical element configured to reduce the intensity of the ambient light entering into the vehicle compartment through the vehicle window. Optionally, the light shading module is unfurled on the inside of the compartment in order to block at least 50% of the ambient light intensity. Optionally, the light shading module is unfurled on the outside of the compartment in order to block at least 50% of the ambient light intensity. FIG. 13a illustrates a first mode where the occupant sees the outside environment through the optical see-through component. This figure illustrates the view that the occupant sees when looking outside through the window. FIG. 13b illustrates a second mode where the occupant sees the outside environment through the VST. In this example, the outside environment is a bit different, and there is also a virtual Superman floating near the tree.

Figure 14:
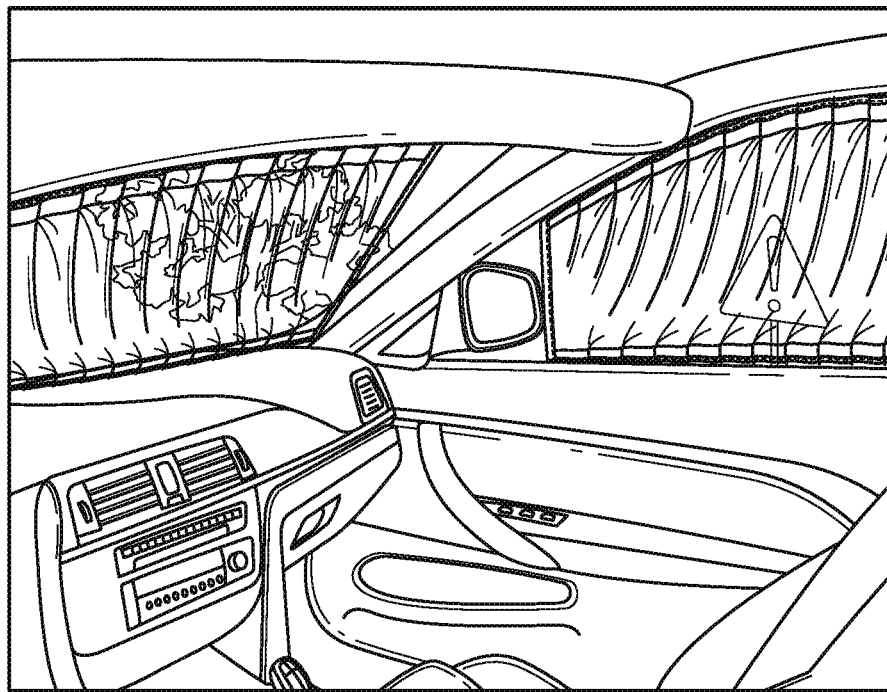
FIG. 14 illustrates a VST over a curtain.
Figure 15:
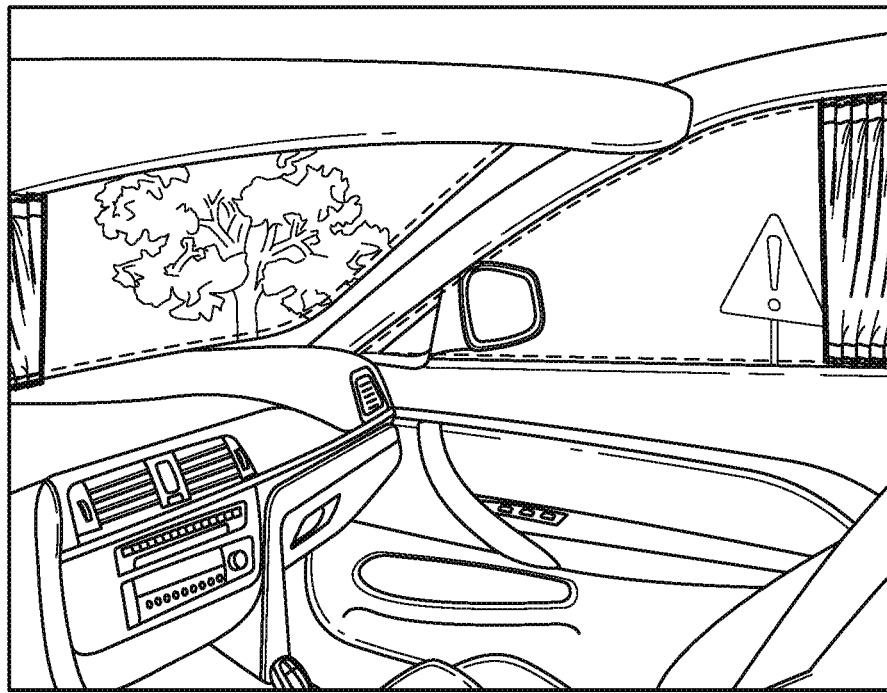
FIG. 15 illustrates a light shading module that is unfurled on the inside of the compartment.
Figure 16:
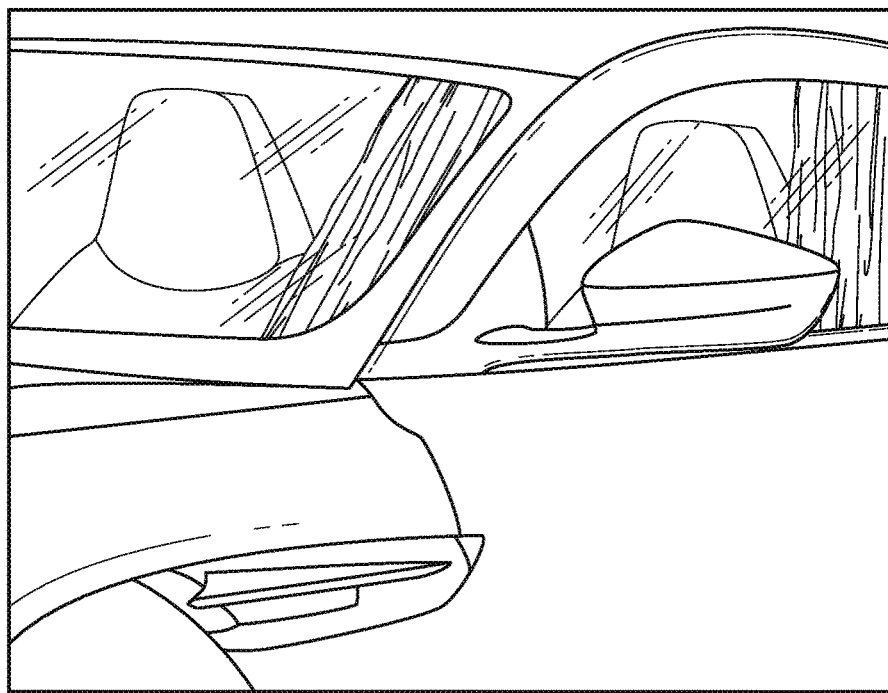
FIG. 16 illustrates a light shading module that is unfurled on the outside of the compartment.

In another embodiment, the light shading module 61 may be a curtain. FIG. 14 illustrates a VST over a curtain. FIG. 15 illustrates a light shading module that is unfurled on the inside of the compartment. FIG. 16 illustrates a light shading module that is unfurled on the outside of the compartment.

And in yet another embodiment, the vehicle window is made of a material that is able to serve as the light shading module 61 by changing its transparency properties.

The camera is fixed to the vehicle, and configured to take video of the outside environment. For example, the camera may be based on at least one of the following sensors: a CCD sensor, a CMOS sensor, a near infrared (NIR) sensor, an infrared sensor (IR), and a device based on active illumination such as a LiDAR.

The processor is configured to generate, based on the video, a video see-through (VST 19) that represents the outside environment from a point of view of an occupant looking to the outside environment through at least a portion of the vehicle window. Optionally, the processor is further configured not to generate the VST 19 when the HMD 62 operates in the first mode.

The HMD 62 comprises an optical see-through component and a display component. Optionally, the HMD 62 is configured to operate according to a first mode of operation when the occupant looks at the direction of the vehicle window and the light shading module 61 is in the first state, and to operate according to a second mode of operation when the occupant looks at the direction of the vehicle window and the light shading module 61 is in the second state. The total intensity of the VST light, emitted by the display component and reaching the occupant's eyes, is higher in the second mode than in the first mode.

In one embodiment, in the first mode, intensity of light that reaches the occupant's eyes via the optical see-through component is higher than intensity of light from the VST that is emitted by the display component and reaches the occupant's eyes. And in the second mode, the intensity of light from the environment that reaches the occupant's eyes via the optical see-through component is lower than the intensity of light from the VST that is emitted by the display component and reaches the occupant's eyes. In one example, the total intensity of VST light, emitted by the display component and reaching the occupant's eyes, is at least 50% higher in the second mode than in the first mode. In some embodiments, the display component may be based on a digital display that produces the virtual image (such as in Oculus rift), direct retina illumination (such as in Magic Leap), or other methods that are capable of producing the virtual image.

In one embodiment, the system described above optionally includes an occupant tracking module configured to calculate the point of view of the occupant based on measurements of a sensor. Optionally, the occupant tracking module is the HMD tracking module 27. Optionally, in this embodiment, the processor is further configured to render the VST based on data received from the occupant tracking module. Optionally, the display is a three dimensional (3D) display configured to show the occupant the VST, such that point of gaze of the occupant, while looking via the 3D display device, is most of the time beyond the location of the light shading module 61.

In some embodiments, an occupant of a vehicle may have the opportunity to view video see-through (VST), which is video generated based on video of the environment outside the vehicle. VST can often replace the need to look out of a window (if the vehicle has windows). Some examples of scenarios in which VST may be available in a vehicle include a windowless vehicle, a vehicle with shaded windows having VLT below 30%, and/or when the occupant wears a VR headset. While traveling in such a vehicle, the occupant may benefit from gaining a view to the outside environment when an unexpected driving event occurs. By being made aware of the event, the occupant is less likely to be surprised, disturbed, and/or distressed by the event.

While traveling in a vehicle, an occupant of the vehicle may not always be aware of the environment outside and/or of what actions the vehicle is about to take (e.g., breaking, turning, or hitting a speedbump). Thus, if such an event occurs without the occupant being aware that it is about to happen, this may cause the occupant to be surprised, disturbed, distressed, and even physically thrown off balance (in a case where the event involves a significant change in the balance of the physical forces on the occupant). This type of event is typically referred to herein as a Sudden Decrease in Ride Smoothness (SDRS) event. Some examples of SDRS events include at least one of the following events: hitting a speed bump, driving over a pothole, climbing on the curb, making a sharp turn, a hard breaking, an unusual acceleration (e.g., 0-100 km/h in less than 6 seconds), and starting to drive after a full stop.

In some embodiments, an SDRS event takes place at least 2 minutes after starting to travel and it is not directly related to the act of the starting to travel. Additionally, the SDRS event takes place at least 2 minutes before arriving to the destination and is not directly related to the act of arriving at the destination. In one example, a sentence such as "an SDRS event is imminent" refers to an SDRS event that is: (i) related to traveling in the vehicle, and (ii) expected to happen in less than 30 seconds, less than 20 seconds, less than 10 seconds, or less than 5 seconds. In another example, a sentence such as "an SDRS event is imminent" may refer to an event that starts at that instant, or is about to start within less than one second.

Figure 17:
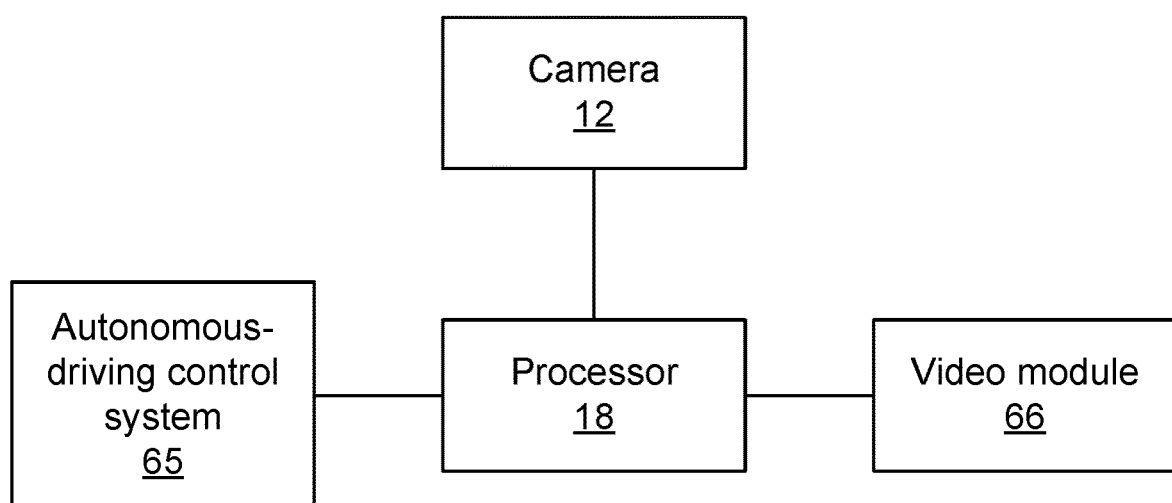
FIG. 17 is a schematic illustration of components of a video system that may be used to increase awareness of an occupant of a vehicle regarding an imminent SDRS.

The following is a description of an embodiment of a video system that may be used to increase awareness of an occupant of a vehicle regarding an imminent SDRS. In one embodiment, a video system for an autonomous on-road vehicle includes at least autonomous-driving control system 65, a camera (such as camera 12), a processor (such as processor 18), and video module 66. FIG. 17 is a schematic illustration of at least some of the relationships between the system elements mentioned above.

The autonomous-driving control system 65 is configured to generate, based on trajectory of the vehicle and information about the road, an indication indicative of whether a Sudden Decrease in Ride Smoothness (SDRS) event is imminent. Optionally, the autonomous-driving control system 65 receives at least some of the information about the road from at least one of the following sources: sensors mounted to the vehicle, sensors mounted to nearby vehicles, an autonomous-driving control system 65 used to drive a nearby vehicle, and a database comprising descriptions of obstacles in the road that are expected to cause intense movement of the vehicle. In one example, the database comprising the descriptions of the obstacles includes one or more of the following types of data: locations of speed bumps, locations of potholes, locations of stop signs, and locations of sharp turns in the road.

In one embodiment, the autonomous-driving control system 65 is configured to generate the indication indicative of whether an SDRS event is imminent based on at least one of the following configurations: (i) the autonomous-driving control system 65 receives images of the road from a camera, and calculates the indication based on the vehicle trajectory and image analysis of the images, (ii) the autonomous-driving control system 65 receives from a radar reflections of electromagnetic waves from the road, and calculates the indication based on the vehicle trajectory and signal processing of the reflections, and (iii) the autonomous-driving control system 65 receives a notification from a detailed road map, and calculates the indication based on the vehicle trajectory and the notification.

The camera, which is mounted to the vehicle, is configured to take video of the environment outside the vehicle. Optionally, the data captured by the camera comprises 3D data. The processor is configured to generate a video see-through (VST) based on the video taken by the camera.

The video module 66 is configured to select a first mode of presentation, in which a video-unrelated-to-the-VST (VUR) is presented on the foveal vision region of the occupant, at eye level, responsive to the indication not indicating that an SDRS event is imminent. The video module 66 is further configured to select a second mode of presentation, in which the VST is presented on the foveal vision region of the occupant, at eye level, responsive to the indication indicating that an SDRS event is imminent. Optionally, the VST captures more than 50% of the foveal vision region of the occupant in the second mode of presentation. In some embodiments, presenting video on the foveal vision region comprises presenting images with at least 50% transparency. Herein, "foveal vision" refers to an angle of about 5° of the sharpest field of vision.

In one embodiment, in the first mode of presentation, the VUR is presented on the foveal vision region of the occupant with opacity A, and the VST is presented on the foveal vision region of the occupant with opacity B, where A>B>0. Optionally, a normalized opacity parameter takes a value from 0.0 to 1.0, and the lower the value the more transparent the video is. In this embodiment, in the second mode of presentation, the VUR is presented on the foveal vision region of the occupant with opacity A', and the VST is presented on the foveal vision region of the occupant with opacity B', where B'>B and B'>A'. In optional embodiments, one or more of the following values may be true: A'>0, B=0, and A'=0. Herein, "partially transparent" refers to opacity below one and above zero.

Having the VST presented when an SDRS event is imminent can make the occupant be aware and prepared for the SDRS event. Thus, the occupant is less likely to be startled, distressed, and/or physically thrown off balance by the SDRS event. In one example, the SDRS event involves hitting a speedbump, while the occupant views a movie. About 5 seconds prior to hitting the speedbump, a partially transparent window displaying VST in which the speedbump is highlighted (e.g., flashing red) is presented on the foveal vision region of the occupant for a couple seconds (e.g., by being presented in the center of the movie). This way upon hitting the speedbump, the occupant is not startled by the event. In another example, the autonomous-driving control system 65 determines that a "hard breaking" is required, e.g., in order to avoid collision with a vehicle ahead that slowed unexpectedly. In this example, the occupant may be working on a virtual desktop, and within 100 milliseconds of when the determination is made that the vehicle is about to rapidly deaccelerate (a "hard breaking"), the VST depicting the rear of the vehicle ahead is displayed in the center of the virtual desktop. This way the occupant is immediately made aware of why the vehicle is breaking and this notification may prompt the occupant to seek a more appropriate posture for the breaking.

Figure 18A:
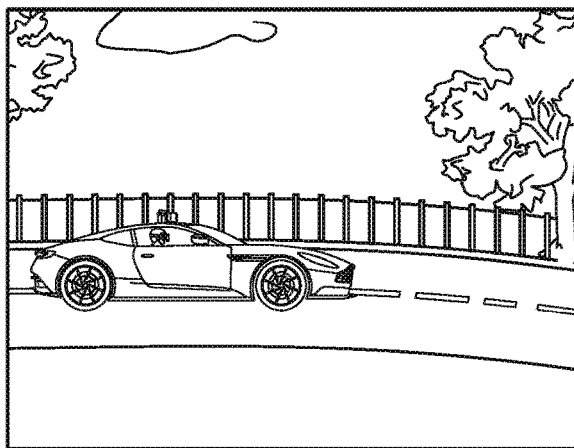
FIG. 18a illustrates presenting VUR to an occupant when there is no indication that an SDRS event is imminent.
Figure 18A:
Figure 18B:
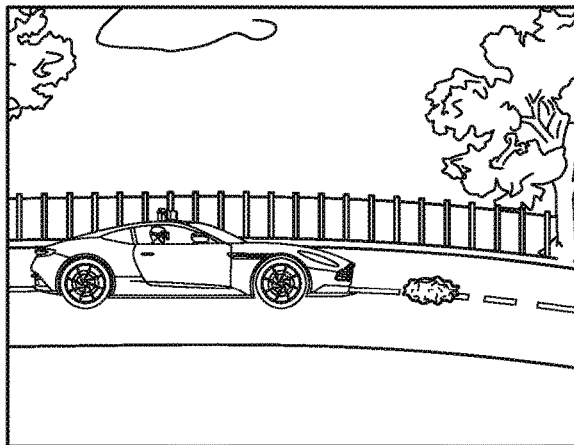
FIG. 18b illustrates presenting VST responsive to receiving an indication that an SDRS event is imminent (a pothole)
Figure 18B:
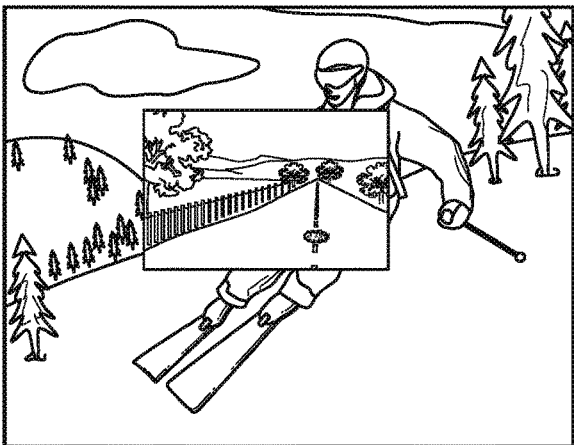
Figure 18C:
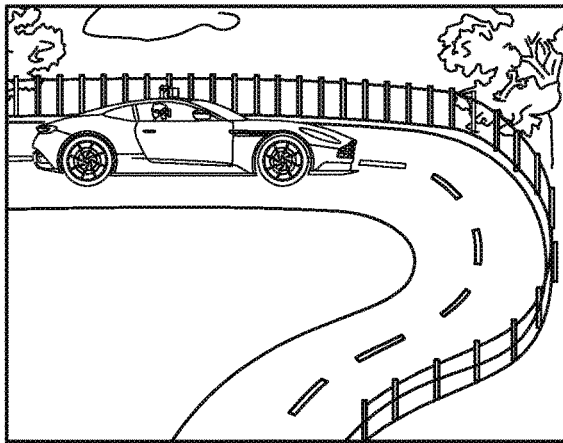
FIG. 18c illustrates presenting VST responsive to receiving an indication that an SDRS event is imminent (a sharp turn)
Figure 18C:
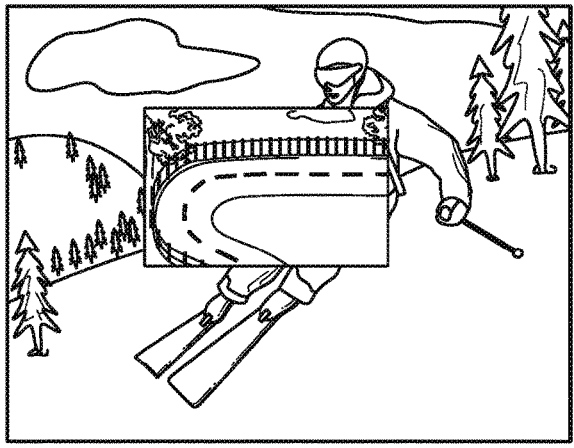

Some illustrations of utilization of the different modes of operation are given in the following figures. FIG. 18a illustrates presenting VUR responsive to not receiving from the autonomous-driving control system 65 an indication that an SDRS event is imminent. This figure has two parts, the left part shows the vehicle driving over a clean road, and the right part shows the VUR. FIG. 18b illustrates presenting VST responsive to receiving from the autonomous-driving control system 65 an indication that an SDRS event is imminent. The figure has two parts, the left part shows the vehicle about to drive over a pothole, and the right part shows a small window showing the pothole over the VUR (optionally to warn the occupant). FIG. 18c illustrates presenting VST responsive to receiving from the autonomous-driving control system 65 an indication that an SDRS event is imminent. The figure has two parts, the left part shows the vehicle about to enter a sharp turn, and on the right part shows a small window showing the sharp turn over the VUR (optionally to warn the occupant).

Traditional vehicles typically have a front windshield that offers occupants of the vehicle a frontal view of the outside environment. However, in some embodiments, this frontal view may be provided using the VST. For example, in one embodiment, the vehicle includes a nontransparent element, which is coupled to the vehicle, and obstructs at least 30 degrees out of the frontal horizontal unaided FOV to the outside environment of an occupant at eye level. In one example of a standard vehicle, such as Toyota Camry model 2015, the frontal horizontal unaided FOV extends from the left door through the windshield to the right door.

The use of the nontransparent element improves the safety of the occupant during a collision compared to a similar vehicle having the same total weight and comprising a transparent glass window instead of the nontransparent element. The nontransparent element may be coupled to the vehicle in various configurations, in embodiments described herein. In one embodiment, the nontransparent element is fixed to the vehicle at an angle, relative to the occupant, that is covered by the field of view of the VST, and the nontransparent element features visible light transmittance (VLT) below 10% of ambient light.

Various types of displays may be utilized to present the occupant with video (e.g., the VST and/or the VUR). In one embodiment, the video is presented to the occupant on a screen coupled to the vehicle compartment. In one example, the screen coupled to the vehicle compartment utilizes parallax barrier technology. A parallax barrier is a device located in front of an image source, such as a liquid crystal display, to allow it to show a stereoscopic image or multiscopic image without the need for the viewer to wear 3D glasses. The parallax barrier includes a layer of material with a series of precision slits, allowing each eye to see a different set of pixels, thus creating a sense of depth through parallax. In another embodiment, the occupant wears a head-mounted display (HMD), and the HMD is used to present the video to the occupant. Optionally, the HMD is a VR headset, and as a result of presenting the VST, the occupant does not need to remove the VR headset in order to see the cause of the SDRS event.

In some embodiments, the video module 66 may be selective regarding indications of which SRDS events may prompt it to operate in the second mode of operation. For example, if the occupant is engaged in a game, the video module 66 may refrain from presenting the VST in the foveal vision region if the vehicle is about to make a sharp turn. However, it may optionally still present the VST in the foveal vision region if the SDRS event involves something that may be more forcefully felt by the occupant, such as extreme evasive maneuvering performed to avoid a collision.

In some embodiments, the video module 66 may determine whether to show a VST responsive to an SRDS event (in the second mode of operation) based on the level of concentration of the occupant. For example, if the occupant is deeply engaged in a certain activity (e.g., in work or playing a game) above a threshold, the video module 66 may refrain from operating in the second mode for certain SDRS events that would cause the video module 66 to operate in the second mode were the occupant engaged in the certain activity below the threshold. In one example, the engagement level may be based on the occupant's level of concentration, as measured by a wearable sensor (such as an EEG headset or a smartwatch) or a sensor fixed to the compartment (such as an eye tracker, a thermal camera, or a movement sensor embedded in the seat).

Presenting an occupant of a vehicle with video see-through (VST) of the outside environment from a point of view of the occupant can help the occupant be prepared for various events that may be considered to cause a Sudden Decrease in Ride Smoothness (SDRS events). Some examples of SDRS events include the following events: hitting a speed bump, driving over a pothole, climbing on the curb, making a sharp turn, a hard breaking, an unusual acceleration (e.g., 0-100 km/h in less than 6 seconds), and starting to drive after a full stop.

In order for the occupant to become aware of an imminent SDRS event, the VST needs to be presented in an attention-grabbing way. For example, when an SDRS event is imminent, the VST that describes the environment is brought to the center of the occupant's attention by displaying it at eye level and/or increasing the size of the VST (compared to other times when an SDRS event is not imminent).

The following is a description of an embodiment of a video system that may be used to increase awareness of an occupant of a vehicle regarding an imminent SDRS by making the VST more prominent for an imminent SDRS. In one embodiment, a video system for an autonomous on-road vehicle includes at least the autonomous-driving control system 65, a camera, and a processor. In this embodiment, the occupant is engaged, at least part of the time, in entertainment- or work-related activities, which involve presentation of video-unrelated-to-the-VST (VUR) to the occupant, for example, on a screen coupled to the compartment of the vehicle or a HMD worn by the occupant. Some examples of such content (common in the year 2016) include cinema movies, broadcast TV shows, standard web browsers, and Microsoft Office 2016 applications (such as Word, Excel and PowerPoint).

The camera, which is mounted to the vehicle, is configured to take video of the environment outside the vehicle. The processor is configured to generate, based on the video taken by the camera, a video see-through (VST) of outside environment from a point of view of an occupant of the vehicle. Optionally, the occupant is in a front seat of the vehicle (such that no other occupant in the vehicle is positioned ahead of the occupant). In some embodiments, the processor is configured to present video, which may include VUR and/or VST, to the occupant using different presentation modes, depending on whether an SDRS event is imminent. For example, the video may be presented according to first or second modes, depending on whether an SDRS event is imminent. Optionally, the VST captures in the video according to the first mode a diagonal FOV of at least 3°, 5°, or 10° of the occupant's FOV. Optionally, the VST is not presented in the foveal vision region of the occupant in the video according to the first mode, while the VST is presented in the foveal vision region of the occupant in the video according to the second mode.

In one embodiment, responsive to an indication that is not indicative of an imminent SDRS event (generated by the autonomous-driving control system 65), the processor is configured to provide the occupant video according to the first mode. In the video according to the first mode, the occupant is presented with video that comprises a video-unrelated-to-the-VST (VUR) at eye level in the direction of forward traveling. Additionally, the video may comprise a video see-through (VST) of outside environment that is not presented at eye level in the direction of forward traveling.

Receiving an indication indicative that an SDRS event is imminent may change the way video is presented to the occupant. Optionally, this change is made without receiving a command to do so from the occupant. In one embodiment, responsive to the indication indicating that an SDRS event is imminent, the processor is configured to provide video to the occupant video according to the second mode. In the video according to the second mode, the occupant is presented with video that comprises the VST, presented at eye level in the direction of forward traveling. Optionally, if the video according to the first mode includes VST, then the size of the VST window in the video according to the second mode is larger by at least 25% relative to the size of the VST window in the video according to the first mode. Optionally, the video according to the second mode includes presenting the VUR in the background (e.g., the VST is overlaid above the VUR). Optionally, while providing the video according to the second mode, responsive to an updated indication that does not indicate that an SDRS event is imminent, the processor is further configured to switch back to provide the video according to the first mode to the occupant.

Figure 19A:
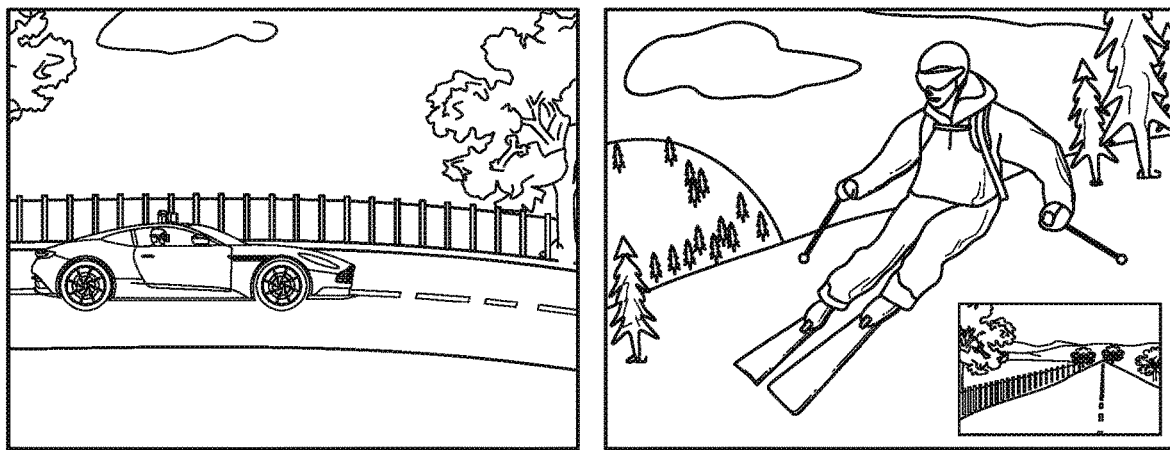
FIG. 19a illustrates presenting VUR and VST when there is no indication that an SDRS event is imminent.
Figure 19B:
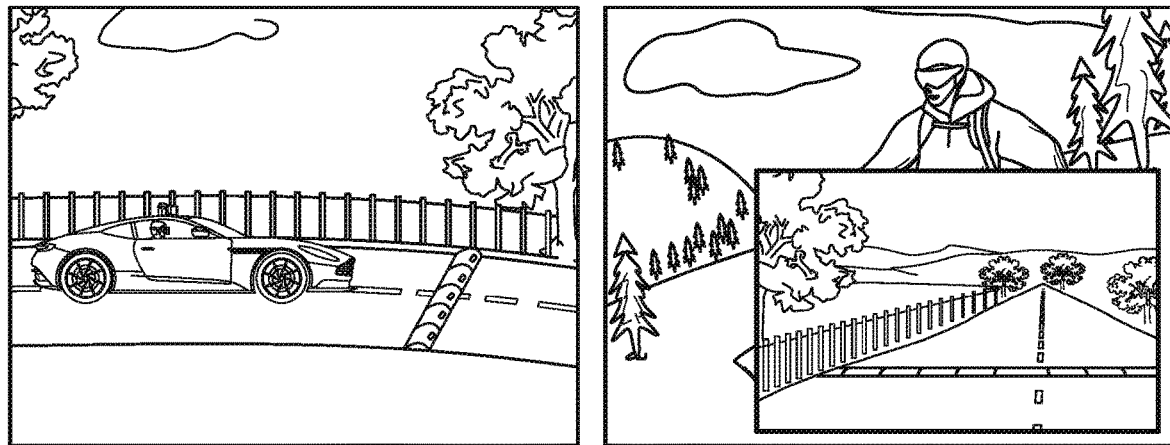
FIG. 19b illustrates presenting a larger VST responsive to receiving an indication that an SDRS event is imminent (a road bump)
Figure 19C:
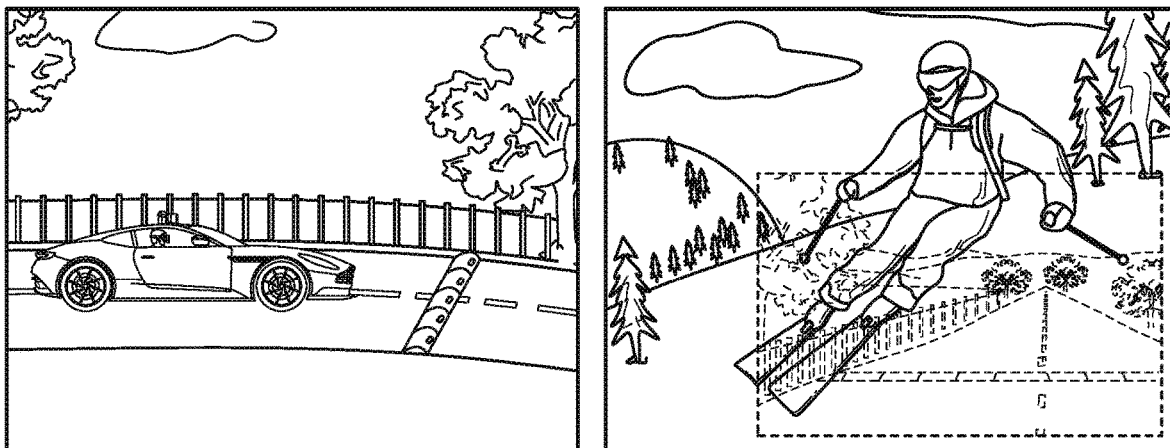
FIG. 19c illustrates presenting a partially transparent VST responsive to receiving an indication that an SDRS event is imminent.

The following figures illustrate various ways in which the videos according to the first and second modes may be utilized. FIG. 19a illustrates presenting a VUR, which is a movie showing a person skiing, responsive to not receiving from the autonomous-driving control system 65 an indication that an SDRS event is imminent. This figure has two parts, the left part shows the vehicle driving over a clean road, and the right part shows the VUR with a small VST on the right. FIG. 19b illustrates presenting a VST responsive to receiving from the autonomous-driving control system 65 an indication that an SDRS event is imminent. This figure has two parts, the left part shows the vehicle about to drive over a speed bump, and the right part shows the VUR but now with a big VST on the right. In this example, the big VST captures about half of the VUR and shows the speed bump. FIG. 19c illustrates presenting a partially transparent VST responsive to receiving from the autonomous-driving control system 65 an indication that an SDRS event is imminent. Here, the big VST (that captures about half of the VUR and shows the speed bump) is presented as partially transparent layer over the VUR in order to show the occupant both the VUR and the VST.

In one embodiment, presenting to the occupant video according to the second mode involves presenting the VUR behind the VST, and the size and location of the VUR in the video according to the second mode is essentially the same as the size and location of the VUR in the video according to the first mode. Optionally, this means that there is a difference of less than 10% in the size and location of the VURs in the videos according to the first and second modes. In another embodiment, the VUR is presented in a diagonal FOV of at least 10 degrees, and is not based on the video taken by the camera.

In some embodiments, the VUR may be unrelated to the purpose of the traveling in the vehicle. For example, the VUR may include videos related to the following activities: watching cinema movies, watching TV shows, checking personal emails, playing entertainment games, and surfing in social networks.

In some embodiments, the occupant's field of view (FOV) to the outside environment is obstructed by a nontransparent element, and the VST represents at least a portion of the obstructed FOV. Optionally, the occupant uses a VR headset and the obstruction is due to a nontransparent element belonging to the VR headset. Additionally or alternatively, the obstruction may be due to the vehicle's compartment; in this case the nontransparent element may be an SAEDP, a safety beam, and/or a crumple zone at eye level, which obstruct at least 30 degrees out of the frontal horizontal unaided FOV to the outside environment of the occupant at eye level.

When traveling in a vehicle, an occupant of the vehicle may not always be viewing the outside environment. For example, the occupant may be engaged in work- or entertainment-related activities. Additionally, in some vehicles, the occupant may not have a good view of the outside environment most of the time, or even all of the time. For example, the vehicle may have very few (or no) windows, or the vehicle may have a shading mechanism that reduces the light from the outside. However, there are times when the occupant should be made aware of the outside environment, even though the occupant may not be actively driving the vehicle. For example, the occupant may be made aware of the outside environment in order to make the occupant prepared for an event that causes a Sudden Decrease in Ride Smoothness (an SDRS event). Some examples of SDRS events include the following events: hitting a speed bump, driving over a pothole, climbing on the curb, making a sharp turn, a hard breaking, an unusual acceleration (e.g., 0-100 km/h in less than 6 seconds), and starting to drive after a full stop.

In order for the occupant to become aware of an imminent SDRS event, in some embodiments that involve a vehicle that has a shading module that controls how much ambient light is let in, when an SDRS event is imminent the vehicle may increase the amount of light that enters via a window. This additional light can give an occupant a better view of the outside environment, which can make the occupant aware and better prepared for the SDRS.

The following is a description of an embodiment of a system that may be used to increase awareness of an occupant of a vehicle regarding an imminent SDRS by enabling more ambient light to enter a vehicle via a window. In one embodiment, a shading system for a window of an autonomous on-road vehicle includes at least the autonomous-driving control system 65, a shading module, and a processor.

Figure 20A:
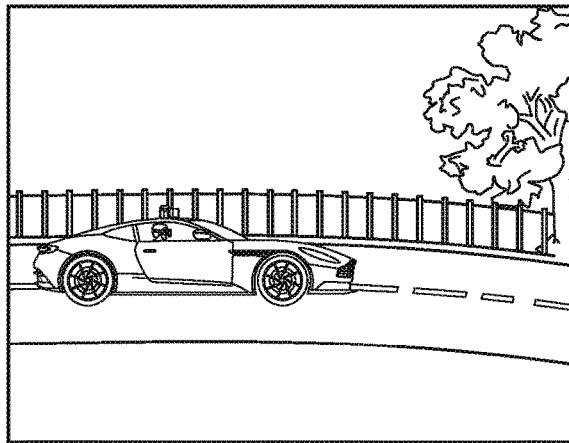
FIG. 20a illustrates a smart glass shading module when there is no indication that an SDRS event is imminent.
Figure 20A:
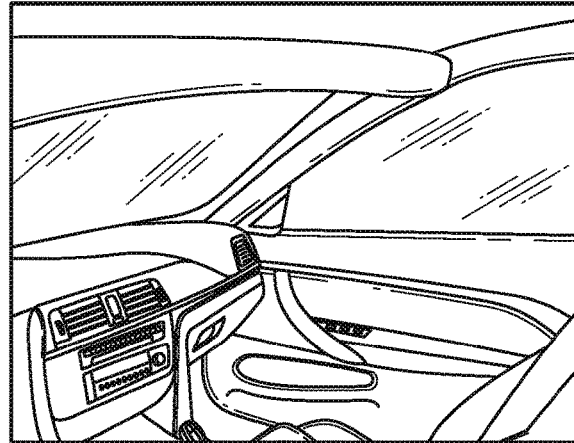
Figure 20B:
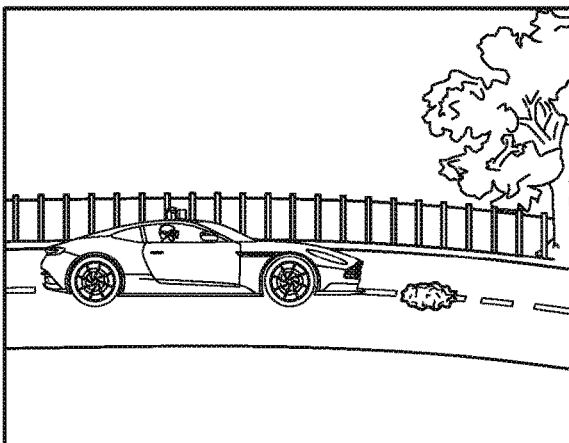
FIG. 20b illustrates the smart glass shading module when there is an indication that an SDRS event is imminent.
Figure 20B:

FIG. 20a illustrates a smart glass shading module that operates according to an indication that an SDRS event is not imminent. This figure has two parts, the left part shows the vehicle driving over a clean road, and the right part shows that the smart glass window blocks most of the ambient light (illustrated in the figure by the tree outside that is invisible to the occupant). FIG. 20b illustrates the smart glass shading module that operates according to an indication that an SDRS event is imminent. This figure has two parts, the left part shows the vehicle about to drive over a pothole, and the right part shows that the smart glass window does not block the ambient light (illustrated in the figure by the tree outside that is visible to the occupant).

The shading module is configured to control the amount of ambient light that enters the vehicle via the window. Optionally, the window is a front-facing window (e.g., a windshield). Optionally, the window is a side-facing window. There are various types of shading modules that may be utilized in different embodiments.

In one embodiment, the shading module comprises a curtain. Optionally, the curtain covers most of the area of the window. Optionally, the curtain may open and close with the aid of an electromechanical device, such as a motor, based on commands issued by the processor.

In another embodiment, the shading module is a movable physical element configured to reduce the intensity of the ambient light entering through the vehicle window into the vehicle compartment. For example, the shading module may include various forms of blinds, a shutter, or a sliding element. Optionally, the shading module may be unfurled on the inside of the vehicle compartment in order to block more than 70% of the ambient light intensity. Optionally, the shading module may be unfurled on the outside of the vehicle compartment in order to block more than 70% of the ambient light intensity.

In yet another embodiment, the shading module comprises a smart glass able to change its light transmission level. Optionally, the smart glass is a vehicle window smart glass that comprises suspended particle devices (SPDs) film. Smart glass window may also be known as a switchable glass, a smart window, and/or a switchable window. Smart glass is glass or glazing whose light transmission properties are altered when voltage, current, light or heat is applied. Examples of electrically switchable smart glass include: suspended particle devices (SPDs), electrochromic devices, transition-metal hydride electrochromics devices, modified porous nano-crystalline films, polymer dispersed liquid crystal devices, micro-blinds, and thin coating of nanocrystals embedded in glass. Examples of non-electrical smart glass include: mechanical smart windows, Vistamatic®, and Sunvalve.

The processor is configured to command the shading module to operate in different modes based on indications generated by the autonomous-driving control system 65. In some embodiments, the processor is configured to command the shading module to operate in different modes that allow different amounts of the ambient light to enter the vehicle via the window, depending on whether an SDRS event is imminent. For example, shading module may operate in first or second modes, depending on whether an SDRS event is imminent. Optionally, in the first mode the shading module blocks more of the ambient light entering through the vehicle window than in the second mode. Optionally, the increased ambient light in the second mode can help make the occupant more aware of the outside environment, which can enable the occupant to prepare for the SDRS event.

In one embodiment, responsive to an indication that no SDRS event is imminent, the processor is configured to command a shading module to operate in a first mode in which the shading module blocks more than 30% of ambient light entering through a window of the vehicle. Receiving an indication indicative that an SDRS event is imminent may change the amount of ambient light that enters the vehicle via the window. Optionally, this change is made without receiving a command to do so from the occupant. In one embodiment, responsive to an indication that an SDRS event is imminent, the processor is configured to command the shading module to operate in the second mode in which the shading module blocks less than 90% of the ambient light entering through the vehicle window.

Some aspects of this disclosure include a system that can show an occupant of a vehicle and Object Of Interest (OOI) in the outside environment, which the occupant would otherwise miss (e.g., due to being engaged in work- or entertainment-related activities and/or having no direct view of the outside environment).

In one embodiment, a system configured to identify an Object Of Interest (OOI) in the outside environment, and to present to an occupant of an autonomous on-road vehicle a video see-through (VST) that comprises the OOI, includes at least a camera (such as camera 12), a processor (such as processor 18), and a video module (such as video module 66).

Different types of things may be considered an OOI in different embodiments. In one embodiment, the OOI is selected from a set comprising: types of vehicles, types of scenery, and types of people. Optionally, the system may include a user interface configured to present a menu that enables the occupant to select the types of OOI, which when identified, will be presented in the second mode of presentation. In one example, an OOI may be any type of high-end vehicle (e.g., a Porsche). In another example, an OOI may include an ocean view.

The camera, which is mounted to the vehicle, is configured to take video of the environment outside the vehicle. Optionally, the data captured by the camera comprises 3D data. The processor is configured to generate, based on the video taken by the camera, a video see-through (VST) of outside environment from a point of view of an occupant of the vehicle. Optionally, the occupant is in a front seat of the vehicle (such that no other occupant in the vehicle is positioned ahead of the occupant).

The video module is configured to present, to the occupant, video that captures diagonal field of view (FOV) of at least 10 degrees, at eye level. Optionally, the video module is further configured to select a mode of operation based on whether an indication is received that is indicative of whether video taken by the camera include the OOI. Optionally, changing a mode of operation is done without an expressed command at that time by the occupant.

In one embodiment, when not receiving an indication that the images includes the OOI, the video module is configured to select a first mode of presentation, in which a video-unrelated-to-the-VST (VUR) is presented on the foveal vision region of the occupant. And responsive to receiving the indication that the images include the OOI, the video module is further configured to select a second mode of presentation, in which the VST is presented on the foveal vision region of the occupant.

There are various ways in which an indication of the OOI may be generated in different embodiments. In one embodiment, the system includes an image processing module configured to identify the OOI in the VST and to generate the indication. Various image processing techniques and/or image identification methods known in the art may be utilized by the image processing module for this task.

In another embodiment, the system may include the autonomous-driving control system 65 configured to utilize a positioning system, such as GPS coordinates, to identify that the vehicle reached the OOI and to generate the indication. Optionally, the occupant may define which places may be OOIs and/or what types of locations are to be considered OOIs (e.g., historical monuments, nice scenery, etc.).

In still another embodiment, the system may include a crowd-based module configured to identify the OOI based on feedback received from many different occupants who watched VSTs comprising the OOI. Optionally, this feedback may be derived based on indications of how other occupants felt about the VST (when it depicted certain content corresponding to OOIs). For example, points of interest may be determined according to affective crowd data, determine based on how other occupants felt about what they saw, and optionally find places where the crowd affective response was positive (e.g., blooming of flowers, etc.). Optionally, some occupants who watched the video related to the unhindered FOV for long periods (or have a physical window) may be monitored to see when an interesting view is encountered. Points of interest may involve items identified in the exterior environment using image analysis, including presenting the VST when one or more of the following happens: passing a fancy vehicle, passing someone the occupant knows, passing a vehicle accident, passing a police officer, having a sunset view, and passing an animal the occupant is interested in.

In one embodiment, the system may receive an indication that the occupant is feeling at least one of nauseous and claustrophobic, and consequently present the VST in order to help the occupant to confront the feeling. For example, when there is a serious spike (e.g., increase in heart-rate and sweating), then the system may present the VST automatically. The system may also present a "normal" interior to the occupant (e.g., natural lighting settings). Optionally, when digital content is consumed (e.g., a game or a movie), the system may check whether the affective spike (e.g., increased excitement) is due to the content or due to the experience of being in the vehicle with AR or VR. If it is the former case, then the system might not present the VST.

Some aspects of this disclosure involve an autonomous on-road vehicle that includes a nontransparent Shock-Absorbing Energy Dissipation Padding (SAEDP) that is coupled to the compartment of the vehicle and is located, during normal driving, at eye level in front of an occupant who sits in a front seat of the vehicle. Additionally, the vehicle includes a stiff element that is configured to support the SAEDP and to resist deformation during collision in order to reduce compartment intrusion. The stiff element is located, during normal driving, at eye level between the SAEDP and the outside environment. Thus, the combination of the SAEDP and the stiff element offers the occupant an increased level of protection, e.g., in the case of a collision, compared to a vehicle in which a traditional window is in place at eye level in the front of the vehicle. However, due to it being nontransparent, placing the SAEDP at eye level may obstruct the occupant's view to the outside. Thus, in order to offer the occupant such a view, in some embodiments, the vehicle also includes a camera configured to take video of the outside environment in front of the occupant, and a computer configured to generate, based on the video, a representation of the outside environment in front of the occupant at eye level. This representation may be provided to the occupant using various types of displays.

One non-limiting advantage of the vehicle described above is that it increases the safety of the occupant in the case of a collision, without prohibiting the occupant from obtaining a view of the outside environment.

In one embodiment, an autonomous on-road vehicle includes a compartment, which one or more occupants may occupy while traveling in the vehicle (e.g., by sitting in seats). Coupled to the front of the compartment is a Shock-Absorbing Energy Dissipation Padding (SAEDP) and a stiff element that supports the SAEDP. Optionally, the SAEDP is nontransparent. The stiff element is located, during normal driving, at eye level between the SAEDP and the outside environment. Additionally, the vehicle includes a camera (e.g., camera 142 or structure 147 that comprises multiple cameras), which is configured to take video of the outside environment in front of the occupant, and a computer (e.g., computer 143) that is configured to generate, based on the video, a representation of the outside environment in front of the occupant at eye level. Optionally, the camera, and/or each of the cameras in the structure 147, may be based on at least one of the following sensors: a CCD sensor, a CMOS sensor, a near infrared (NIR) sensor, an infrared sensor (IR), and a device based on active illumination such as a LiDAR. Optionally, when the camera comprises multiple cameras, the multiple cameras are directed to multiple directions around the vehicle, and the multiple cameras support generating multiple representations of the outside environment from different points of view.

It is to be noted that in some embodiments, the SAEDP may be fixed at its location both in normal driving and in times that are not considered to correspond to normal driving, while in other embodiments, the SAEDP may change its location during at least some of the times that do not correspond to normal driving.

The SAEDP is coupled to the compartment in such a way that it is located, during normal driving, at eye level in front of an occupant who sits in a front seat of the vehicle. Different types of SAEDPs may be utilized in different embodiments.

In one embodiment, the SAEDP comprises a passive material that is less stiff than a standard automotive glass window. The passive material is configured to protect the occupant's head against hitting the inner side of the vehicle compartment during a collision. Optionally, the passive material has thickness greater than at least one of the following thicknesses: 1 cm, 2 cm, 5 cm, 10 cm, 15 cm, and 20 cm. Optionally, the thickness of the passive material may refer to the average thickness of the SAEDP across the portion of the SAEDP at eye level. Alternatively, the thickness may refer to the maximal thickness at some position of the SAEDP (which is at least one of the values mentioned above).

In another embodiment, the SAEDP comprises a pneumatic pad that is configured to inflate in order to protect the occupant's head against hitting the inner side of the vehicle compartment during collision. In some examples, the pneumatic pads may be formed from an elastomeric material providing chambers containing air or another gas. Optionally, the chambers are retained in compressed deflated condition until being inflated by the admission of gas pressure controlled by the vehicle's autonomous-driving control system that is responsible to estimate the probability and severity of an imminent collision. Additionally or alternatively, the chambers may be provided with restricted passages limiting the flow out from the chambers to provide shock-absorbing energy dissipation to reduce the rebound effect. U.S. Pat. No. 5,382,051 discloses examples for pneumatic pads that can be used with some of the embodiments.

In yet another embodiment, the SAEDP comprises an automotive airbag, which is configured to protect the occupant's head against hitting the inner side of the vehicle compartment during collision. In one example, during normal driving, the airbag is in a stowed state. The airbag is coupled to an inflator configured to inflate the airbag with gas to an inflated state, upon receiving an indication indicative of a probability of an impact of the vehicle exceeding a threshold. In this example, the airbag is located, when in the stowed state, at eye level in front of the occupant.

In some embodiments, the compartment may include a door, and the SAEDP is physically coupled to the door from the inside, such that the SAEDP moves with the door as the door opens and/or closes.

In some embodiments, the vehicle may include a second SAEDP coupled to the outer front of the vehicle to minimize damage to a pedestrian during a pedestrian-vehicle collision.

In one embodiment, the stiff element that supports the SAEDP is nontransparent. In another embodiment, the stiff element may be automotive laminated glass or automotive tempered glass. Optionally, the structure of the vehicle comprises a crumple zone located at eye level between the stiff element and the outside environment.

The representation of the outside environment is intended to provide the occupant with some details describing the outside environment. In some embodiments, the representation of the outside environment is generated from the point of view of the occupant, and it represents how a view of the outside environment would look like to the occupant, had there been a transparent window at eye level instead of the SAEDP and/or the stiff element. Optionally, a display is utilized to present the representation to the occupant.

Various types of displays may be utilized in different embodiments to present the representation of the outside environment to the occupant. In one embodiment, the display is comprised in an HMD, and the vehicle further comprises a communication system configured to transmit the representation to the HMD. For example, the HMD may be a virtual reality system, an augmented reality system, or a mixed-reality system. In one embodiment, the display is supported by at least one of the SAEDP and the stiff element. For example, the display is physically coupled to the SAEDP and/or the stiff element. Optionally, the display is a flexible display. For example, the flexible display may be based on at least one of the following technologies and their variants: OLED, organic thin film transistors (OTFT), electronic paper (e-paper), rollable display, and flexible AMO-LED. In one example, the display is flexible enough such that it does not degrade the performance of the SAEDP by more than 20% during a collision. In one example, the performance of the SAEDP is measured by hitting a crash test dummy head against the SAEDP and measuring the head's deceleration using sensors embedded in the head.

Figure 21A:
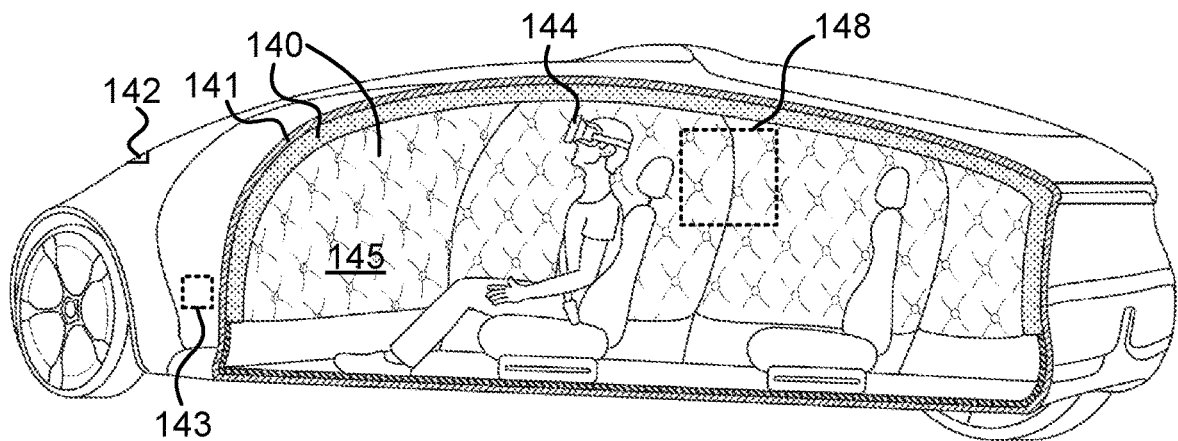
FIG. 21a and FIG. 21b illustrate vehicles with an SAEDP in their compartment were an occupant uses an HMD to receive a representation of the outside environment.
Figure 21B:
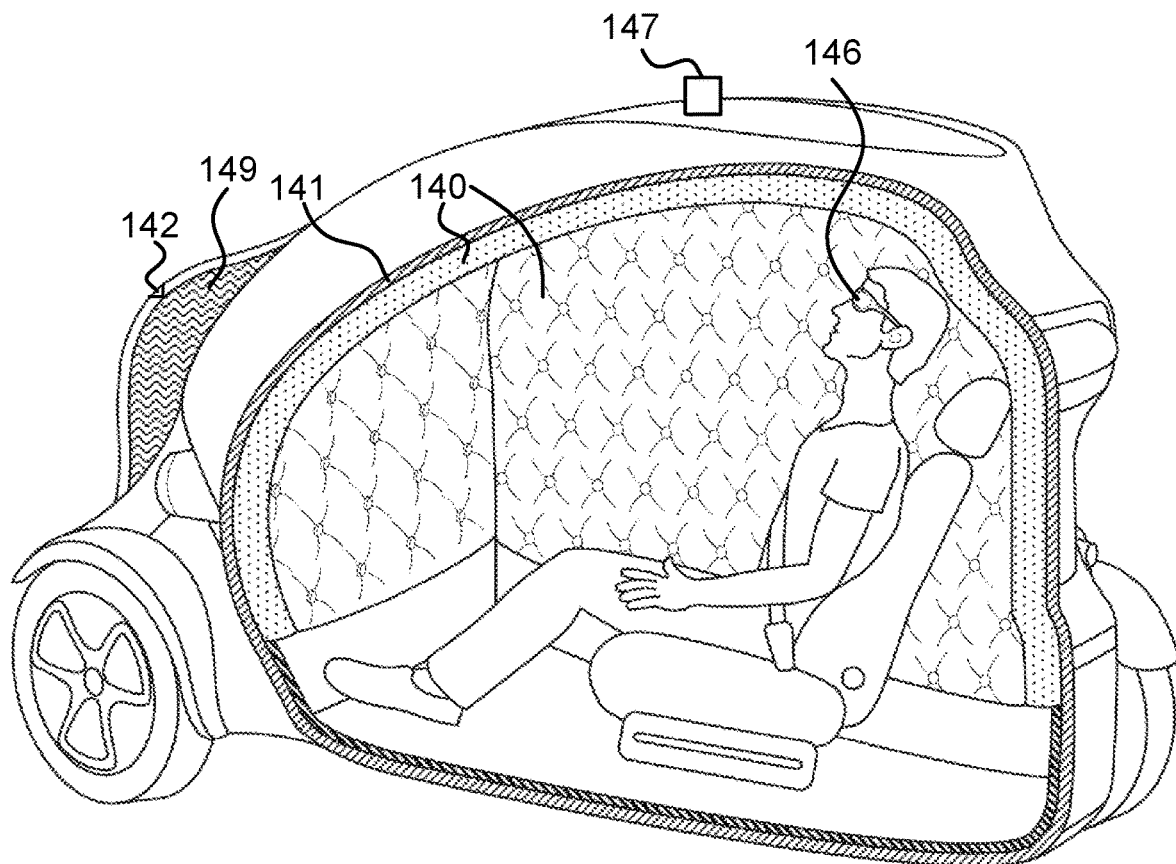
Figure 22:
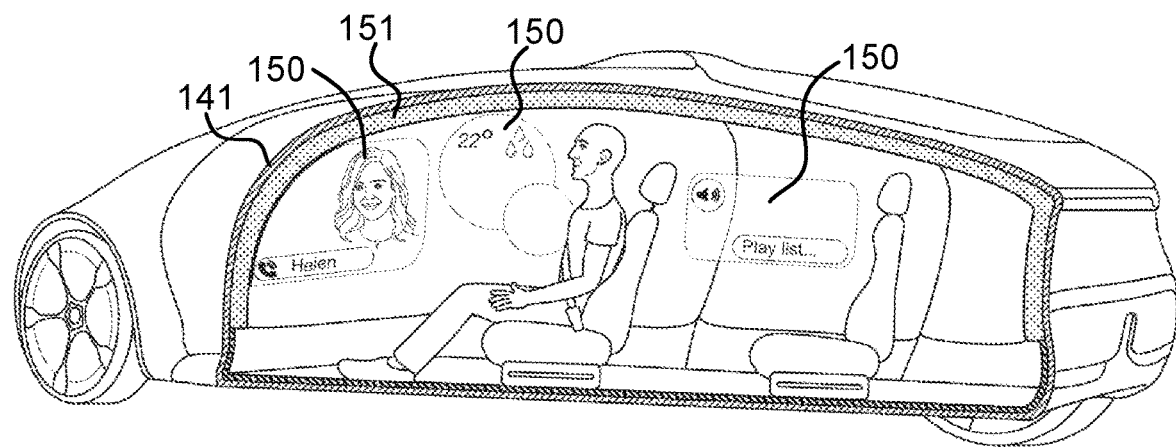
FIG. 22 illustrates a vehicle with an SAEDP in the vehicle's compartment with displays.

FIG. 21*a*, FIG. 21*b*, and FIG. 22 illustrate various embodiments of the vehicle described above. Each of the illustrated vehicles comprises a cross-section view of the vehicles, where each includes a compartment 145 for a single occupant (in FIG. 21*b*) or more (in FIG. 21*a* and FIG. 22). In the figures, much of the compartment is covered with the SAEDP 140, which is nontransparent and comprises a soft passive material (cushiony in its nature). Supporting the SAEDP 140 is a stiff element 141, which in the illustrations comprises portions of the exterior (hull) of the vehicle which may optionally be made of one or more of the following materials: fiber-reinforced polymer, carbon fiber reinforced polymer, steel, and aluminum. The vehicles also include a camera (such as camera 142 and/or structure 147 that houses multiple cameras), which is positioned to capture a front view of the outside environment of the vehicle. Additionally, the vehicles include a computer 143, which may be positioned in various locations in the vehicle. In some embodiments, the computer may be comprised of multiple processors and/or graphics processors that may be located at various locations in the vehicle.

The figures illustrate various types of displays that may be utilized to present the occupant with the representation of the outside environment generated by the computer 143 based on the video taken by the camera 142. In FIG. 21a the representation is presented via an HMD 144, which may be, for example, a virtual reality HMD. In FIG. 21b the representation is presented via an HMD 146, which may be, for example, a mixed-reality headset. And in FIG. 22 the representation may be provided via one or more of the displays 150, which are coupled to the compartment. It is to be noted that in the figures described above not all of the described elements appear in each figure.

The figures also illustrate various structural alternatives that may be implemented in different embodiments described herein. For example, FIG. 21a illustrates a vehicle that includes window 148, which may optionally be an automotive tempered glass window, located in a location in which the head of a belted occupant is not expected to hit during collision. FIG. 21b illustrates a vehicle that includes crumple zone 149, which is located at the front of the vehicle at eye level. The figure also illustrates the structure 147 that houses multiple cameras directed to multiple directions around the vehicle.

In some embodiments, the representation of the outside environment may be manipulated in order to improve how the outside environment looks to the occupant. Optionally, this may be done utilizing the computer. In one example, manipulating the representation includes at least one of the following manipulations: converting captured video of an overcast day to video of a sunny day by preserving main items in the captured video (such as vehicles and buildings) and applying effects of a sunny day, converting unpleasant environment to a nice one, converting standard vehicles to futuristic or old fashion vehicles, and adding fans standing outside and waiving to the occupant.

In one embodiment, the manipulation maintains the main items in the environment, such that the occupant would still know from the manipulated representation where he/she is traveling. In another embodiment, the manipulated representation maintains the main objects in the video of the outside environment, such that the main objects presented in the manipulated video essentially match the main objects that would have been seen without the manipulation.

In some embodiments, the vehicle compartment may include an automotive laminated glass window or automotive tempered glass window located in a location where the head of a belted occupant is not expected to hit as a result of collision while traveling in velocity of less than 50 km/h, as illustrated by the dotted rectangle 148 in FIG. 21a.

In one embodiment, the structure of the vehicle is such that a crumple zone is located at eye level between the stiff element and the outside environment.

Various types of vehicles may benefit from utilization of the nontransparent SAEDP supported by the stiff element and in conjunction with the camera and computer, as described above. The following are some examples of different characterizations of vehicles in different embodiments. In one embodiment, the vehicle weighs less than 1,500 kg without batteries, and it is designed to carry up to five occupants. In another embodiment, the vehicle weighs less than 1,000 kg without batteries, and it comprises an engine that is able to sustain continuously at most 80 horsepower. In yet another embodiment, the vehicle weighs less than 1,000 kg and it is designed to carry up to two occupants. In still another embodiment, the vehicle weighs less than 800 kg without batteries, and it comprises an engine that is able to sustain continuously at most 60 horsepower. In yet another embodiment, the vehicle weighs less than 500 kg without batteries and it comprises an engine that is able to sustain continuously at most 40 horsepower. And in still another embodiment, the vehicle weighs less than 400 kg without batteries and is designed to carry up to two occupants.

Some aspects of this disclosure involve an autonomous on-road vehicle that includes a nontransparent Shock-Absorbing Energy Dissipation Padding (SAEDP) that is coupled to the compartment and is located, during normal driving, at eye level to the left of the occupant who sits in a front seat of the vehicle (in the left front seat when the vehicle has more than one front seat). The SAEDP obstructs at least 30 degrees out of the horizontal unaided field of view (FOV) to the outside environment to the left of the occupant at eye level. Additionally, the vehicle includes a stiff element that is configured to support the SAEDP and to resist deformation during collision in order to reduce compartment intrusion. The stiff element is located, during normal driving, at eye level between the SAEDP and the outside environment. Thus, the combination of the SAEDP and the stiff element offers the occupant an increased level of protection, e.g., in the case of a collision to the left side of the vehicle, compared to a vehicle in which a traditional window is in place at eye level on the left side of the vehicle. However, due to it being nontransparent, placing the SAEDP at eye level may obstruct the occupant's view to the outside. Thus, in order to offer the occupant such a view, in some embodiments, the vehicle also includes a camera configured to take video of the outside environment to the left of the occupant, and a computer, which is configured to generate, based on the video, a representation of the outside environment to the left of the occupant at eye level. This representation may be provided to the occupant using various types of displays.

One non-limiting advantage of the vehicle described above is that it increases the safety of the occupant in the case of a side collision, without prohibiting the occupant from obtaining a side view of the outside environment.

In one embodiment, an autonomous on-road vehicle includes a compartment, which one or more occupants may occupy while traveling in the vehicle (e.g., by sitting in seats). Coupled to the compartment is a Shock-Absorbing Energy Dissipation Padding (SAEDP) and a stiff element that supports the SAEDP. Optionally, the SAEDP is nontransparent. The SAEDP is located, during normal driving, at eye level to the left of the occupant who sits in a front seat of the vehicle. The stiff element is located, during normal driving, at eye level between the SAEDP and the outside environment. Optionally, the stiff element is nontransparent. Optionally, the stiff element may be automotive laminated glass or automotive tempered glass.

The vehicle also includes a camera (such as camera 161) that is configured to take video of the outside environment to the left of the occupant, and a computer that is configured to generate, based on the video, a representation of the outside environment to the left of the occupant at eye level. Optionally, the camera comprises multiple cameras directed to multiple directions around the vehicle, and the multiple cameras support generating multiple representations of the outside environment from different points of view.

Figure 23:
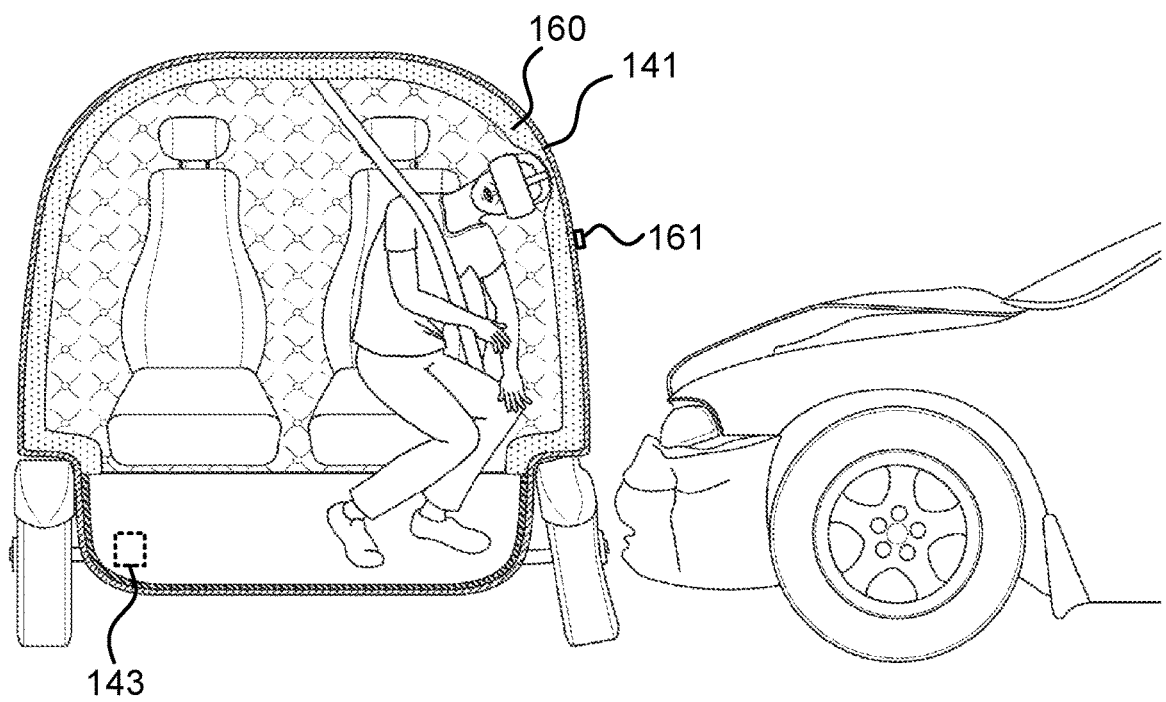
FIG. 23 illustrates how an SAEDP protects the occupant in a side collision.

FIG. 23 illustrates one embodiment of the autonomous on-road vehicle described above, which shows how an SAEDP protects the occupant during a collision. In the figure, SAEDP 160 (which may comprise a passive material) is coupled to the stiff element 141. When another vehicle collides with the side of the vehicle, the occupants head strikes the soft SAEDP 160, instead of a glass window (which would be positioned there in many conventional vehicles).

The SAEDP is coupled to the compartment in such a way that it is located, during normal driving, at eye level to the left of the occupant who sits in a front seat of the vehicle. Optionally, due to its location, the SAEDP obstructs at least 30 degrees out of the horizontal unaided field of view (FOV) to the outside environment to the left of the occupant at eye level. Optionally, the SAEDP obstructs at least 45 degrees or at least 60 degrees out of the horizontal unaided FOV to the outside environment to the left of the occupant at eye level. In one example of a standard vehicle, such as Toyota Camry model 2015, the frontal horizontal unaided FOV extends from the left door through the windshield to the right door.

In some embodiments, the SAEDP is fixed to the left door of the vehicle. In one embodiment, the vehicle has a single seat (occupied by the occupant). In another embodiment, the vehicle has two or more front seats and the occupant occupies the leftmost of the two or more front seats.

Different types of SAEDPs may be utilized in different embodiments. In one embodiment, the SAEDP comprises a passive material, which is less stiff than a standard automotive glass window, having a thickness greater than at least one of the following thicknesses: 1 cm, 2 cm, 5 cm, 10 cm, 15 cm, and 20 cm. In other embodiments, the SAEDP may include an automotive airbag or a pneumatic pad that is configured to inflate in order to protect the occupant's head against hitting the inner side of the vehicle compartment during collision.

In a similar fashion to how the SAEDP and stiff element are utilized to help protect the left side of the occupant, the same setup may be applied to the right side of the vehicle, in order to help protect that side. Thus, in some embodiments, the vehicle may further include a second SAEDP located at eye level to the right of the occupant who sits in the front seat, and a second stiff element located at eye level between the second SAEDP and the outside environment. Optionally, the second SAEDP obstructs at least 20 degrees out of the horizontal unaided FOV to the outside environment to the right of the occupant at eye level, and the computer is further configured to generate a second representation of the outside environment to the right of the occupant.

Some aspects of this disclosure involve an autonomous on-road vehicle that includes a nontransparent Shock-Absorbing Energy Dissipation Padding (SAEDP) that can cover a side window that enables an occupant of the vehicle to see the outside environment. The side window is located at eye level of an occupant who sits in the vehicle. A motor is configured to move the SAEDP over a sliding mechanism between first and second states multiple times without having to be repaired. A processor is configured to receive, from an autonomous-driving control system, an indication that a probability of an imminent collision reaches a threshold, and to command the motor to move the SAEDP from the first state to the second state. In the first state the SAEDP does not block the occupant's eye level view to the outside environment, and in the second state the SAEDP blocks the occupant's eye level view to the outside environment in order to protect the occupant's head against hitting the side window during collision.

One non-limiting advantage of the vehicle described above is that it increases the safety of the occupant in the case of a side collision.

In one embodiment, an autonomous on-road vehicle includes a side window 170, a nontransparent SAEDP (e.g., SAEDP 171), a motor 172, and a processor 175.

The processor 175 is configured to receive, from an autonomous-driving control system (such as autonomous-driving control system 65), an indication indicating that a probability of an imminent collision reaches a threshold, and to command the motor 172 to move the SAEDP 171 from the first state to the second state. In the first state the SAEDP 171 does not block the occupant's eye level view to the outside environment, and in the second state, the SAEDP 171 blocks the occupant's eye level view to the outside environment in order to protect the occupant's head against hitting the side window during collision. Optionally, the processor is configured to command the motor 172 to start moving the SAEDP 171 to the second state at least 0.2 second, 0.5 second, 1 second, or 2 seconds before the expected time of the collision.

The motor 172 is configured to move the SAEDP 171 over a sliding mechanism 173 between first and second states multiple times without having to be repaired. For example, during the same voyage, the SAEDP 171 may go up and down multiple times without a need for the occupant or anyone else to repair the SAEDP 171 and/or other components (such as motor 172 or the window 170) in order to the SAEDP 171 to be able to continue its operation correctly (i.e., continue moving up and down when needed). In some examples, the motor 172 is a motor designed to move the SAEDP 171 more than twice, more than 100 times, and/or more than 10,000 times without being replaced.

The side window 170 is located at eye level of an occupant who sits in the vehicle, which enables the occupant to see the outside environment. In one embodiment, the side window 170 is a power window. In this embodiment, the power window comprises a window regulator that transfers power from a window motor 177 to the side window glass in order to move it up or down. The motor 172 is coupled to an SAEDP regulator that transfers power from the motor 172 to the SAEDP 171 in order to move it up or down. In this embodiment, the SAEDP regulator is located closer to the inner side of the compartment then the window regulator. Optionally, the motor 172 and the window motor 177 may be of the same type or of different types.

In one embodiment, the SAEDP 171 comprises a passive material, which is less stiff than a standard automotive glass window, having thickness greater than at least one of the following thicknesses: 1 cm, 2 cm, 5 cm, 10 cm, 15 cm, and 20 cm. Optionally, the vehicle may include a storage space in a door of the vehicle, which is configured to store the SAEDP 171 in the first state. Additionally or alternatively, the vehicle may include a storage space in the roof of the vehicle, which is configured to store the SAEDP 171 in the first state.

Optionally, the SAEDP 171 may move upwards when switching between the first and second states, and the top of the SAEDP has a profile (such as a triangle or a quarter sphere) which reduces the risk of catching the a part of the occupant (e.g., a finger or limb) or the occupant's clothing, between the top of the SAEDP 171 and an upper frame when moving the SAEDP 171 to the second state.

In one embodiment, when switching the SAEDP 171 quickly between the first and second states, the SAEDP 171 is configured not to cover a range of 1 to 5 cm of the top height of the window. Optionally, keeping said range unoccupied reduces the risk of catching the occupant's fingers or limb by the edge of the SAEDP 171 when moving the SAEDP 171 to the second state.

In some embodiments, the vehicle may include additional SAEDPs that cover additional regions of the vehicle's compartment (besides the side window 170). In one example, the vehicle includes an SAEDP 176 that covers at least a portion of the roof of the vehicle.

In some embodiments, the vehicle includes a camera (e.g., camera 178a), which is configured to take video of the outside environment while the SAEDP 171 is in the second state. Additionally, in these embodiments, the vehicle may include a computer (such as computer 13), which is configured to generate a representation of the outside environment based on the video, and a display configured to present the representation of the outside environment to the occupant. The display may be physically coupled to the compartment and/or belong to an HMD. Optionally, the camera is fixed to the SAEDP 171, and thus moves along with the SAEDP 171 when it is moved between the first and second states. Optionally, the display is fixed to the SAEDP 171, and thus moves along with the SAEDP 171 when it is moved between the first and second states. Optionally, the display is configured to show, at eye level, a representation of the outside environment when the SAEDP is in the second state. In one example, the display is a flexible display. In another example, the camera comprises multiple cameras directed to multiple directions around the vehicle, and the computer is configured to generate at least two different representations of the outside environment, from at least two different points of view, for two occupants who sit in the vehicle.

In some embodiments, in addition to raising the SAEDP 171, one or more of the displays mentioned above is utilized to present the occupant a video of the threat and the predicted trajectory that could result in the collision, in order to explain why the SAEDP 171 is being moved to the second state.

Figure 24A:
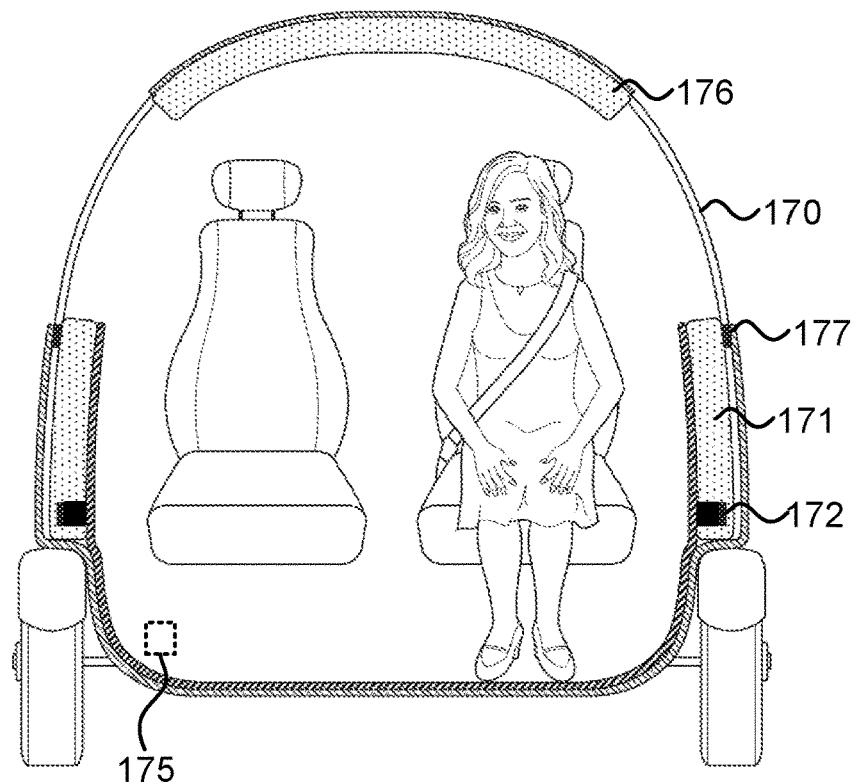
FIG. 24a and FIG. 24b illustrate a vehicle with a motor configured to move a nontransparent SAEDP to cover a side window.
Figure 24B:
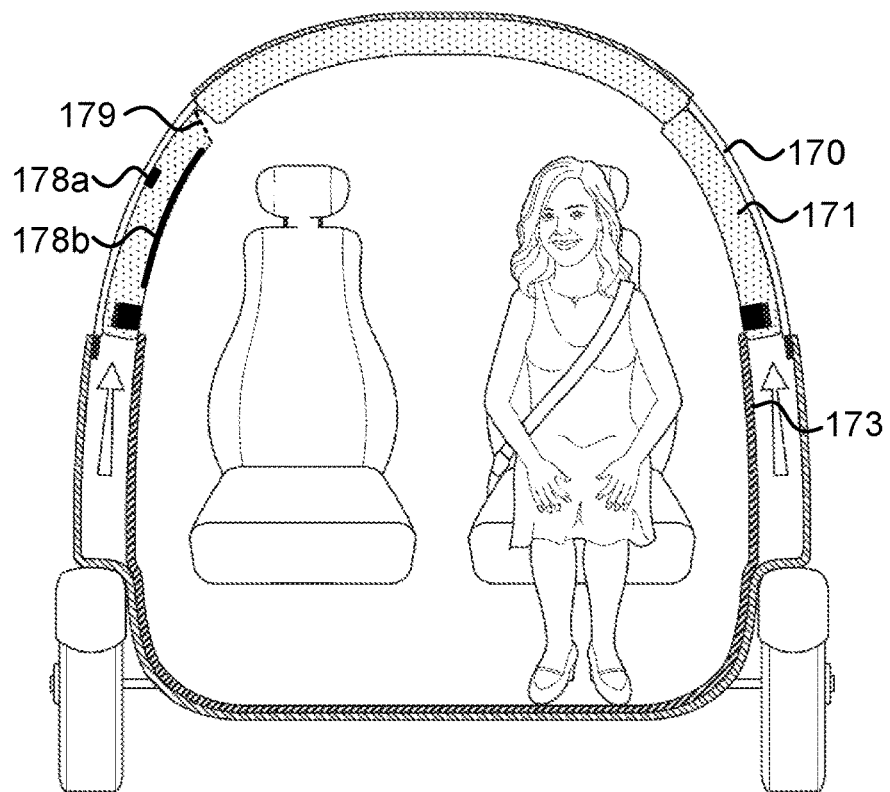

FIG. 24a and FIG. 24b illustrate an example of a vehicle in which the side window may be covered by an SAEDP that can move up and down. The figures illustrate cross-sections of the vehicle, which show how the SAEDP 171 may move from the first state (in FIG. 24a) to the second state (in FIG. 24b). The dotted line 179 indicates that the SAEDP 171 does not close the entire gap over the window (e.g., in order to avoid catching the occupant's hair). The figures also illustrate sliding mechanism 173, which may be utilized to guide and assist in the movement of SAEDP 171. FIG. 24b also illustrates camera 178a and display 178b, which are connected to a processor that generates, based on the video received from the camera, a view of the outside environment when an SAEDP (on the right side of the vehicle) is in the second state. The view of the outside environment is presented to the occupant on the display 178b. Camera and display on the left SAEDP 171, which correspond to camera 178a and display 178b, are not shown in the figure in order to make it clearer; however it is to be understood that such camera and display may be fitted to any relevant moving SAEDP.

In one embodiment, the mechanism that moves the SAEDP 171 between the first and second states (referred to as the "SAEDP mechanism") is similar to a power window regulator that moves an automobile window up and down. As with automobile power windows, the SAEDP regulator may be powered by an electric motor, which may come with the SAEDP regulator as one unit, or as a system that enables the motor or regulator to be replaced separately. The SAEDP mechanism includes a control system, a motor, a gear reduction, a sliding mechanism and the SAEDP, which are usually fixed on the door, but may alternatively be fixed on the roof as disclosed below. The sliding mechanism may have different architectures, such as Bowden type, double Bowden type, cable spiral, or crossed levers.

In a first example, the SAEDP mechanism is similar to a double Bowden power window mechanism, in which the SAEDP 171 is fixed on two supports respectively constrained along two rails. The control system drives the motor that wraps two Bowden cables, which move two supports and, consequently, the SAEDP 171. A Bowden cable transmits mechanical force through the movement of an inner cable relative to an outer housing, and in the case of a DC motor, the basic operations of the motor are accomplished by reversing the polarity of its power and ground input.

In a second example, the SAEDP mechanism is similar to a gear-drive type power window regulator; in this case, the SAEDP mechanism includes an SAEDP motor to power the mechanism, gear drive and geared arm to move the SAEDP 171 between the first and second states, and an SAEDP holding bracket to hold the SAEDP 171.

In a third example, the SAEDP mechanism is similar to a cable type power window regulator; in this case, the SAEDP regulator includes an SAEDP motor that drives a wire cable though a mechanism, a series of pulleys that guide the cable, and a regulator carriage attached to the cable and to the SAEDP 171 and slides on the regulator track. One or more tracks may be mounted vertically inside the door panel that serves as a guide piece when the SAEDP 171 slides up and down. Depending on the design, the setup may have one main regulator track in the center of the door, or have a track on each side of the SAEDP.

In a fourth example, the SAEDP regulator is similar to a scissor power window regulator; in this case, a motor operates a gear wheel that raises and lowers the SAEDP 171 by the use of a scissor action of rigid bars.

The motor that moves the SAEDP 171 over the sliding mechanism may be any suitable motor, such as a DC electric motor, an AC electric motor, or a pneumatic motor.

In one embodiment, the indication that the probability of an imminent collision reaches a threshold is received from the autonomous-driving control system 65 that calculates the probability based on the trajectory of the vehicle and information about the road. Optionally, the information about the road may be received from one of more of the following sources: a sensor mounted to the vehicle, a sensor mounted on a nearby vehicle, a road map, a stationary traffic controller nearby the vehicle, and a central traffic controller that communicates with the vehicle via wireless channel.

In one embodiment, the processor 175 is further configured to receive an updated indication that the probability of the imminent collision does not reach a second threshold, and to command the motor to move the SAEDP to the first state. In this embodiment, the second threshold denotes a probability for a collision that is equal or lower than the threshold.

Figure 25A:
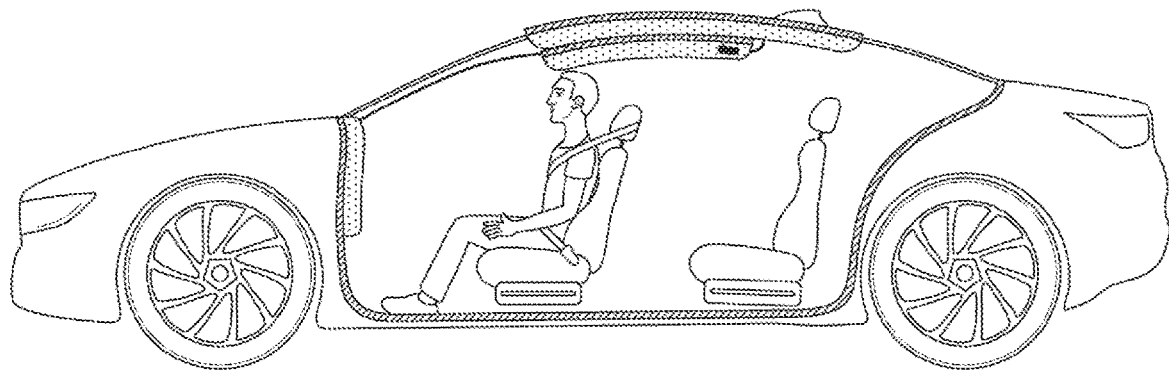
FIG. 25a and FIG. 25b illustrate a vehicle with a motor configured to move a front SAEDP between first and second states.
Figure 25B:
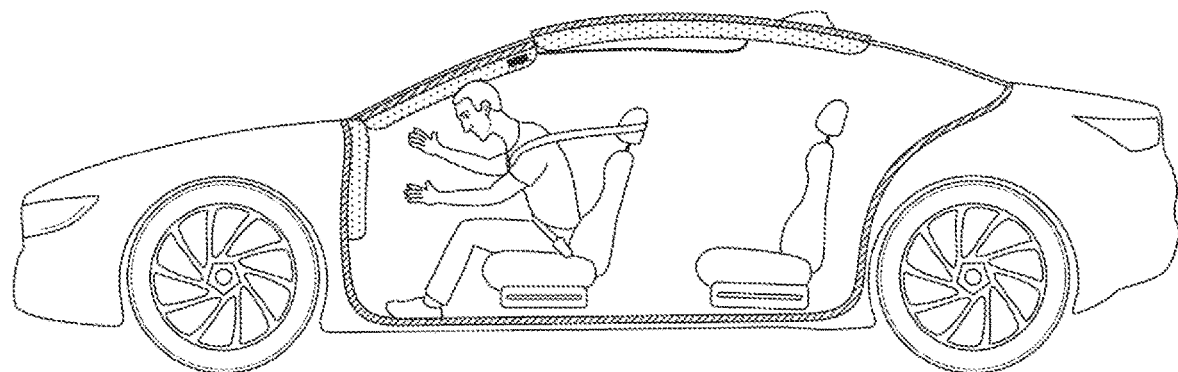

FIG. 25a and FIG. 25b illustrate a motor configured to move a front nontransparent Shock-Absorbing Energy Dissipation Padding (SAEDP) between first and second states.

Some aspects of this disclosure involve an autonomous on-road vehicle that includes an outer nontransparent Shock-Absorbing Energy Dissipation Padding (SAEDP) mounted to the front side of the vehicle during normal driving, such that the SAEDP is in front of and at eye level of an occupant who sits in a front seat of the vehicle. Additionally, the vehicle includes a camera that is mounted to the vehicle and is configured to take video of the outside environment in front of the occupant, and a computer configured to generate, based on the video, a representation of the outside environment at eye level for the occupant.

One non-limiting advantage of the vehicle described above is that it increases the safety of a pedestrian in case of a vehicle-pedestrian collision, without prohibiting the occupant of the vehicle from receiving a frontal view of the outside environment.

Figure 26A:
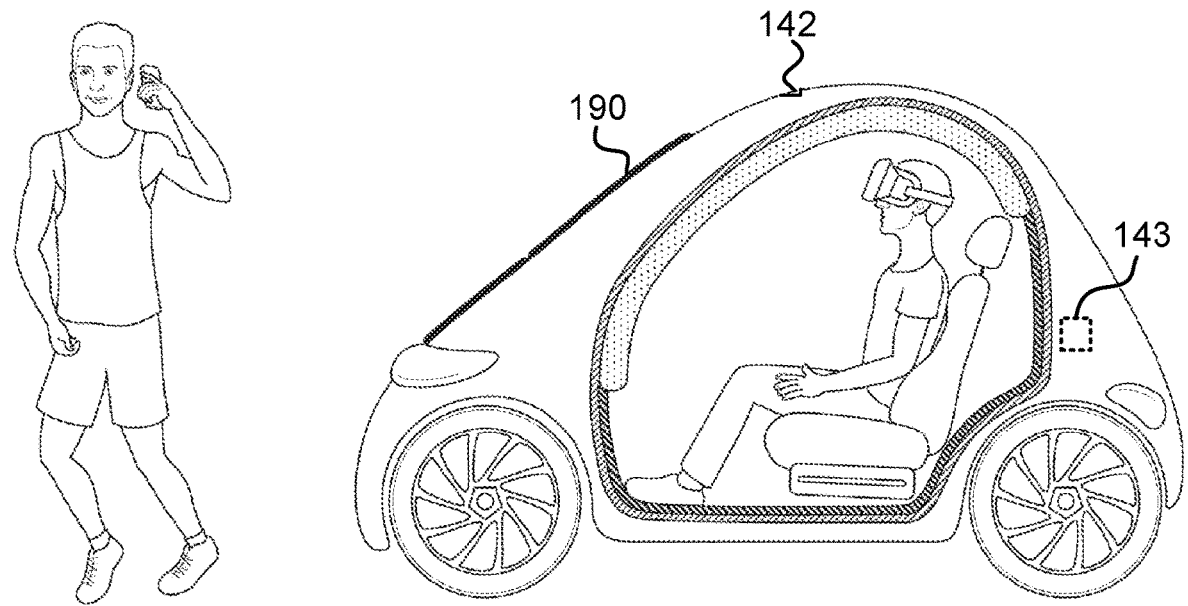
FIG. 26a illustrates an SAEDP mounted to the front of a vehicle at eye level of an occupant of the vehicle.

FIG. 26a illustrates one embodiment of an autonomous on-road vehicle that includes outer nontransparent SAEDP 190, which is mounted to the front side of the vehicle during normal driving, such that the SAEDP 190 is in front of and at eye level of an occupant who sits in a front seat of the vehicle. The SAEDP 190 is less stiff than a standard automotive glass window and is designed to absorb some of the crashing energy transmitted to a pedestrian during a pedestrian-vehicle collision. Additionally, the vehicle includes a camera (such as camera 142), which is mounted to the vehicle and is configured to take video of the outside environment in front of the occupant, and a computer (such as computer 143), which is configured to generate, based on the video, a representation of the outside environment at eye level for the occupant. Optionally, the representation is generated from the point of view of the occupant. Optionally, the vehicle includes a display configured to present the representation to the occupant. For example, the display may belong to an HMD worn by the occupant. In another example, the display may be coupled to the compartment of the vehicle, and may be a flexible display.

The SAEDP 190 may be implemented utilizing various approaches in different embodiments described herein. In one embodiment, the SAEDP 190 comprises a passive material. Optionally, the SAEDP 190 has thickness greater than at least one of the following thicknesses: 1 cm, 2 cm, 5 cm, 10 cm, 15 cm, and 20 cm.

Figure 26B:
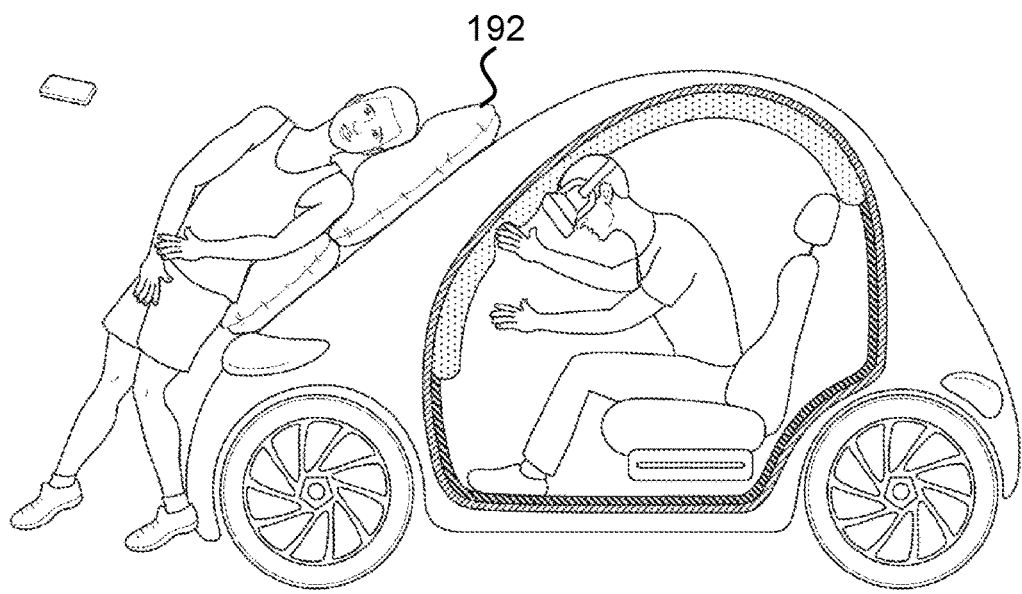
FIG. 26b illustrates an outer SAEDP that includes two air bags.

In another embodiment, the SAEDP 190 comprises an automotive airbag configured to inflate in order to protect the pedestrian. FIG. 26b illustrates an outer SAEDP 190 that includes two air bags 192 configured to absorb some of the crashing energy transmitted to a pedestrian during a pedestrian-vehicle collision. Optionally, the airbag has a stowed condition and an inflated condition. The airbag is coupled to an inflator configured to inflate the airbag with gas, and the airbag is located, in the stowed condition, at eye level in front of the occupant. In this embodiment, the vehicle further includes an autonomous-driving control system, such as autonomous-driving control system 65, which is configured to calculate a probability of pedestrian-vehicle collision, based on measurements of sensors mounted to the vehicle, and to command the airbag to inflate before the pedestrian head hits the vehicle.

In yet another embodiment, the SAEDP 190 comprises a pneumatic pad configured to inflate in order to protect the pedestrian. In this embodiment, the vehicle further includes an autonomous-driving control system, such as autonomous-driving control system 65, which is configured to calculate a probability of pedestrian-vehicle collision, based on measurements of sensors mounted to the vehicle, and to command the pneumatic pad to start inflate at least 0.5 second before the expected time of the collision in order to protect the pedestrian. Optionally, the pneumatic pad is reusable, and can be used multiple times without the need to be repaired. For example, the vehicle comprises a mechanism to deflate and/or stow the pneumatic pad, without requiring its repair and/or replacement.

Some aspects of this disclosure involve an autonomous on-road vehicle that includes a window located at eye level of an occupant who sits in a front seat of the vehicle (e.g., a windshield), a reusable nontransparent Shock-Absorbing Energy Dissipation Padding (SAEDP), a motor, and a processor. The window enables the occupant to see the outside environment. The motor is configured to move the SAEDP over a sliding mechanism between first and second states multiple times without having to be repaired. In the first state the SAEDP does not block the occupant's eye level frontal view to the outside environment, and in the second state the SAEDP blocks the occupant's eye level frontal view to the outside environment. Additionally, in the second state the SAEDP can absorb some of the crashing energy transmitted to a pedestrian during a pedestrian-vehicle collision. The processor is configured to receive, from an autonomous-driving control system, an indication indicative of whether a probability of an imminent pedestrian-vehicle collision reaches a threshold. Responsive to receiving an indication of an imminent collision (e.g., within less than 2 seconds), the processor is configured to command the motor to move the SAEDP from the first state to the second state.

One non-limiting advantage of the vehicle described above is that it increases the safety of a pedestrian in case of a vehicle-pedestrian collision, without prohibiting the occupant of the vehicle from receiving a frontal view of the outside environment during normal driving.

Figure 27A:
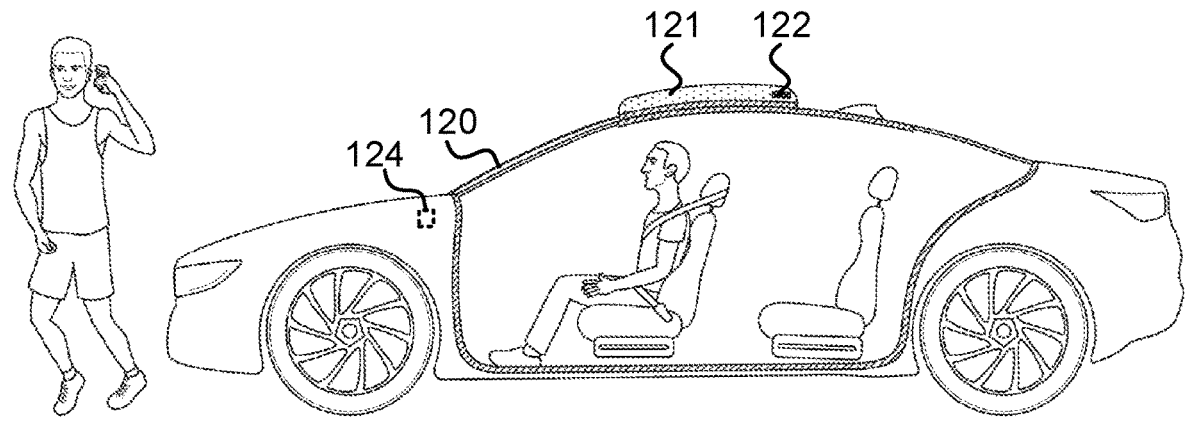
FIG. 27a and FIG. 27b illustrate a motorized external SAEDP that can move between first and second states multiple times.
Figure 27B:
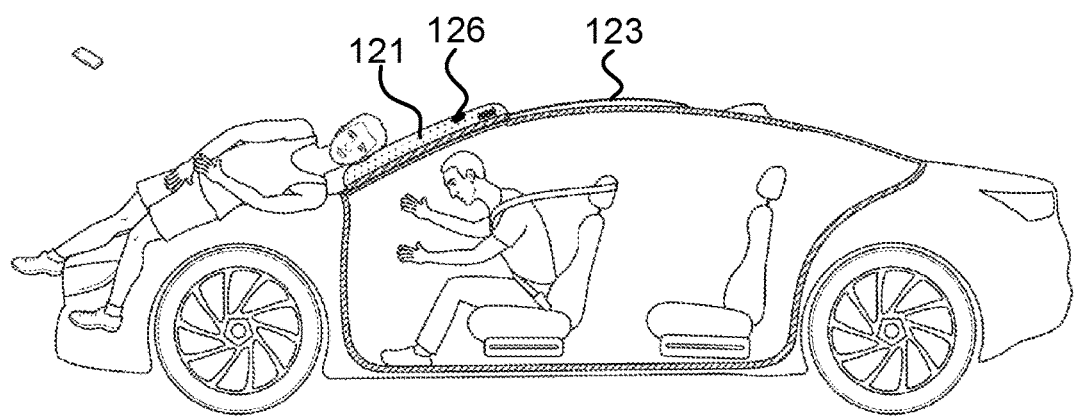

FIG. 27a and FIG. 27b illustrate a motorized external SAEDP 121 that can move between first and second states multiple times. The figures illustrate how the SAEDP 121 can move from the first state (in FIG. 27a) to the second state (FIG. 27b) by having the motor 122 move the SAEDP 121 over sliding mechanism 123. Additionally, the figures illustrate optional camera 126 that is embedded in the SAEDP 121, and which may provide video to a processor configured to generate a representation of the outside environment when the SAEDP 121 is in the second state.

In one embodiment, an autonomous on-road vehicle includes window 120, reusable SAEDP 121, motor 122, and processor 124. The window 120, which is located at eye level of an occupant who sits in a front seat of the vehicle, and which may be a windshield, enables the occupant to see the outside environment. The SAEDP 121 is reusable, i.e., it may be moved multiple times without the need to replace it or repair it after each use. The SAEDP 121 may be implemented utilizing various approaches in different embodiments described herein. In one embodiment, the SAEDP 121 comprises a passive material. Optionally, the SAEDP 121 has thickness greater than at least one of the following thicknesses: 1 cm, 2 cm, 5 cm, 10 cm, 15 cm, and 20 cm. In another embodiment, the SAEDP 121 comprises a pneumatic pad configured to inflate in order to protect the pedestrian. Optionally, the pneumatic pad is reusable, and the processor 124 is configured to command the pneumatic pad to start inflate at least 0.5 second before the expected time of the pedestrian-vehicle collision.

The motor 122 is configured to move the SAEDP 121 over a sliding mechanism 123 between first and second states multiple times without having to be repaired. In the first state the SAEDP 121 does not block the occupant's eye level frontal view to the outside environment, and in the second state the SAEDP 121 blocks the occupant's eye level frontal view to the outside environment. When in the second state, the SAEDP 121 is configured to absorb some of the crashing energy transmitted to a pedestrian during a pedestrian-vehicle collision.

The processor 124 is configured to receive, from an autonomous-driving control system (such as autonomous-driving control system 65), an indication indicative of whether a probability of an imminent pedestrian-vehicle collision reaches a threshold. Optionally, most of the time the vehicle travels, the processor 124 does not provide an indication that the probability reaches the threshold. Responsive to receiving an indication of an imminent collision (e.g., within less than 2 seconds), the processor 124 is configured to command the motor 122 to move the SAEDP 121 from the first state to the second state. Optionally, the processor 124 is configured to command the motor to start moving the SAEDP 121 to the second state at least 0.2 second, 0.5 second, 1 second, or 2 seconds before the pedestrian-vehicle collision in order to protect the pedestrian.

In one example, the vehicle includes a sensor configured to detect the distance and angle between the vehicle and a pedestrian, and the autonomous-driving control system calculates the probability of the imminent pedestrian-vehicle collision based on the data obtained from the sensor, the velocity of vehicle and the possible maneuver.

In one embodiment, the processor 124 is further configured to receive an updated indication that indicates the probability of the imminent pedestrian-vehicle collision does not reach a second threshold, and to command the motor 122 to move the SAEDP to the first state. Optionally, the second threshold denotes a probability for a pedestrian-vehicle collision that is equal or lower than the threshold.

In one embodiment, the vehicle includes a camera (such as camera 126), which is configured to take video of the outside environment while the SAEDP 121 is in the second state. Additionally, in this embodiment, the vehicle may further include a computer configured to generate, based on the video, a representation of the outside environment, and a display configured to present the representation of the outside environment to the occupant while the SAEDP 121 is in the second state. Optionally, the camera 126 is fixed to the SAEDP 121 from the outer side, and thus moves with the SAEDP 121 when it moves between the first and second states. Optionally, the display is fixed to the SAEDP 121 from the inner side, and thus also moves with the SAEDP 121 when it moves between the first and second states; the occupant can see the display via the window 120 when the SAEDP is in the second state. In an alternative embodiment, the display is physically coupled to the compartment (such as a windshield that also functions as a display) and/or comprised in an HMD worn by the occupant.

In addition to, or instead of, moving an SAEDP when a collision is imminent, in some embodiments, an imminent collision may prompt a raise of one or more power windows in the vehicle. This approach is illustrated in the following embodiment.

In one embodiment, a safety system for an occupant of an autonomous on-road vehicle includes an automobile power window and an autonomous-driving control system (such as autonomous-driving control system 65). The autonomous-driving control system is configured to calculate probability of an imminent collision based on data received from sensors coupled to the vehicle. Responsive to detecting that the probability reaches a threshold, and at least one second before the expected collision, the autonomous-driving control system commands the power window to rise. In this embodiment, a raised power window provides an improved safety for the occupant of the vehicle during collision compared to a lowered power window. Optionally, responsive to detecting that the probability reaches the threshold, and at least two seconds before the expected collision, the autonomous-driving control system is configured to command the power window to rise.

In one embodiment, the vehicle further includes an SAEDP coupled to the power window from the inside (e.g., as illustrated in FIG. 24*a* and FIG. 24*b*).

In one embodiment, the power window is nontransparent, and the safety system for the occupant includes a display coupled to the power window from the inside. The display is configured to present to the occupant a video see-trough (VST) of the outside environment that is generated based on a video camera pointed at the outside environment.

In another embodiment, the power window is made of a nontransparent material, which is stronger than a standard automotive tempered glass having the same dimensions. In this embodiment, the vehicle further comprises a camera configured to take video of the outside environment (such as camera 178*a*), and a computer configured to generate a VST to the outside environment based on the video. Optionally, the camera is physically coupled to the power window, such that the camera is raised and lowered with the power window. Additionally or alternatively, the camera may be coupled to an element of the vehicle that is not the power window, such that the camera does not move up and down when the power window is raised and lowered. Optionally, the vehicle further includes a display coupled to the inner side of the power window, such that the display is at eye level when the power window is raised, and below eye level when the power window is lowered; the display is configured to present the VST to the occupant. Optionally, the occupant wears an HMD, and the computer is configured to present the VST to the occupant on the HMD when the power window is raised, and not to present the VST to the occupant on the HMD when the power window is lowered.

With autonomous vehicles, it is not necessary for occupants to sit. Some aspects of this disclosure involve autonomous vehicles in which an occupant of the vehicle may lay down. Such a design for an autonomous vehicle has the advantage of enabling a more comfortable position for certain activities (e.g., relaxing or sleeping). Additionally, such a vehicle may be built to be lower than traditional vehicles, which can offer advantages in terms of increased safety (e.g., a lower center of gravity offers better stability) and better vehicle aerodynamics.

In order to increase the safety of the occupant, various forms of padding may be used in the compartment of the vehicle. In some embodiments, an autonomous on-road vehicle designed for lying down includes a closed compartment and a mattress, having an average thickness of at least 3 cm, which covers at least 50% of the compartment floor. In the compartment, there is a nontransparent Shock-Absorbing Energy Dissipation Padding (SAEDP), having an average thickness of at least 1 cm, which covers at least 50% of the compartment side walls and at least 60% of the compartment front wall during normal driving. Optionally, the SAEDP is supported by a stiff element that resists deformation during a collision in order to reduce compartment intrusion. Additionally, the vehicle includes a camera configured to take video of the outside environment, a computer configured to generate a representation of the outside environment based on the video, and a display configured to present the representation to the occupant.

Figure 28:
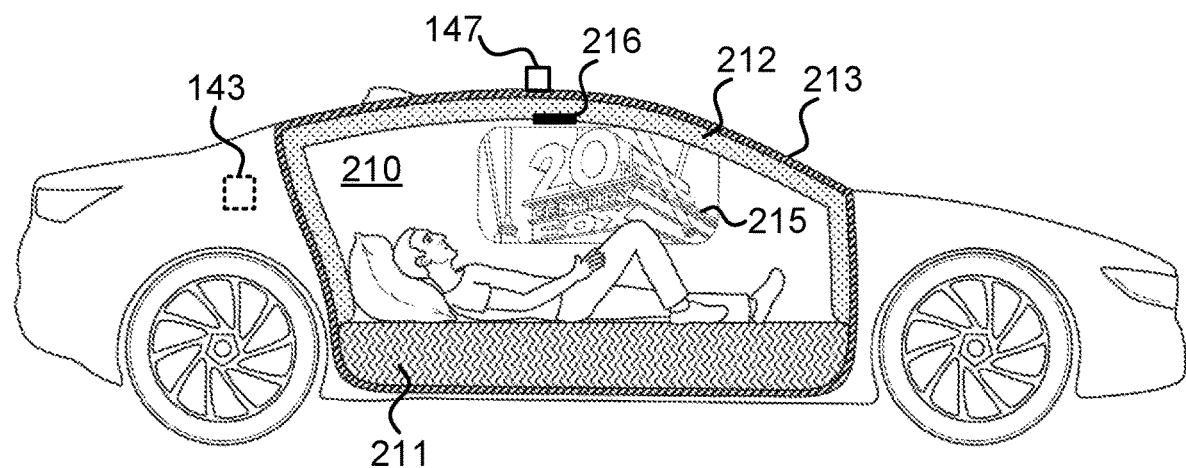
FIG. 28 illustrates a vehicle compartment in which an occupant may lay down.

In one embodiment, an autonomous on-road vehicle designed for lying down includes a closed compartment 210, a mattress 211, an SAEDP 212 covering portions of the compartment 210, a camera (e.g., the structure 147 that houses multiple cameras), a computer (e.g., the computer 143), and a display 215. FIG. 28 illustrates one embodiment of a vehicle compartment 210 in which an occupant may lay down. In the figure, the occupant is lying down on mattress 211, which covers the floor of the compartment 210, and is watching a movie on the display 215. The SAEDP 212 covers the front, roof, and back of the compartment 210. It is to be noted that the SAEDP 212 also covers portions of the side walls of the compartment 210, however, this is not illustrated to enable a clearer image of the embodiment. The figure also includes an airbag 216, which may be inflated below the SAEDP 212 in order to protect the occupant and restrain his/her movement in the case of a collision.

The mattress 211 covers at least 50% of the compartment floor. Optionally, the mattress 211 covers at least 80% of the compartment floor. In one embodiment, the mattress 211 has an average thickness of at least 3 cm. In other embodiments, the average thickness of the mattress 211 is greater than at least one of the following thicknesses: 5 cm, 7 cm, 10 cm, 20 cm, and 30 cm.

The SAEDP 212 is a nontransparent SAEDP, having an average thickness of at least 1 cm. Optionally, the SAEDP 212 covers at least 50% of the compartment side walls and at least 60% of the compartment front wall during normal driving. In one embodiment, the average thickness of the SAEDP 212 is greater than at least one of the following thicknesses: 2 cm, 3 cm, 5 cm, 10 cm, 15 cm, and 20 cm. In another embodiment, the SAEDP 212 covers at least 80% of the compartment side walls and at least 80% of the compartment front wall. In yet another embodiment, the SAEDP covers at least 50% of the compartment roof. In still another embodiment, the mattress and the SAEDP cover essentially the entire compartment interior.

In addition to the SAEDP 212, in some embodiments additional measures may be employed in order to improve the safety of the occupant. In one embodiment, the vehicle includes an automotive airbag configured to deploy in front of the SAEDP 212 in order to protect the occupant, in addition to the SAEDP 212, against hitting the inner side of the vehicle compartment during a collision. It is noted that the meaning that the airbag deploys in front of the SAEDP is that the airbag deploys towards the inner side of the compartment. Optionally, the airbag has a stowed condition and an inflated condition, and the airbag is coupled to an inflator configured to inflate the airbag with gas upon computing a predetermined impact severity. The stowed airbags may be stored in various positions, such as stored essentially in the middle of the front wall, stored essentially in the middle of the rear wall, stored in the side walls (possibly two or more horizontally spaced airbags), and stored in the roof (possibly one or more airbags towards the front of the compartment and one or more airbags towards the rear of the compartment).

In some embodiments, various additional safety measures may be utilized to improve the safety of the occupant while traveling, such as a sleeping net and/or a safety belt, as described for example in U.S. Pat. Nos. 5,536,042 and 5,375,879.

Stiff element 213 is configured to support the SAEDP 212 and to resist deformation during a collision in order to reduce compartment intrusion. Part of the stiff element 213 is located, during normal driving, at eye level between the SAEDP 212 and the outside environment. Optionally, the stiff element covers, from the outside, more than 80% of the SAEDP on the compartment side walls. Optionally, the vehicle also includes a crumple zone located at eye level between the stiff element 213 and the outside environment.

In another embodiment, the vehicle includes a pneumatic pad configured to inflate in order to protect the occupant, in addition to the SAEDP 212, against hitting the inner side of the vehicle compartment during a collision. Optionally, the pneumatic pad is configured to deploy in front of the SAEDP 212 towards the inner side of the compartment. Alternatively, the pneumatic pad is located between the SAEDP 212 and the stiff element 213, and is configured to deploy behind the SAEDP 212. The pneumatic pad may be mounted to various locations, such as mounted to the front wall, mounted to the rear wall, mounted to the side walls, and/or mounted to the roof.

The camera is configured to take video of the outside environment. The computer is configured to generate a representation of the outside environment based on the video. Optionally, the representation is generated from the point of view of the occupant. The display 215 is configured to present the representation to the occupant. In one embodiment, the display 215 is comprised in an HMD, and the vehicle further comprises a communication system configured to transmit the representation to the HMD. In another embodiment, the display 215 is physically coupled to at least one of the SAEDP 212 and the stiff element 213 at eye level of the occupant. Optionally, the display 215 is a flexible display. For example, the display 215 may be a flexible display that is based on at least one of the following technologies and their variants: OLED, organic thin film transistors (OTFT), electronic paper (e-paper), rollable display, and flexible AMOLED. Optionally, the display 215 is flexible enough such that it does not degrade the performance of the SAEDP by more than 20% during a collision.

Having a vehicle compartment that is designed to allow an occupant to lay down comfortably can be done using various compartment designs, which may be different from the designs used in standard vehicles, in which occupants primarily sit up. In one example, the vehicle does not have an automotive seat with a backrest and safety belt, which enables the occupant to sit straight in the front two thirds of the compartment. In another example, the vehicle is designed for a single occupant, and the average distance between the mattress and the compartment roof is below 80 cm. In still another example, the vehicle is designed for a single occupant, and the average distance between the mattress and the compartment roof is below 70 cm. In still another example, the vehicle is designed for a single occupant, and the average distance of the compartment roof from the road is less than 1 meter. And in yet another example the vehicle is designed for a single occupant, and the average distance of the compartment roof from the road is less than 80 cm.

It is to be noted that the use of the terms "floor", "roof", "side walls", and "front wall" with respect to the compartment are to be viewed in their common meaning when one considers the compartment to be a mostly convex hull in 3D, such as having a shape that resembles a cuboid. Thus, for example, an occupant whose face faces forward, will see the front wall ahead, the floor when looking below, the roof when looking above, and a side wall when looking to one of the sides (left or right). In embodiments that do not resemble cuboids, alternative definitions for these terms may be used based on the relative region (in 3D space) that each of the portions of the compartment occupy. For example, the floor of the compartment may be considered to be any portion of the compartment which is below at least 80% of the volume of the compartment. Similarly, the roof may be any portion of the compartment that is above at least 80% of the volume of the compartment. The front wall may be any portion of the compartment that is ahead of at least 80% of the volume of the compartment, etc. Note that using this alternative definitions, some portions of the compartment may be characterized as belonging to two different regions (e.g., the front wall and the roof).

Some aspects of this disclosure involve an autonomous on-road vehicle that includes a compartment having a large mirroring element located in front of an occupant who sits in a front seat of the compartment. Optionally, the mirroring element has height and width exceeding 25×25 cm, such that it covers a square that is at least those dimensions. Optionally, the mirroring element captures a region corresponding to at least 10×10 degrees, including a region spanning from the horizon to 10° below the horizon, of the occupant's forward field of view during normal driving. Additionally, the mirroring element provides an effect of reflecting more than 25% of the light arriving from the occupant's direction. In some embodiments, the vehicle has an advantage that it can increase the perceived compartment volume, which can make travelling in the vehicle more pleasurable for some people.

Figure 29:
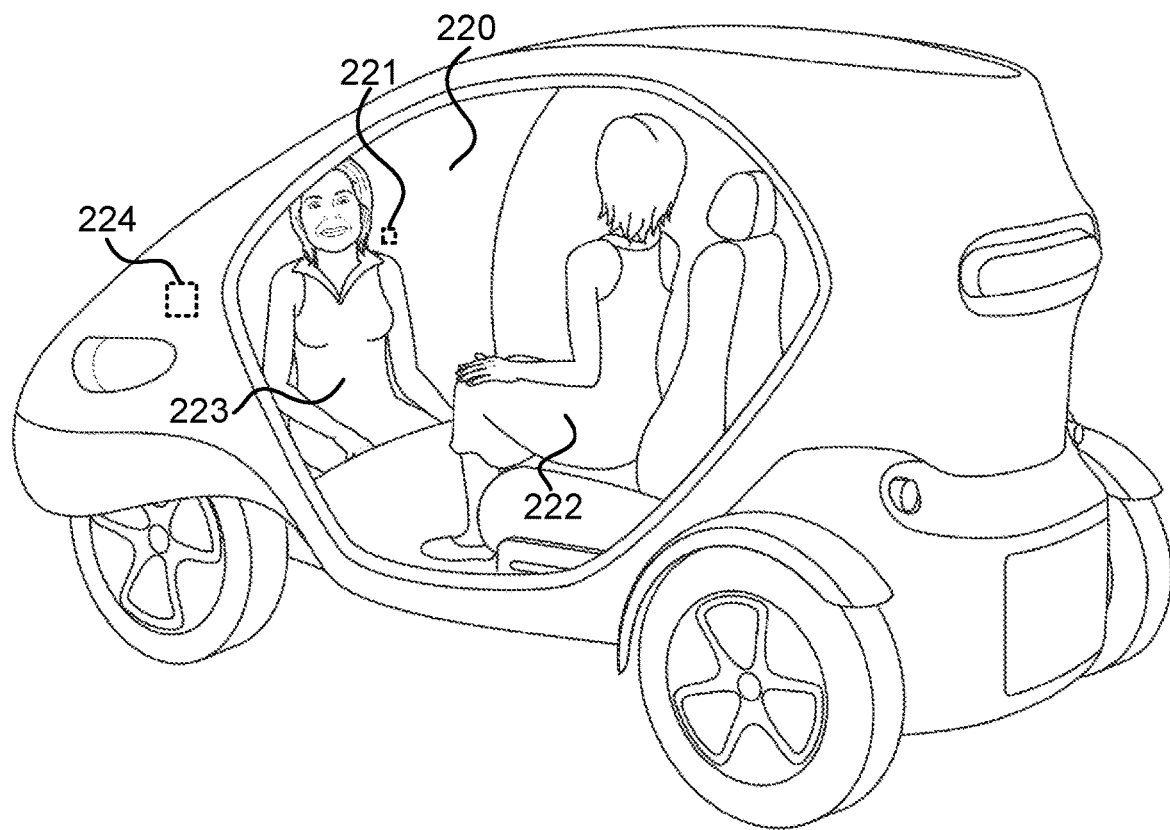
FIG. 29 illustrates a vehicle with a front mirror.

FIG. 29 illustrates one embodiment of a vehicle having a front mirroring element. The figure illustrates how the occupant 222 can see her reflection 223 in the mirroring element 220.

In one embodiment, the mirroring element 220 is located in front of an occupant who sits in a front seat of the vehicle. The mirroring element 220 provides an effect of reflecting more than 25% of the light arriving from the occupant's direction. Optionally, the mirroring element 220 provides an effect of reflecting more than at least one of 50%, 80%, and 90% of the light arriving from the occupant's direction. Optionally, the mirroring element 220 increases the volume of the vehicle compartment as perceived by the occupant due to the reflection effect.

In one embodiment, the mirroring element 220 has height and width exceeding 25×25 cm, such that it covers a square that is at least those dimensions. Optionally, the mirroring element 220 captures a region corresponding to at least 10×10 degrees, including a region spanning from the horizon to 10° below the horizon, of the occupant's forward field of view during normal driving. Optionally, the height and width of the mirroring element 220 is above 50×40 cm, and the mirroring element captures above 30×30 degrees of the occupant's field of view, including a region spanning from the horizon to 30° below the horizon. Optionally, the mirroring element 220 covers more than 25% of the area where a conventional windshield of a normal non-autonomous on-road vehicle in year 2016 is expected to be located.

The mirroring element 220 may be implemented in different ways, in different embodiments. In one embodiment, the mirroring element 220 comprises an optical mirror that is essentially flat and perpendicular to the ground. In this embodiment, most of the effect of reflecting is generated by the optical mirror. In one example, an optical mirror that is essentially flat and perpendicular to the ground refers to an optical mirror having a radius of curvature greater than a meter and a deviation below ±30° from the perpendicular to the ground.

In another embodiment, the mirroring element 220 comprises a Fresnel type optical reflector comprising many reflecting prisms. In this embodiment, the Fresnel type optical reflector is not flat, but the reflecting prisms are arranged in angles that reflect the light from the occupant such as to imitate a flat mirror.

In one embodiment, the mirroring element 220 comprises an electronic display that operates based on a camera 221 configured to take video of the occupant 222, and a computer 224 configured to generate a digital representation of the occupant 223 based on the video of the occupant. In this case, most of the effect of reflecting is generated by light emitted by the electronic display (which is the output of the video of the occupant as generated by the computer 224).

Due to the close proximity between the at least one camera 221 and the occupant, it may be necessary to stitch the reflecting effect of a large area from multiple cameras that capture the occupant from different angles. In one example, the camera 221 comprises first and second cameras, located to the right and left of the occupant, respectively. In another example, the camera 221 comprises first and second cameras, located above the level of the occupant's nose and below the level of the occupant's collarbone, respectively, and less than 80 cm away from the occupant.

In still another embodiment, the effect of reflecting is achieved by a digital mirror that comprises multiple cameras embedded within the digital mirror and configured to take images of the occupant, and multiple light emitting pixels configured to emit light rays that generate the effect of reflecting.

In one embodiment, the mirroring element 220 comprises an electronic display, and the vehicle further includes a camera configured to take video of the outside environment in front of the occupant, and a computer configured to generate, based on the video, a representation of the outside environment in front of the occupant at eye level, for displaying on the mirroring element 220. In addition to the effect of reflecting, in some embodiments the mirroring element 220 may also be configured to operate in a second state in which it provides an effect of reflecting less than 20% of the light arriving from the occupant's direction, and to present to the occupant the representation of the outside environment. Here, presenting the representation may imitate a transparent windshield to the outside environment.

The vehicle may also include, in some embodiments, a display configured to present to the occupant, at eye level in front of the occupant, the representation of the outside environment instead of, or in addition to, the effect of reflecting. Optionally, the vehicle may include a user interface configured to enable the occupant to switch between seeing the effect of reflecting and seeing the representation of the outside environment. In one example, the display is comprised in a head-mounted display (HMD). In another example, the display is mechanically coupled to the compartment, and/or the mirroring element comprises the display.

As described above, the effect of reflecting light that comes from the direction of the occupant may be obtained, in some embodiments, utilizing an HMD. The following is a more detailed example of such an embodiment.

In one embodiment, an autonomous on-road vehicle includes a compartment comprising a front seat, a camera, a computer, a communication module, and an HMD. The camera is physically coupled to the vehicle, configured to take images of an occupant who sits in the front seat. The computer is configured to generate, based on the images, a video that shows a mirror effect. Herein, the "mirror effect" involves presenting the occupant with an image that is similar to an image that the occupant would see had there been an actual mirror in front of the occupant. Optionally, the system enables the occupant to have control on the synthetic mirror effect, such as control on the distance between the occupant and her image, and/or control on the width of the image. The communication module is configured to transmit the video to a head-mounted display (HMD) worn by the occupant, and the HMD is configured to present the video to the occupant, such that the occupant sees a representation of his or her reflection when looking forward at eye level. Optionally, the HMD is selected from the group comprising: a virtual reality headset, an augmented reality headset, and mixed reality headset. Optionally, the video presented to the occupant captures at least 30×30 degrees of the occupant's field of view, spanning at least from the horizon to 30° below the horizon.

In one embodiment, the vehicle described above further includes a second camera configured to take a second set of images of the outside environment in front of the occupant. In this embodiment, the computer is further configured to generate a representation of the outside environment based on the second set of images, and the HMD is configured to present the representation of the outside environment instead of the video that shows the mirror effect or in addition to the video that shows the mirror effect.

In one embodiment, the vehicle described above may include multiple cameras that capture images that are utilized by the computer to generate the video that shows the mirror effect. In one example, the vehicle comprises at least first and second cameras, which are located to the right and left of the occupant, respectively. In another example, the vehicle comprises at least first and second cameras, located above the level of the occupant's nose and below the level of the occupant's collarbone, respectively, and which are less than 80 cm away from the occupant.

Some aspects of this disclosure involve utilizing one or more nontransparent side beams in order to help protect the occupant in a case of a collision. The one or more side beams are stiffer than automotive laminated glass. In one example, a side beam comprises a high tensile steel pipe and pressed material. In another example, a side beam comprises an aluminum extruded shape.

In one embodiment, an autonomous on-road vehicle that weighs less than 1500 kg without batteries includes a nontransparent side beam, which is stiffer than automotive laminated glass, and is located during normal driving to the left and at eye level of an occupant who sits in a front seat. The vehicle also includes a camera configured to take video of the outside environment to the left of the occupant, and a computer configured to generate for the occupant, based on the video, a representation of the outside environment to the left of the occupant at eye level. Optionally, the representation is presented to the occupant using a display. In one example, the display is comprised in a head-mounted display (HMD), and the vehicle further comprises a communication system configured to transmit the representation to the HMD. In another example, the display is coupled to the inner side of the compartment.

The following is a description of an embodiment of a vehicle in which one or more side beams may be utilized to help protect the left side of a vehicle (and an occupant therein). In one embodiment, an autonomous on-road vehicle includes a nontransparent side beam, a camera (e.g., the camera 161), and a computer (e.g., the computer 143). Optionally, the vehicle weighs less than 1500 kg without batteries.

The nontransparent side beam, which is stiffer than automotive laminated glass, is located, during normal driving, at eye level to the left of an occupant who sits in a front seat of the vehicle. Optionally, the side beam is at least 60 cm long and at least 1 cm wide (herein "cm" refers to centimeters). In one example, the side beam comprises a high tensile steel pipe and pressed material. In another example, the side beam comprises an aluminum extruded shape.

The camera configured to take video of the outside environment to the left of the occupant. The computer is configured to generate for the occupant, based on the video, a representation of the outside environment to the left of the occupant at eye level. Optionally, the representation is generated from the point of view of the occupant, and the vehicle further includes a display configured to present the representation to the occupant. In one example, the display is comprised in a head-mounted display (HMD), and the vehicle further comprises a communication system configured to transmit the representation to the HMD. In another example, the display is coupled to the inner side of the compartment.

Figure 30A:
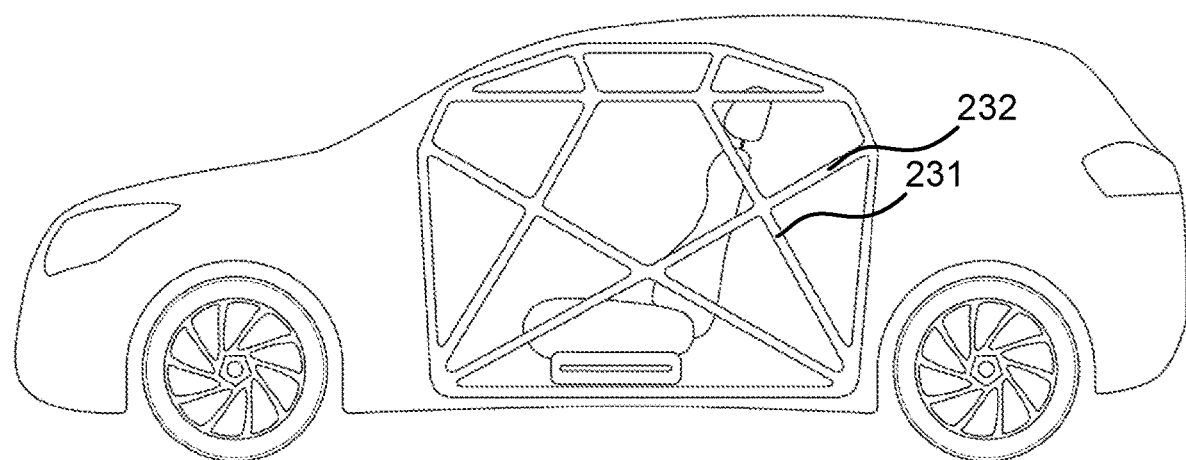
FIG. 30a illustrates one example of a configuration of a plurality of beams located in the left side of the vehicle.

In some embodiments, a plurality of beams, which may be similar to the side beam described above, may be located in the region of the left side of the vehicle. It is to be noted that the plurality of beams may not necessarily all have the same dimensions or be made of the same exact materials. Optionally, the plurality of beams may be connected in various ways in order to form a structure that can better resist compartment deforming in the case of a collision. For example, in one embodiment, the vehicle includes an additional side beam that is not parallel to the side beam and crosses it to form an "X" shaped structure. Herein, an "X" shaped structure refers to any structure of two nonparallel beams that cross, and the two do not necessarily form a symmetric "X" (e.g., a symmetric "X" may be obtained when the two beams are of equal length and cross at their centers). This structure is illustrated in FIG. 30a where beams 231 and 232 cross to form an "X" shape structure. It is to be noted that the beam 231 is at eye level (i.e., at least a portion of the beam 231 is at the same height as a typical occupant's eyes). FIG. 30a illustrates one example of a configuration of a plurality of beams located in the left side of the vehicle.

Different designs of vehicles may benefit from utilizing one or more sides beam as described above. In one embodiment, the side beam is embedded in a movable structure that changes its location with respect to the vehicle compartment. For example, the side beam may be part of a left door of the vehicle. In another embodiment, the side beam is embedded in the vehicle compartment itself and does not change its location with respect to the rest of the compartment. For example, the side beam may be placed in a compartment wall to the left of the occupant.

In order to better protect the occupant from injury due to hitting the head against the side of the vehicle, in some embodiments, the vehicle may comprise a nontransparent Shock-Absorbing Energy Dissipation Padding (SAEDP) located at eye level between the side beam and the occupant. The SAEDP is less stiff than a standard automotive glass window. In one example, the SAEDP comprises a passive material. In another example, the SAEDP includes an airbag. And in still another example, the SAEDP includes a pneumatic pad. Optionally, the vehicle includes a display on which the representation of the outside environment may be presented to the occupant. Optionally, the display is supported by the SAEDP and/or the side beam. Optionally, the display is a flexible display.

In a similar fashion to the utilization of beams on the left side of the vehicle, in some embodiments, one or more beams may be used to help protect the occupant's right side. For example, in one embodiment, the vehicle includes a second side beam, located at eye level to the right of the occupant, and a second camera configured to take video of the outside environment to the right of the occupant. In this embodiment, the computer is further configured to generate a second representation of the outside environment to the right of the occupant.

Some aspects of this disclosure involve utilizing one or more nontransparent beams in order to help protect the occupant in a case of a collision. The one or more beams are stiffer than automotive laminated glass. In one example, a nontransparent beam comprises a high tensile steel pipe and pressed material. In another example, a nontransparent beam comprises an aluminum extruded shape.

In one embodiment, an autonomous on-road vehicle that weighs less than 1500 kg without batteries includes a nontransparent beam, which is stiffer than automotive laminated glass, and is fixed at eye level in front of an occupant who sits in a front seat of the vehicle during normal driving. The vehicle also includes a camera configured to take video of the outside environment in front of the occupant, and a computer configured to generate for the occupant, based on the video, a representation of the outside environment in front of the occupant at eye level. Optionally, the representation is presented to the occupant using a display. In one example, the display is comprised in a head-mounted display (HMD), and the vehicle further comprises a communication system configured to transmit the representation to the HMD. In another example, the display is coupled to the inner side of the compartment.

The following is a description of an embodiment of a vehicle in which one or more nontransparent beams may be utilized to help protect the vehicle's front (and an occupant therein). In one embodiment, an autonomous on-road vehicle includes a nontransparent beam, a camera (e.g., the camera 142), and a computer (e.g., the computer 143). Optionally, the vehicle weighs less than 1500 kg without batteries.

The nontransparent beam, which is stiffer than automotive laminated glass, is located, during normal driving, at eye level in front an occupant who sits in a front seat of the vehicle. Optionally, the nontransparent beam is at least 60 cm long and at least 1 cm wide (herein "cm" refers to centimeters). In one example, the nontransparent beam comprises a high tensile steel pipe and pressed material. In another example, the nontransparent beam comprises an aluminum extruded shape.

The camera configured to take video of the outside environment in front of the occupant. The computer is configured to generate for the occupant, based on the video, a representation of the outside environment in front of the occupant at eye level. Optionally, the representation is generated from the point of view of the occupant, and the vehicle further includes a display configured to present the representation to the occupant. In one example, the display is comprised in a head-mounted display (HMD), and the vehicle further comprises a communication system configured to transmit the representation to the HMD. In another example, the display is coupled to the inner side of the compartment.

Figure 30B:
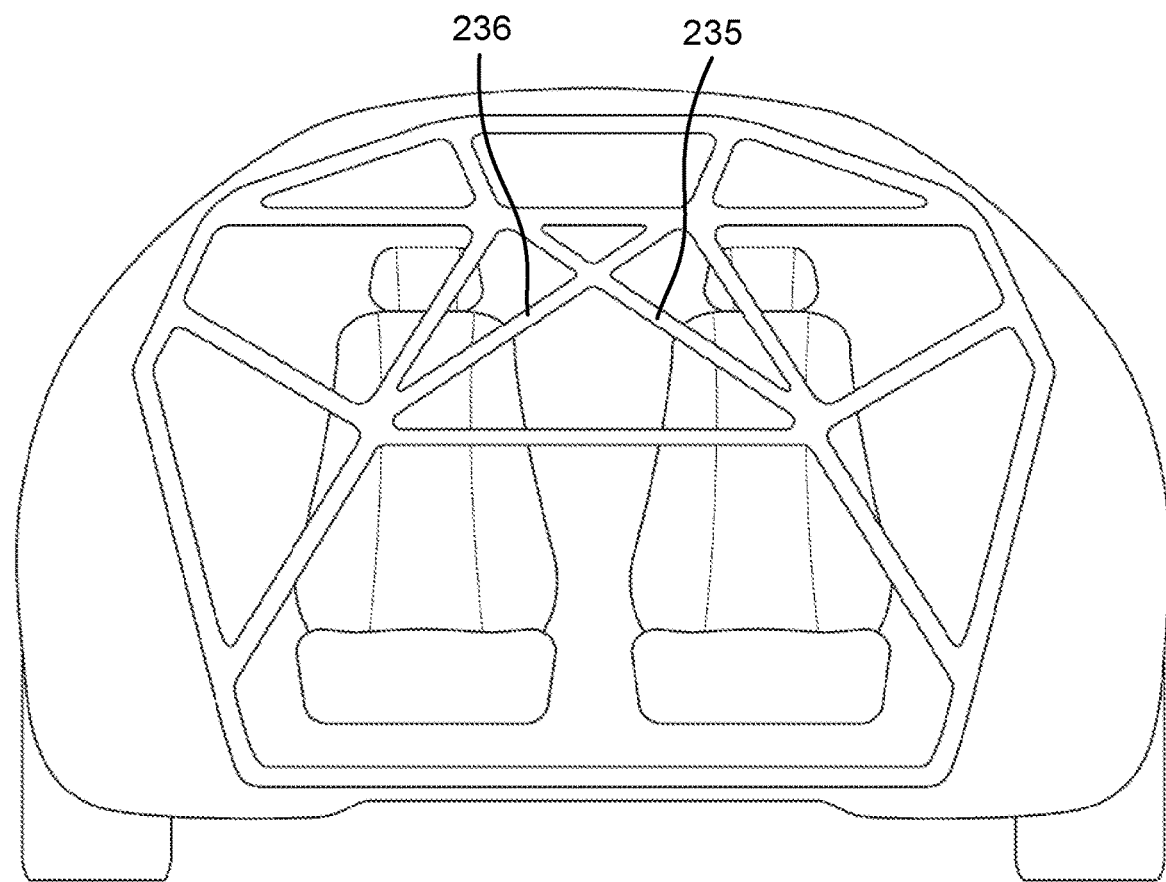
FIG. 30b illustrates one example of a configuration of a plurality of beams located in the front of the vehicle.

In some embodiments, a plurality of beams, which may be similar to the nontransparent beam described above, may be located in the front of the vehicle. It is to be noted that the plurality of beams may not necessarily all have the same dimensions or be made of the same exact materials. Optionally, the plurality of beams may be connected in various ways in order to form a structure that can better resist compartment deformation in the case of a collision. For example, in one embodiment, the vehicle includes an additional nontransparent beam that is not parallel to the nontransparent beam and crosses it to form an "X" shaped structure. This structure is illustrated in FIG. 30*b* where beams 235 and 236 cross to form an "X" shape structure. Both of the beams 235 and 236 are at eye level (i.e., at least a portion of each beam is at the same height as a typical occupant's eyes). FIG. 30*b* illustrates one example of a configuration of a plurality of beams located in the front of the vehicle.

Different designs of vehicles may benefit from utilizing one or more nontransparent beam as described above. In one embodiment, the nontransparent beam is embedded in a movable structure that changes its location with respect to the vehicle compartment. For example, the nontransparent beam may be part of a front door through which the occupant may enter the vehicle. In another embodiment, the nontransparent beam is embedded in the vehicle compartment itself and does not change its location with respect to the rest of the compartment. For example, the nontransparent beam may be placed in a compartment wall in front of the occupant.

In order to better protect the occupant from injury (e.g., during a collision), in some embodiments, the vehicle may comprise a nontransparent Shock-Absorbing Energy Dissipation Padding (SAEDP) located at eye level between the nontransparent beam and the occupant. The SAEDP is less stiff than a standard automotive glass window. In one example, the SAEDP comprises a passive material. In another example, the SAEDP includes an airbag. And in still another example, the SAEDP includes a pneumatic pad. Optionally, the vehicle includes a display on which the representation of the outside environment may be presented to the occupant. Optionally, the display is coupled to the inner side of the compartment. Optionally, the display is a flexible display.

Various embodiments described herein include a processor and/or a computer. For example, the autonomous-driving control system may be implemented using a computer and generation of a representation of the outside environment is done using a processor or a computer. The following are some examples of various types of computers and/or processors that may be utilized in some of the embodiments described herein.

Figure 31A:
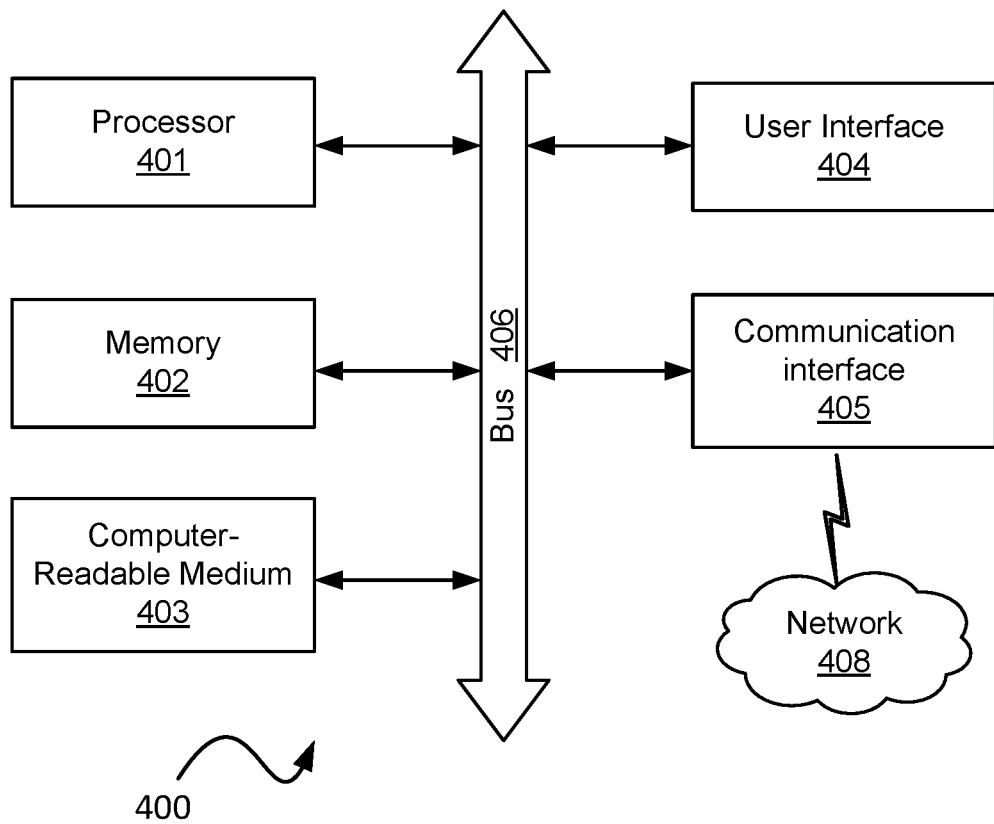
FIG. 31a and FIG. 31b are schematic illustrations of computers able to realize one or more of the embodiments discussed herein.
Figure 31B:
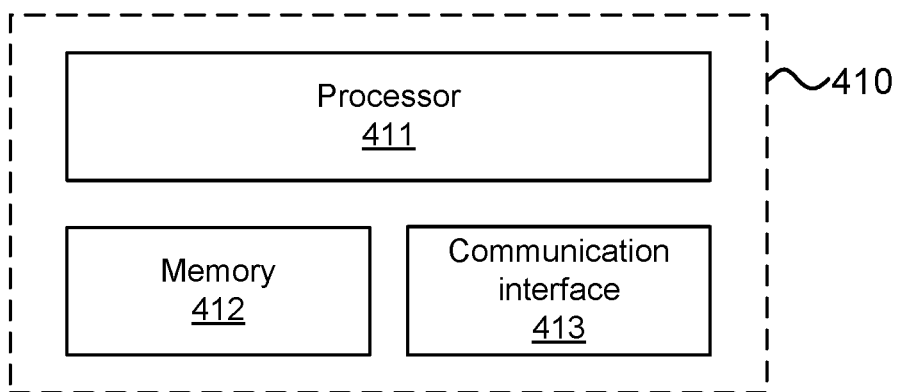

FIG. 31*a* and FIG. 31*b* are schematic illustrations of possible embodiments for computers (400, 410) that are able to realize one or more of the embodiments discussed herein. The computer (400, 410) may be implemented in various ways, such as, but not limited to, a server, a client, a personal computer, a network device, a handheld device (e.g., a smartphone), and/or any other computer form capable of executing a set of computer instructions.

The computer 400 includes one or more of the following components: processor 401, memory 402, computer readable medium 403, user interface 404, communication interface 405, and bus 406. In one example, the processor 401 may include one or more of the following components: a general-purpose processing device, a microprocessor, a central processing unit, a complex instruction set computing (CISC) microprocessor, a reduced instruction set computing (RISC) microprocessor, a very long instruction word (VLIW) microprocessor, a special-purpose processing device, an application specific integrated circuit (ASIC), a field programmable gate array (FPGA), a digital signal processor (DSP), a distributed processing entity, and/or a network processor. Continuing the example, the memory 402 may include one or more of the following memory components: CPU cache, main memory, read-only memory (ROM), dynamic random access memory (DRAM) such as synchronous DRAM (SDRAM), flash memory, static random access memory (SRAM), and/or a data storage device. The processor 401 and the one or more memory components may communicate with each other via a bus, such as bus 406.

The computer 410 includes one or more of the following components: processor 411, memory 412, and communication interface 413. In one example, the processor 411 may include one or more of the following components: a general-purpose processing device, a microprocessor, a central processing unit, a complex instruction set computing (CISC) microprocessor, a reduced instruction set computing (RISC) microprocessor, a very long instruction word (VLIW) microprocessor, a special-purpose processing device, an application specific integrated circuit (ASIC), a field programmable gate array (FPGA), a digital signal processor (DSP), a distributed processing entity, and/or a network processor. Continuing the example, the memory 412 may include one or more of the following memory components: CPU cache, main memory, read-only memory (ROM), dynamic random access memory (DRAM) such as synchronous DRAM (SDRAM), flash memory, static random access memory (SRAM), and/or a data storage device Still continuing the examples, the communication interface (405,413) may include one or more components for connecting to one or more of the following: an inter-vehicle network, Ethernet, intranet, the Internet, a fiber communication network, a wired communication network, and/or a wireless communication network. Optionally, the communication interface (405,413) is used to connect with the network 408. Additionally or alternatively, the communication interface 405 may be used to connect to other networks and/or other communication interfaces. Still continuing the example, the user interface 404 may include one or more of the following components: (i) an image generation device, such as a video display, an augmented reality system, a virtual reality system, and/or a mixed reality system, (ii) an audio generation device, such as one or more speakers, (iii) an input device, such as a keyboard, a mouse, an electronic pen, a gesture based input device that may be active or passive, and/or a brain-computer interface.

It is to be noted that when a processor (computer) is disclosed in one embodiment, the scope of the embodiment is intended to also cover the use of multiple processors (computers). Additionally, in some embodiments, a processor and/or computer disclosed in an embodiment may be part of the vehicle, while in other embodiments, the processor and/or computer may be separate of the vehicle. For example, the processor and/or computer may be in a device carried by the occupant and/or remote of the vehicle (e.g., a server).

As used herein, references to "one embodiment" (and its variations) mean that the feature being referred to may be included in at least one embodiment of the invention. Moreover, separate references to "one embodiment", "some embodiments", "another embodiment", "still another embodiment", etc., may refer to the same embodiment, may illustrate different aspects of an embodiment, and/or may refer to different embodiments.

Some embodiments may be described using the verb "indicating", the adjective "indicative", and/or using variations thereof. Herein, sentences in the form of "X is indicative of Y" mean that X includes information correlated with Y, up to the case where X equals Y. Additionally, sentences in the form of "provide/receive an indication indicating whether X happened" refer herein to any indication method, including but not limited to: sending/receiving a signal when X happened and not sending/receiving a signal when X did not happen, not sending/receiving a signal when X happened and sending/receiving a signal when X did not happen, and/or sending/receiving a first signal when X happened and sending/receiving a second signal X did not happen.

Herein, "most" of something is defined herein as above 51% of the something (including 100% of the something). A "portion" of something refers herein to 0.1% to 100% of the something (including 100% of the something). Sentences of the form "a portion of an area" refer herein to 0.1% to 100% percent of the area.

As used herein, the terms "comprises," "comprising," "includes," "including," "has," "having", or any other variation thereof, indicate an open claim language that does not exclude additional limitations. The "a" or "an" is employed to describe one or more, and the singular also includes the plural unless it is obvious that it is meant otherwise.

Certain features of some of the embodiments, which may have been, for clarity, described in the context of separate embodiments, may also be provided in various combinations in a single embodiment. Conversely, various features of some of the embodiments, which may have been, for brevity, described in the context of a single embodiment, may also be provided separately or in any suitable sub-combination.

Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the appended claims and their equivalents.

We claim:

1. An autonomous on-road vehicle providing the effect of a large front mirror, comprising:
   a compartment; and
   a mirroring element located in front of an occupant who sits in a front seat of the compartment; wherein the mirroring element captures at least 10×10 degrees of the occupant's forward field of view from the horizon to at least 10° below the horizon during normal driving, and provides an effect of reflecting more than 25% of the light arriving from the occupant's direction.

2. The autonomous on-road vehicle of claim 1, wherein height and width of the mirroring element exceeds 50×40 cm, and the mirroring element captures above 30×30 degrees of the occupant's field of view, from the horizon to 30° below the horizon.

3. The autonomous on-road vehicle of claim 1, wherein height and width of the mirroring element exceeds 25×25 cm, and the mirroring element covers more than 25% of the area where a conventional windshield is expected to be located.

4. The autonomous on-road vehicle of claim 1, wherein the mirroring element increases the volume of the vehicle compartment as perceived by the occupant due to the reflection effect, and the mirroring element provides an effect of reflecting more than 50% of the light arriving from the occupant's direction.

5. The autonomous on-road vehicle of claim 1, wherein the mirroring element comprises an optical mirror, and more than half of the effect of reflecting is generated by the optical mirror.

6. The autonomous on-road vehicle of claim 1, wherein the mirroring element comprises a Fresnel type optical reflector comprising reflecting prisms; wherein the Fresnel type optical reflector is not flat, but the reflecting prisms are arranged in angles that reflect the light from the occupant such as to imitate an essentially flat mirror.

7. The autonomous on-road vehicle of claim 1, wherein the effect of reflecting is achieved by a digital mirror; wherein the digital mirror comprises: multiple cameras embedded within the digital mirror and configured to take images of the occupant, and multiple light emitting pixels configured to emit light rays that generate the effect of reflecting.

8. The autonomous on-road vehicle of claim 1, wherein the mirroring element comprises an electronic display, and further comprising at least one camera configured to take video of the occupant, and a computer configured to generate, based on the video of the occupant, video to be displayed by the electronic display in order to generate the effect of reflecting.

9. The autonomous on-road vehicle of claim 8, wherein the at least one camera comprises first and second cameras, located to the right and left of the occupant, respectively.

10. The autonomous on-road vehicle of claim 8, wherein the at least one camera comprises first and second cameras, located above the level of the occupant's nose and below the level of the occupant's collarbone, respectively, and less than 80 cm away from the occupant.

11. The autonomous on-road vehicle of claim 8, further comprising a camera configured to take video of the outside environment in front of the occupant, and the computer is further configured to generate, based on the video, a representation of the outside environment in front of the occupant, at eye level, to be displayed by the mirroring element to the occupant.

12. The autonomous on-road vehicle of claim 11, wherein the mirroring element is further configured to operate in a second state in which it: (i) provides the effect of reflecting less than 20% of the light arriving from the occupant's direction, and (ii) presents to the occupant the representation of the outside environment; whereby presenting the representation of the outside environment imitates a windshield to the outside environment.

13. The autonomous on-road vehicle of claim 11, further comprising a user interface configured to enable the occupant to switch between seeing the effect of reflecting and seeing the representation of the outside environment.

14. The autonomous on-road vehicle of claim 11, wherein the electronic display is comprised in a head-mounted display (HMD).

15. The autonomous on-road vehicle of claim 11, wherein the electronic display is mechanically coupled to the compartment, and/or the mirroring element comprises the electronic display.

16. An autonomous on-road vehicle providing the effect of a large front mirror, comprising:
a compartment comprising a front seat;
a camera, physically coupled to the vehicle, configured to take images of an occupant who sits in the front seat;
a computer configured to generate, based on the images, a video that shows a mirror effect;
a communication module configured to transmit the video to a head-mounted display (HMD) worn by the occupant; and
the HMD is configured to present the video to the occupant, such that the occupant sees a representation of his or her reflection when looking forward at eye level.

17. The autonomous on-road vehicle of claim 16, wherein the video presented to the occupant captures at least 30×30 degrees of the occupant's field of view, from the horizon to 30° below the horizon.

18. The autonomous on-road vehicle of claim 16, further comprising a second camera configured to take a second set of images of the outside environment in front of the occupant, the computer is further configured to generate a representation of the outside environment based on the second set of images, and the HMD is configured to present the representation of the outside environment in addition to the video that shows the mirror effect.

19. The autonomous on-road vehicle of claim 16, wherein the HMD is selected from the group comprising: a virtual reality headset, an augmented reality headset, and mixed reality headset; and wherein the camera comprises first and second cameras, located to the right and left of the occupant, respectively.

20. The autonomous on-road vehicle of claim 16, wherein the camera comprises first and second cameras, located above the level of the occupant's nose and below the level of the occupant's collarbone, respectively, and less than 80 cm away from the occupant.

* * * * *